(12) United States Patent
Suzuki

(10) Patent No.: US 8,503,040 B2
(45) Date of Patent: Aug. 6, 2013

(54) IMAGE READING DEVICE HAVING CORRECTION UNIT FOR CORRECTING READ IMAGE DATA

(75) Inventor: Nobuhiko Suzuki, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1231 days.

(21) Appl. No.: 12/149,312

(22) Filed: Apr. 30, 2008

(65) Prior Publication Data

US 2008/0266617 A1  Oct. 30, 2008

(30) Foreign Application Priority Data

Apr. 30, 2007 (JP) ................................. 2007-120414
Apr. 30, 2007 (JP) ................................. 2007-120420
Apr. 30, 2007 (JP) ................................. 2007-120425
Apr. 30, 2007 (JP) ................................. 2007-120426

(51) Int. Cl.
*H04N 1/04* (2006.01)
(52) U.S. Cl.
USPC ........................... 358/474; 358/406; 358/461
(58) Field of Classification Search
USPC .................. 358/1.1, 1.9, 400, 401, 406, 448, 358/461, 468, 474
See application file for complete search history.

(56) References Cited

U.S. PATENT DOCUMENTS

| 4,614,976 A * | 9/1986 | Ogata ............................ 358/406 |
| 4,660,082 A * | 4/1987 | Tomohisa et al. ............. 348/615 |
| 4,760,464 A * | 7/1988 | Sakano .......................... 358/461 |
| 4,945,405 A | 7/1990 | Hirota |
| 5,014,332 A | 5/1991 | Nakajima et al. |
| 5,130,788 A | 7/1992 | Hirota |
| 5,408,343 A * | 4/1995 | Sugiura et al. ................ 358/520 |
| 5,864,408 A * | 1/1999 | Kumashiro ................... 358/461 |
| 6,301,019 B1 * | 10/2001 | Saito et al. .................... 358/461 |
| 6,330,083 B1 | 12/2001 | Nabeshima et al. |
| 6,606,464 B2 | 8/2003 | Asakawa |

(Continued)

FOREIGN PATENT DOCUMENTS

| JP | 62-111562 A | 5/1987 |
| JP | 63-245176 A | 10/1988 |

(Continued)

OTHER PUBLICATIONS

JP Office Action dtd May 10, 2011, JP Appln. 2007-120414, English translation.

(Continued)

*Primary Examiner* — Thomas D Lee
(74) *Attorney, Agent, or Firm* — Banner & Witcoff, Ltd.

(57) ABSTRACT

An image reading device includes a light source, a reading unit to convert received light to image data, a correction unit to correct the image data based on correction data, a storing unit storing the correction data, an illumination target switch unit to switch an illumination target between a read position and a reference position, a reflector reflecting light, a judgment unit to judge whether the image data outputted by the reading unit at the read position satisfies a predetermined condition, a correction data determination unit to determine the correction data in response to a fact that the illumination target of the light source is switched to the reference position, and a correction data update unit to store the correction data in the correction data storing unit. The illumination target switch unit switches the illumination target to the reference position if the image data satisfies the predetermined condition.

16 Claims, 25 Drawing Sheets

U.S. PATENT DOCUMENTS

| | | | |
|---|---|---|---|
| 7,502,586 | B2 | 3/2009 | Shimizu |
| 7,616,351 | B2 * | 11/2009 | Higashitani .................. 358/461 |
| 2001/0014227 | A1 | 8/2001 | Asakawa |
| 2006/0245802 | A1 | 11/2006 | Shimizu |

FOREIGN PATENT DOCUMENTS

| | | | |
|---|---|---|---|
| JP | 63-314956 | A | 12/1988 |
| JP | 1-290370 | A | 11/1989 |
| JP | 03-042962 | A | 2/1991 |
| JP | 9-074465 | A | 3/1997 |
| JP | 9-107438 | A | 4/1997 |
| JP | 9-247395 | A | 9/1997 |
| JP | 11-046289 | | 2/1999 |
| JP | 11-196266 | | 7/1999 |
| JP | 11196266 | A * | 7/1999 |
| JP | 11-266337 | A | 9/1999 |
| JP | 2000-089524 | A | 3/2000 |
| JP | 2000-270171 | A | 9/2000 |
| JP | 2000-278497 | A | 10/2000 |
| JP | 2000-358160 | A | 12/2000 |
| JP | 2001-053938 | A | 2/2001 |
| JP | 2001-136383 | A | 5/2001 |
| JP | 2002-176541 | A | 6/2002 |
| JP | 2002-300394 | A | 10/2002 |
| JP | 2002-330269 | | 11/2002 |
| JP | 2003-008850 | A | 1/2003 |
| JP | 2003-037717 | A | 2/2003 |
| JP | 2003-104631 | A | 4/2003 |
| JP | 2004-193741 | A | 7/2004 |
| JP | 2004-274094 | A | 9/2004 |
| JP | 2006-148259 | A | 6/2006 |
| JP | 2006-311357 | A | 11/2006 |
| JP | 2007-049396 | A | 2/2007 |
| JP | 2007-074554 | A | 3/2007 |

OTHER PUBLICATIONS

JP Office Action dtd Jun. 28, 2011, Japan Application No. 2007-120420; English Translation.
JP Office Action dtd Jun. 28, 2011, Japan Application No. 2007-120425; English Translation.
JP Office Action dtd Jul. 12, 2011, Japan Application No. 2007-120426; English Translation.
Extended European Search Report and European Search Opinion dtd Oct. 4, 2011, EP Appln. 08251555.2.
JP Notification of Reasons for Rejection dated Jan. 17, 2012, corresponding Application No. 2007-120425; English Translation.
JP Notification of Reasons for Rejection dated Jan. 24, 2012, corresponding Application No. 2007-120426; English Translation.

* cited by examiner

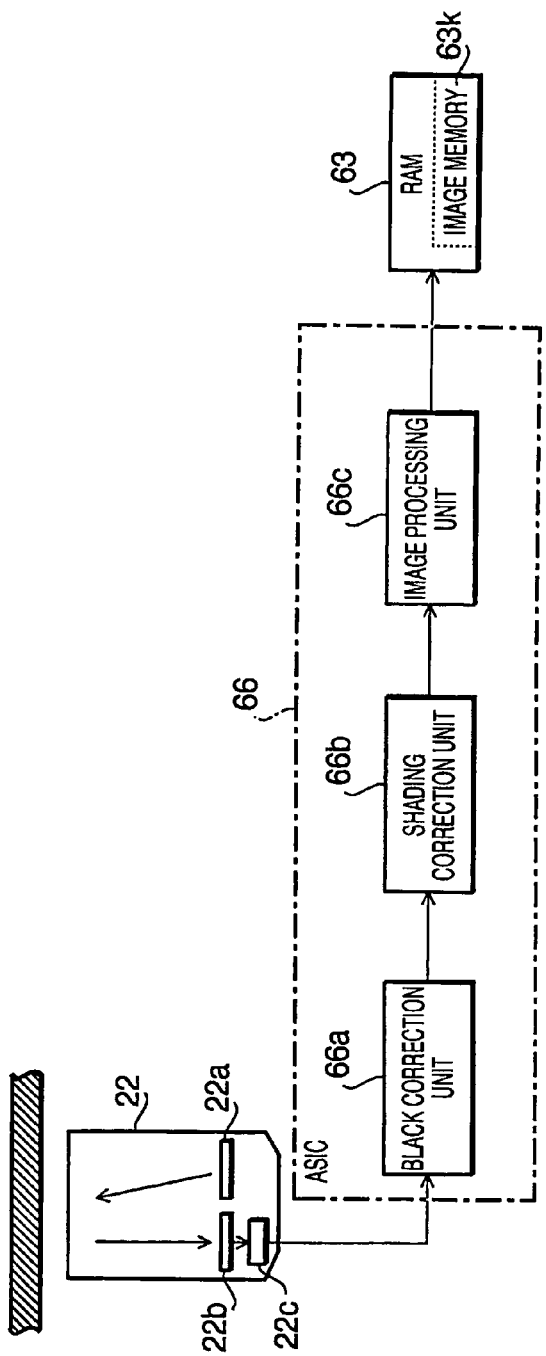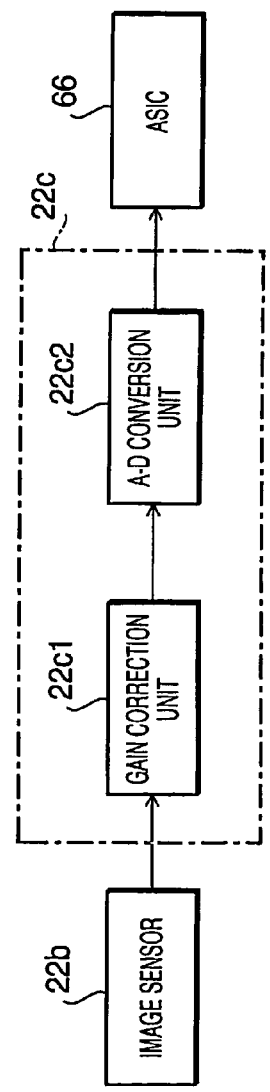

IMAGE READING DEVICE HAVING CORRECTION UNIT FOR CORRECTING READ IMAGE DATA

CROSS-REFERENCE TO RELATED APPLICATION

This application claims priority under 35 U.S.C. §119 from Japanese Patent Application Nos. 2007-120414, filed on Apr. 30, 2007, 2007-120420, filed on Apr. 30, 2007, 2007-120425, filed on Apr. 30, 2007, and 2007-120426, filed on Apr. 30, 2007. The entire subject matter of the applications is incorporated herein by reference.

BACKGROUND

1. Technical Field

Aspects of the present invention relate to an image reading device having a function of updating correction data used to correct image data.

2. Related Art

Image reading devices configured to read an image formed on a document have been widely used. In general, such an image reading device is configured to illuminate a document, to read light reflected from the document through an image pick-up device (e.g., a CCD; Charge Coupled Device) converting the received light into a voltage value, and to convert the voltage value to digital data.

In order to correct unevenness of the intensity distribution of image data along a main scanning direction due to, for example, the difference in a light amount of the light source between a central portion and each edge portion along the main scanning direction, the variations in light amount of the light source with time or unevenness of performance of the CCD along the main scanning direction, the image reading device returns a reading unit to a home position to read a white reference plate through the CCD to obtain the distribution of the light amount in the main scanning direction so that the shading correction for correcting the unevenness of the image data in the main scanning direction can be executed.

In order to correct change of the light amount with time, it is required to return the reading unit to the home position each time a sheet of the document is read so that data of distribution of the light amount is obtained again. By thus updating the data of distribution of the light amount each time a sheet of the document is read, it is possible to properly correct the image data of each page of the document so that the unevenness of the image data can be suppressed. An example of such an image reading device is disclosed in Japanese Patent Provisional Publications Nos. 2002-330269 and HEI 11-46289. However, such a configuration requires a relatively long time to execute a reading operation for a document having a larger number of pages because in this case the reading unit reciprocates a plurality of times between a read position and the home position.

Japanese Patent Provisional Publication No. HEI 11-196266 (hereafter, JP HEI 11-196266A) discloses an image reading device configured to have a white reference plate at a position outside an image scanning range in a main scanning direction. According to a configuration disclosed in JP HEI 11-196266A, the image reading device reads the white reference plate through a part of a CCD situated outside the image scanning range to evaluate change of the light amount. Such a configuration makes it possible to evaluate change of the light amount without the need of returning the reading unit to the home position. That is, the image reading device returns the reading unit to the home position only when the update of the distribution of the light amount becomes necessary.

SUMMARY

However, the above mentioned configuration disclosed in JP HEI 11-196266A has a drawback that the actual distribution of the light amount within the image scanning range is not evaluated because the change of the light amount is evaluated through use of the white reference plate located outside the image scanning range in the main scanning direction. A fluorescent lamp has a property that variations of a light amount are considerably large in a central portion along the main scanning direction, while variations of the light amount is small at edge portions along the main scanning direction. Therefore, if a fluorescent lamp is used as the light source in the image reading device, the image reading device may conclude that the change of the light amount is small and update of the distribution of the light amount is not necessary regardless of the fact that the light amount has changed considerably in the central portion along the main scanning direction. In this case, necessary update of the distribution of the light amount is not performed.

Aspects of the present invention are advantageous in that an image reading device capable of updating correction data at appropriate timing is provided.

According to an aspect of the invention, there is provided an image reading device which comprises: a light source configured to emit light; a reading unit configured to read light reflected from an object and convert the read light to image data; a correction unit configured to correct the image data outputted by the reading unit based on correction data; a correction data storing unit configured to store the correction data to be used by the correction unit; an illumination target switch unit configured to switch an illumination target between a read position through which a document passes and a reference position different from the read position; a reflector which reflects, toward the reading unit, the light emitted to the read position by the light source; a judgment unit configured to make a judgment as to whether the image data outputted by the reading unit when the illumination target of the light source is at the read position satisfies a predetermined condition; a correction data determination unit configured to determine the correction data based on the image data outputted by the read unit in response to a fact that the illumination target of the light source is switched to the reference position by the illumination target switch unit; and a correction data update unit configured to store the correction data determined by the correction data determination unit in the correction data storing unit. In this configuration, the illumination target switch unit is configured to switch the illumination target to the reference position in response to the judgment unit judging that the image data satisfies the predetermined condition.

Since the correction data is determined and updated if the image data outputted by the reading unit satisfies the predetermined condition, the update of the correction data can be performed at appropriate timing. It is also possible to reduce the number of executions of switching of the reading unit between the read position and the reference position.

According to another aspect of the invention, there is provided an image reading device, comprising: a light source configured to emit light; a reading unit configured to read light reflected from an object and convert the read light to image data; a transparent member which allows the light from the light source to pass therethrough and is located such that the document can be situated thereon; a document presser that presses the document against the transparent member; a judgment unit configured to make a judgment as to whether the image data outputted by the reading unit by reading light reflected from the document presser at a read position satisfies a predetermined condition; a reference member located at a reference position different from the read position; and a correction data determination unit configured to determine the correction data to be used to correct the image data outputted by the reading unit which reads the light reflected from the document illuminated by the light source through the transparent member. In this configuration, the correction data determination is configured to determine the correction data based on the image data outputted by the reading unit by reading the light reflected from the reference member, in response to a fact that the judgment unit judges that the image data satisfies the predetermined condition.

With this configuration, it is possible to decrease the number of times that the light source is switched between the read position and the reference position. Since the correction data is determined and updated when in response to a fact that the image data obtained by reading the reflector satisfies the predetermined condition, it is possible to update the correction data at appropriate timing.

According to another aspect of the invention, there is an image reading device, comprising: a light source which emits light; a reading unit configured to read light reflected from an object and convert the read light to image data; a correction data determination unit configured to obtain the image data outputted by the reading unit by reading a density reference member and to determine correction data based on the obtained image data; a correction unit configured to correct the image data outputted by the reading unit based on the correction data determined by the correction data determination unit; a status judgment unit configured to make a judgment on a status of the image reading device; and a standby unit configured to stop reading and determination of the correction data by the correction data determination unit until the status judgment unit judges that the image reading device is ready for reading of the document.

Since the reading of the reflected light by the correction data determination unit is stopped until the status of the image reading device becomes ready for reading of the document, it is possible to determine the correction data at appropriate timing. Since the document is read quickly after determination of the correction data, it is also possible to appropriately execute a correcting operation in accordance with the determined correction data.

According to another aspect of the invention, there is an image reading device, comprising: a document feed path connecting a paper setting part to a paper ejection part through a read position; a conveying unit configured to convey sheets of the document one by one to the read position through the document feed path; a light source configured to emit light; a reading unit configured to read light reflected from an object and convert the read light to image data; a correction unit configured to correct the image data outputted by the reading unit; and a correction data determination unit configured to determine correction data to be used by the correction unit to correct the image data. In this configuration, the correction data determination unit is configured to determine the correction data based on the image data which is outputted by the reading unit by reading the reflected light after a leading end of a sheet of the document being conveyed by the conveying unit reaches a predetermined point along the document feed path.

Since the correction data is determined after the leading end of the document reaches a predetermined point along the document feed path, it is possible to suppress the adverse effect due to change of the light amount during the conveying of the document even if such change of the light amount occurs during the conveying of the document.

According to another aspect of the invention, there is an image reading device, comprising: a light source configured to emit light; a reading unit configured to read light reflected from an object and convert the read light to image data; an illumination target switch unit configured to switch an illumination target between a read position through which a document passes and a reference position different from the read position; a conveying unit configured to convey a sheet of the document to the read position such that a first side and a second side of the sheet of the document are read sequentially by the reading unit at the read position in this order; a correction data determination unit configured to determine correction data based on the image data outputted by the read unit in a condition where the illumination target of the light source is at the reference position; a correction data storing unit configured to store the correction data determined by the correction data determination unit; a correction unit configured to correct the image data outputted by the reading unit by reading the reflected light in a condition where the illumination target is at the read position based on the correction data; a paper face judgment unit configured to judge whether a surface of the sheet of the document read by the reading unit is the first side or the second side each time the reading unit reads one side of the sheet of the document; a correction data update unit configured to cause the illumination target switch unit to switch the illumination target to the reference position, cause the correction data determination unit to determine the correction data, and update the correction data stored in the correction data storing unit with the newly determined correction data, in response to a fact that the paper face judgment unit judges that the surface of the sheet of the document is the second side.

In this configuration, a time elapsed before a leading end of the first side of a next sheet of the document reaches the read position after finish of reading of the second side of the sheet of the document conveyed by the conveying unit is longer than a time elapsed before a leading end of the second side of the sheet of the document reaches the read position after finish of reading of the first side of the sheet of the document.

With this configuration, it is possible to update the correction data by effectively using the time period between the time when the second side is read and the time when the leading end of the first side of the next sheet of the document reaches the read position. Consequently it becomes possible to effectively update the correction data in accordance with the change amount of light while preventing the decrease of the reading speed.

According to another aspect of the invention, there is an image reading device, comprising: a conveying unit configured to convey sheets of a document to a read position one by one; an illumination target switch unit configured to switch an illumination target between the read position through which a document passes and a reference position different from the read position; a light source configured to emit light; a reading unit configured to read light reflected from an object and convert the read light to image data; a correction data determination unit configured to determine correction data based on the image data outputted by the read unit in a condition where the illumination target of the light source is at the reference position; a correction data storing unit configured to store the correction data determined by the correction data determination unit; a correction unit configured to correct the image data outputted by the reading unit by reading the reflected light in a condition where the illumination target is at the read position based on the correction data; a read range determination unit configured to define a read range which is a target for reading on a sheet of the document by the reading unit; a page interval calculation unit configured to calculate a judgment value representing a conveying distance or a conveying time corresponding to a time elapsed before a leading end of the read range of a next page of the document in a conveying direction reaches the read position after a rear end of the read range of a page of the document in the conveying direction has passed the read position; and a correction data update unit configured to cause the illumination target switch unit to switch the illumination target to the reference position, cause the correction data determination unit to determine the correction data, and update the correction data stored in the correction data storing unit with the newly determined correction data, in response to a fact that the paper face judgment unit judges that the surface of the sheet of the document is the second side, after the read range of the sheet of the document conveyed by the conveying unit is read, in response to a fact that the judgment value calculated by the page interval calculation unit is larger than or equal to a predetermined threshold.

With this configuration, it is possible to update the correction data by effectively using the time period between the time elapsed before the leading end of the read range of the next page of the document reaches the read position. Therefore, it is possible to appropriately update the correction data in accordance with the change of the light amount while preventing the decrease of the reading speed.

According to another aspect of the invention, there is an image reading device, comprising: a light source which emits light; a reading unit configured to read light reflected from an object and convert the read light to image data; an evaluation unit configured to evaluate a light amount of the light source each time a predetermined number of pages of document paper are read; and a correction control unit configured to selectively execute one of preliminary image data correction to determine correction data based on the image data outputted by the reading unit at a read position and image correction to determine the correction data based on the image data outputted by the reading unit at a reference position, based on a result of evaluation of the light amount of the light source by the evaluation unit.

Since the preliminary image data correction and the image correction (e.g., full correction) can be performed selectively based on the result of evaluation of change of the light amount, it is possible to decrease the number of times that the image correction is executed while effectively suppressing the adverse effect due to change of the light amount during the reading operation.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE
ACCOMPANYING DRAWINGS

FIG. 4A is a general block diagram of an ASIC which processes an output signal from the reading unit.

FIG. 4B illustrates a general block diagram of an AFE (Analog Front-End) IC.

DETAILED DESCRIPTION

Hereafter, embodiments according to the invention will be described with reference to the accompanying drawings.

First Embodiment

Figure 1:
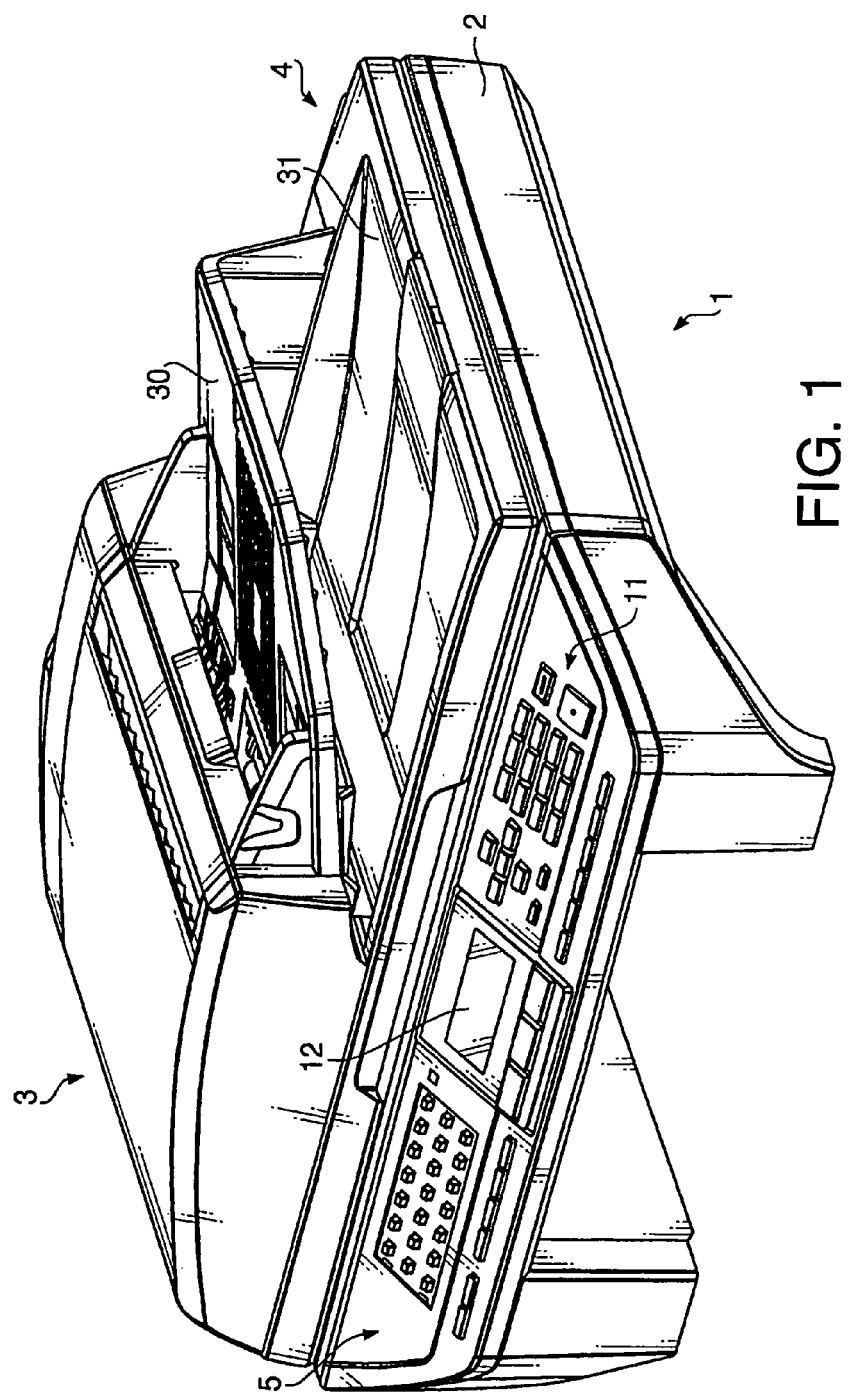
FIG. 1 is a perspective view illustrating an outer appearance of an image reading device according to a first embodiment.
Figure 2:
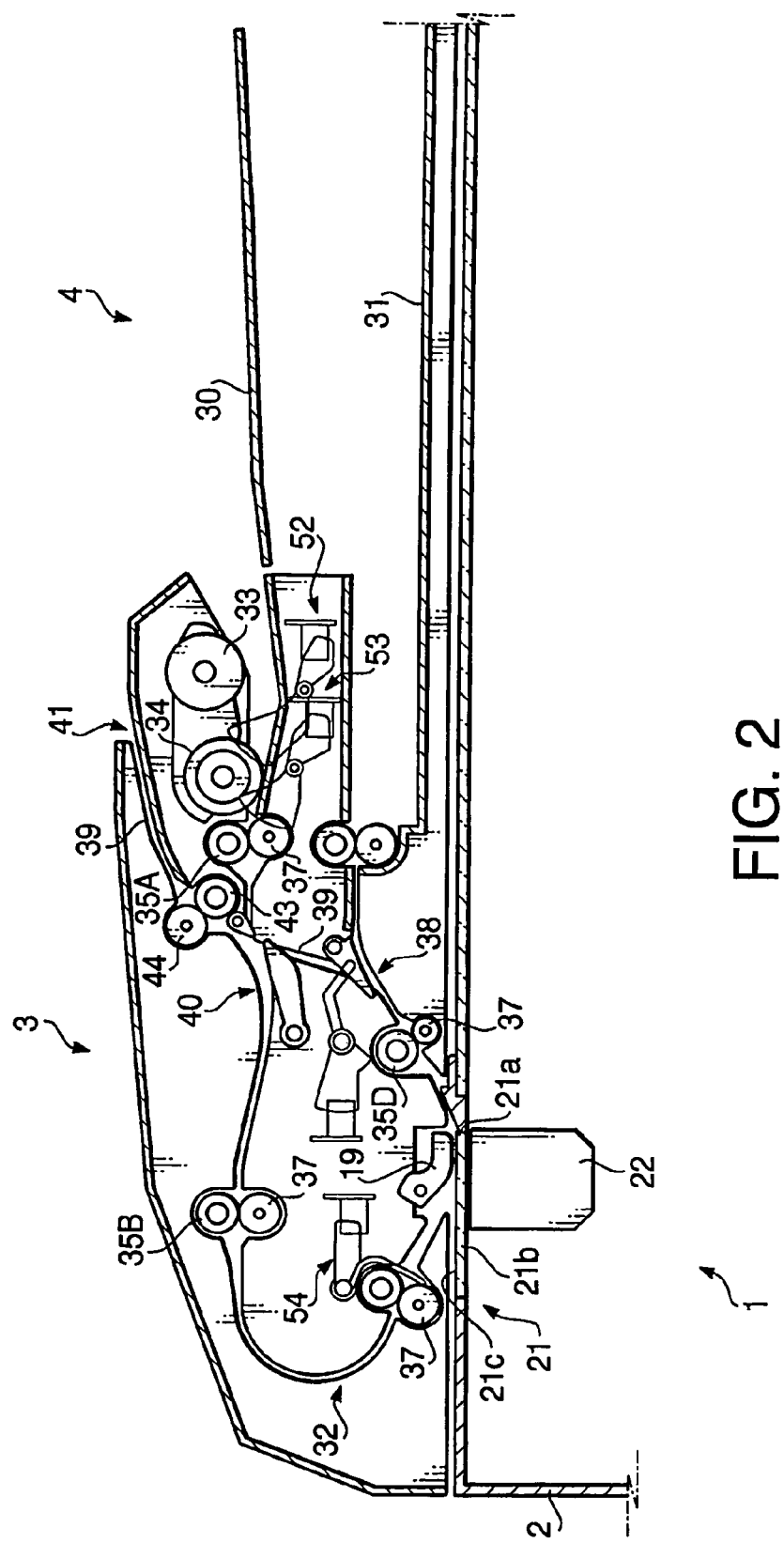
FIG. 2 illustrates a main internal structure of the image reading device.

FIG. 1 is a perspective view illustrating an outer appearance of an image reading device 1 according to a first embodiment. FIG. 2 illustrates a main internal structure of the image reading device 1. The image reading device 1 may be formed as a component (an image reading section) for reading an image from a document, for example, in a MFD (Multi Function Device) having multiple functions including a copy function, a facsimile function and a scanner function.

As shown in FIGS. 1 and 2, the image reading device 1 is configured such that a document cover 4 is openable and closable via a hinge provided at a rear part of the image reading device 1 with respect to a document base 2 serving as an FBS (Flat Bed Scanner). The document cover 4 is provided with an ADF (Automatic Document Feeder).

On the front side of the image reading device 1, an operation panel 5 is provided. The operation panel 5 includes various operation keys 11 and an LCD unit 12. The image reading device 1 has a function of accepting a user input through the operation panel 5 and operating in accordance with the user input. The image reading device 1 also has a function of receiving an instruction from an external computer (e.g., a printer driver or a scanner driver running on the external computer) to which the image reading device 1 is connected and operating in accordance with the received instruction.

As shown in FIG. 2, on the top of the document base 2, a platen glass 21 is mounted to face the document cover 4. In the document base 2, a reading unit 22 is accommodated to face the platen glass 21.

The platen glass 21 is formed of, for example, a transparent glass plate. Along the platen glass 21, a read position 21a at which a document is situated when the ADF 3 is used and a reference position 21b at which a document is not situated are defined. As shown in FIG. 2, the read position 21a and the reference position 21b are defined at different positions. At the read position 21a on the document base 2, an opening where the platen glass 21 is exposed is provided. The opening is formed such that the platen glass 21 exposed from the opening is elongated to the rear side of the image reading device 1 correspondingly to the length of the reading unit 22 in a main scanning direction.

Above the platen glass 21 at the read position 21a, a document presser foot 19 is provided. The document presser foot 19 is continuously pressed downwardly (in a downward direction in FIG. 2) under its own weight or by a pressing force applied from an elastic member, such as a spring. The document presser foot 19 is elongated to the rear side of the image reading device 1 correspondingly to the length of the reading unit 22 in the main scanning direction. In this structure, a document carried through a document feed path 32 to the read position 21a is pressed against the platen glass 21 by the document presser foot 19 so that closer contact between a document and the platen glass 21 can be achieved.

A white tape 21c is adhered to the top surface of the platen glass 21 at the reference position 21b. The white tape 21c serves as a white reference plate to generate correction data for a gain adjustment and a shading connection which are explained later.

The reading unit 22 is configured to emit upwardly light from a light source through the platen glass 21, to collect light reflected from a target object through a lens, and to output an image signal corresponding to the received light. The reading unit 22 is mounted to be capable of reciprocating under the platen glass 21 by a belt drive mechanism of a scanning mechanism so that the reading unit 22 reciprocates in parallel with the platen glass 21 through a driving force of a carriage motor.

It should be noted that, under the platen glass 21, the reading unit 22 is moved to a position beneath the read position 21a when a document fed by the ADF 3 is to be read. As shown in FIG. 2, when the reading unit 22 is situated beneath the read position 21a, light emitted from the reading unit 22 illuminates a document situated at the read position 21a via the platen glass 21.

A surface of the document presser foot 19 facing the platen glass 21 has a white color. If no document is situated at the read position 21a, the document presser foot 19 reflects the light from the reading unit 22 located under the platen glass 21 toward the reading unit 22. In this embodiment, the reading unit 22 reads the light reflected from the document presser foot 19, and evaluates a change amount of light based on digital data obtained by reading the reflected light. That is, the document presser foot 19 serves both as a presser foot for pressing a document and as a reflection member for reflecting light. Consequently, the number of components in the image reading device 1 can be reduced.

Figure 3:
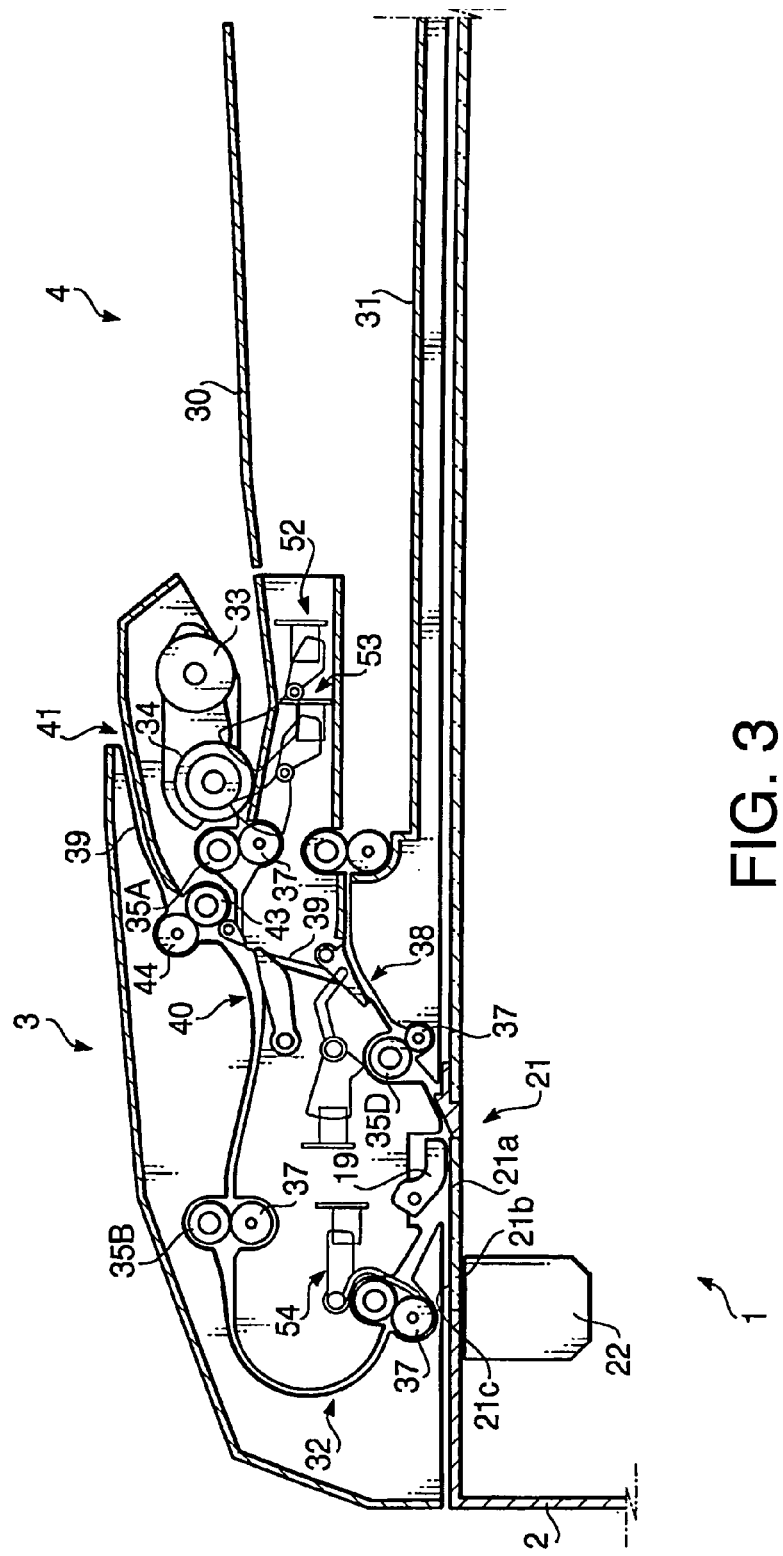
FIG. 3 illustrates a state where a reading unit is situated beneath a reference position in the image reading device.

FIG. 3 illustrates a state where the reading unit 22 is situated beneath the reference position 21b. The reading unit 22 which has moved to the reference position 21b illuminates the reference position 21b and reads light reflected from the reference position 21b. Since the white tape 21c adhered to the reference position 21b serves as the white reference plate, correction data for the shading correction can be determined in accordance with digital data obtained by reading light reflected from the white tape 21c. The white tape 21c is adhered at a position spaced from the read position 21a. Such a structure makes it possible to prevent dust from adhering to the white tape 21c and thereby to achieve an appropriate shading correction.

Referring back to FIGS. 1 and 2, the document cover 4 is provided with the ADF 3 which continuously carries a document from a paper feed tray 30 to a paper output tray 31 through the document feed path 32. During a feed process executed by the ADF 3, the reading unit 22 which lies under the platen glass 21 at the read position 21a reads an image formed on a document while the document passes the read position 21a on the platen glass 21.

As shown in FIG. 2, the document feed path 32 is provided in the ADF 3 to form a path in a form of a horizontally oriented letter U when viewed in a vertical cross section. The document feed path 32 is provided with various members, such as a guide plate and a guide rib, so that the document feed path 32 is formed to be a continuous path having a predetermined width allowing a document to pass therethrough. The document feed path 32 is formed to have a form of a horizontally oriented letter U so that the paper feed tray 30 and the paper output tray 31 forming a two layer structure are connected.

Along the document feed path 32, an intake roller 33, a separation roller 34, feed rollers 35A, 35B, 35C, and 35D and respective pinch rollers 37 are provided.

At a joint position 38 of the document feed path 32, a switchback path 39 is provided. The switchback path 39 is used, when both surfaces of a document is to be read, to resend the document, for which reading of a first face of the document at the read position 21a is finished, from the downstream side to the upstream side of the document feed path 32 while reversing the orientation of the document. The switchback path 39 is formed to obliquely extend from the joint position 38 toward the upper side to intersect with the upper part of the document feed path 32. From an intersection point 40 of the switchback path 39 and the upper part of the document feed path 32, the document sent back through the switchback path 39 is sent again to the document feed path 32. An end point 41 of the switchback path 39 is opened at the top surface of the ADF 3.

At a downstream end portion of the switchback path 39 situated on the upper side of the intersection point 40, a switchback roller 43 is provided. The switchback roller 43 is driven by a driving force of a motor (not shown) in a normal or inverse direction. A pinch roller 44 is provided to face the switchback roller 43. Since a shaft of the pinch roller 44 is pressed by a spring, the pinch rocker 44 is pressed against a roller surface of the switchback roller 43 by a pressing force of the spring. Consequently, the pinch roller 44 rotates in accordance with rotation of the switchback roller 43. The document is pressed against the switchback roller 43 by the pinch roller 44, so that the rotational force of the switchback roller 43 is applied to the document.

As shown in FIG. 2, in the document feed path 32, a plurality of sensors for detecting a document being conveyed along the document feed path 32 are provided. More specifically, in the document feed path 32, a first front sensor 52 and a second front sensor 53 are respectively located on the upstream side and the downstream side with respect to a separation roller 34. A rear sensor 54 is provided at a immediately upstream side of the read position 21a. Each of these sensors 52-54 is a photodetector having a rotating member and a photo-interrupter which is switched on or off by rotations of the rotating member.

When a document is placed on the paper feed tray 30, the first front sensor 52 is switched to on. Through the on/off state of the first front sensor 52, the presence/absence of a document on the paper feed tray 30 can be detected. Through the on/off state of the second front sensor 53 located at a immediately downstream side of the separation roller 34, the leading end or the rear end of the document being conveyed along the document feed path 32 is detected. For example, by monitoring the number of rotations of the feed rollers 35A, 35B, 35C and 35D through output of an encoder or the number of step pulses of a motor after the rear end of the document is detected by the second front sensor 53, it is possible to determine a position of the leading end or the rear end of the document along the document feed path 32.

Through the on/off state of the rear sensor 54 located at an immediately upstream side of the read position 21a, the leading end or the rear end of the document being conveyed along the document feed path 32 is detected. For example, by monitoring the number of rotations of the feed rollers 35A, 35B, 35C and 35D through output of an encoder or the number of step pulses of a motor after the rear end of the original is detected by the second front sensor 53, it is possible to determine whether the leading end or the rear end of the document has reached the read position 21a. The reading operation of the reading unit 22 is controlled in accordance with a signal from the rear sensor 54 so that the reading operation is started when the leading end of the document reaches the read position 21a and the reading operation is terminated when the rear end of the document reaches the read position 21a.

Hereafter, the configuration of the reading unit 22 and a processing flow for an output signal from the reading unit 22 will be explained with reference to FIGS. 4A and 4B. FIG. 4A is a general block diagram of an ASIC 66 which processes the output signal from the reading unit 22.

For example, the reading unit 22 includes a light source 22a having a cold-cathode tube, an image sensor 22b and an AFE (Analog Front-End IC) 22c. The image sensor 22b may be configured to have a CCD image sensor elongated to cover a main scanning range corresponding to a longitudinal side of the platen glass 21. In the reading unit 22, light reflected from a target object illuminated with light from the light source 22a is read by the image sensor 22b. Then, the image sensor 22b performs photoelectric conversion to generate an image signal corresponding to the received light and outputs the image signal to the AFE 22c. The AFE 22c performs A-D conversion to convert the image signal into digital data, and outputs the digital data to the ASIC 66. Thus, image data is inputted to the ASIC 66. As the image sensor 22b, various types of image sensors, such as a CIS (Contact Image Sensor), can be used. An A-D converter may be used in place of the AFE.

The digital data sent from the reading unit 22 to the ASIC 66 is inputted to a black correction unit 66a in the ASIC 66. The digital data which has been subjected to the black correction is inputted to a shading correction unit 66b in the ASIC 66. The shading correction unit 66b performs the shading correction for the inputted digital data. The shading correction means a process for multiplying, for each of pixels arranged in the main scanning direction, the level of a pixel by shading correction data so as to correct variations between the pixels arranged in the main scanning direction during the reading of a white reference.

Figure 5:
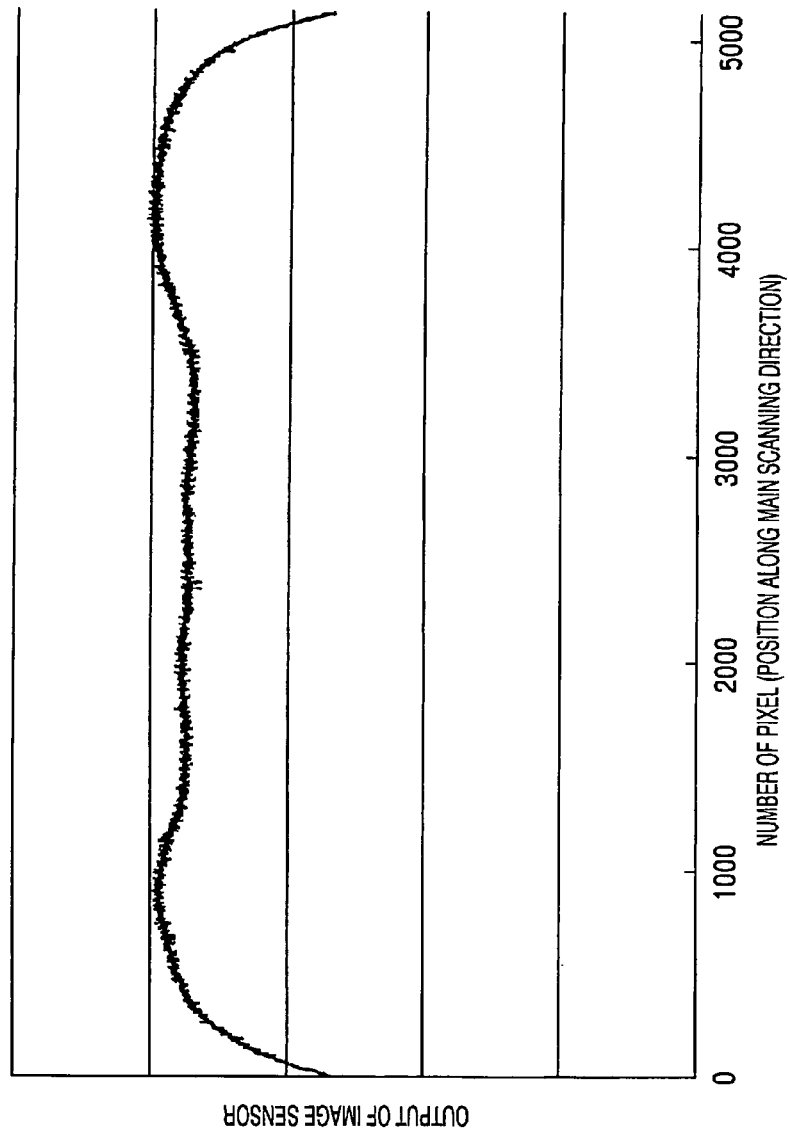
FIG. 5 is a graph illustrating a relationship between the level of an image signal outputted by an image sensor during the reading of a white reference and a position along a main scanning direction.

FIG. 5 is a graph illustrating the level of the image signal outputted by the image sensor 22 during the reading of the white reference with respect to the position along the main scanning direction. As can be seen from the graph, the image signal exhibits a relatively high level in the central portion along the main scanning direction, while the image signal exhibits a relatively low level in both of edge portions along the main scanning direction. That is, the image signal fluctuates even in the reading of the white reference because of the unevenness of the light amount of the light source 22a along the main scanning direction and/or the unevenness of sensitivity of the image sensor 22b along the main scanning direction. Therefore, if the image signal is converted into digital data without executing the shading correction, the level of each pixel does not reach a predetermined maximum reference value (e.g., 255). For this reason, the shading correction is performed for the image signal to make the distribution of the image signal during the reading of the white reference uniform.

Referring back to FIG. 4A, the data for which the shading correction has been performed is outputted to an image processing unit 66c of the ASIC 66. In the image processing unit 66c, color conversion is performed for the digital data to convert RGB data into YCbCr data, and an encoding process for compressing the digital data to a JPEG format is performed. Then, the compressed data is stored in an image memory 63k of the RAM 63.

In FIG. 4B, a general block diagram of the AFE 22c is illustrated. As shown in FIG. 4B, the AFE 22c includes a gain correction unit 22c1 and an A-D conversion unit 22c2. The gain correction unit 22c1 amplifies the image signal outputted by the image sensor 22b in accordance with a gain value, and outputs the amplified signal to the A-D conversion unit 22c. In the gain correction unit 22c1, the image signal is amplified in accordance with the gain value which has been adjusted such that the image signal amplified in the reading of the white reference becomes equal to the maximum reference value of the A-D conversion unit 22c2.

The A-D conversion unit 22c2 is configured to compare the analog image signal for which the gain correction has been performed with the predetermined reference value to convert the image signal into digital data having values in the range of 00h to FFh in hexadecimal.

As described in detail later, the image reading device 1 operates as follows. First, the reading unit 22 is moved to the position beneath the reference position 21b to read light reflected from the white tape 21c, adjusts the gain in accordance with the image signal from the image sensor 22b reading the light from the white tape 21b to determine the gain. When the gain is determined, the gain is set to the gain correction unit 22c1 so that the image signal from the image sensor 22b is subjected to the gain correction. Then, the image signal for which the gain correction has been performed is inputted to the A-D conversion unit 22c2 to be converted into digital data.

Based on the digital data outputted by the reading unit 22, the black correction data and the shading correction data are determined, and are set to the black correction unit 66a and the shading correction unit 66b, respectively. After thus setting the correction values, the reading unit 22 is moved to the position under the read position 21a, and then the reading of a document is performed. The image signal obtained by reading the document is then subjected to the gain correction, the A-D conversion, the black correction, the shading correction, and another image processing. Then, the image data is stored in the image memory 63k.

Figure 6:
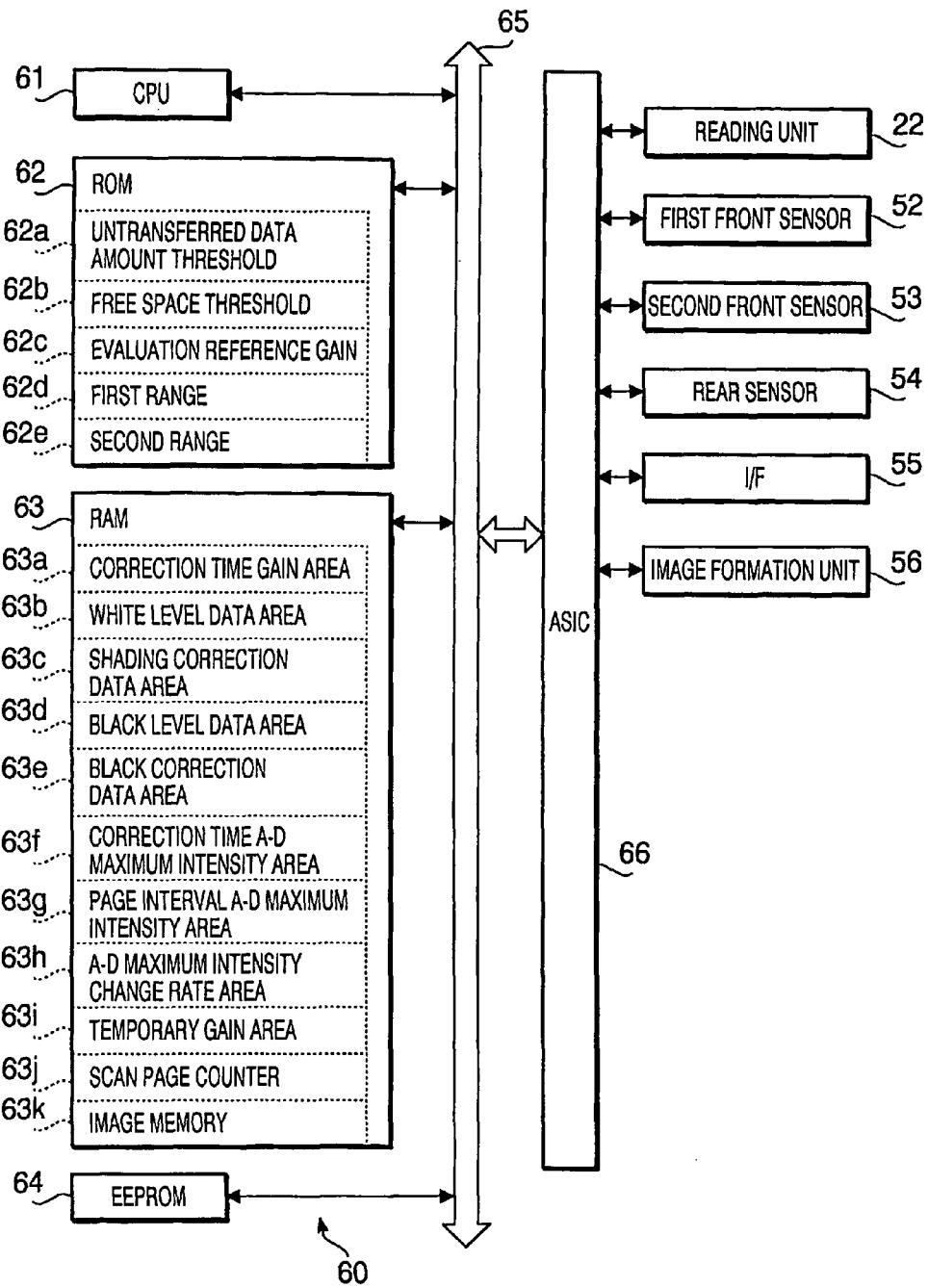
FIG. 6 is a block diagram of a control unit of the image reading device.

FIG. 6 is a block diagram of a control unit 60 of the image reading device 1. The control unit 60 controls the entire operations of the image reading device 1 including the operation of the ADF 3. As shown in FIG. 6, the control unit 60 includes a CPU 61, a ROM 62, a RAM 63 and an EEPROM 64, which are connected to the ASIC 66 via a bus 65. The control unit 60 is, for example, a microcomputer chip in which the CPU 61, the ROM 62, the RAM 63 and the EEPROM 64 are embedded.

In the ROM 62, programs, such as a program for controlling operations of the image reading device 1 and the ADF 3 are stored. In the ROM 62, an untransferred data amount threshold 62a, a free space threshold 62b, an evaluation reference gain 62c, a first range 62d, a second range 62e are stored. These values are explained in detail later with reference to FIG. 8.

The RAM 63 is used as a work memory for the CPU 61 to temporarily store various types of data. In the RAM 63, a correction time gain area 63a, a white level data area 63b, a shading correction data area 63c, a black level data area 63d, a black correction data area 63e, a correction time A-D maximum intensity area 63f, a page interval A-D maximum intensity area 63g, an A-D maximum intensity change rate area 63h, a temporary gain area 63i, a scan page counter 63j, and the image memory 63k are provided.

The correction time gain area 63a stores a gain (hereafter, referred to as a correction time gain) determined by immediately preceding execution of gain adjustment for determination of shading correction data. The correction time gain stored in the correction time gain area 63a is set to the gain correction unit 22c1 (see FIG. 4B). Therefore, the image signal outputted by the image sensor 22b is subjected to the gain correction in accordance with the correction time gain.

The white level data area 63b stores digital data outputted by the reading unit 22 by reading light reflected from the white tape 21c within the entire main scanning range when the reading unit 22 lies at the position beneath the reference position 21b. The digital data thus obtained is stored as white level data because the whiter tape 21c serves as a white reference plate. The shading correction data by which the pixel data is multiplied is determined so that the white level data stored in the white level data area 63b is brought into conformity with the maximum reference level (e.g., 255) during the reading of the white reference.

The shading correction data area 63c stores shading correction data determined based on the white level data. The shading correction data stored in the shading correction data area 63c is set to the shading correction unit 66b. Therefore, the shading correction is executed in accordance with the shading correction data thus stored in the shading correction data area 63c.

The black level data area 63d stores digital data outputted by a part of the image sensor 22b located within a light shielding region where reflected light does not enter the image sensor 22b when the reading unit 22 lies beneath the reference position 21b. The digital data thus obtained is stored in the black level data area 63d as black level data. Black correction data to be subtracted from the digital data outputted by the reading unit 22 is determined based on the black level data.

The black correction data area 63e stores the black correction data determined based on the black level data. The black correction unit 66a corrects the black level of the digital data outputted by the reading unit 22 in accordance with the black correction data stored in the black correction data area 63e. It should be noted that the black correction data is subtracted from the output of the reading unit 22 during the black correction because the image sensor 22b has a black level output even in the case where no light enters the image sensor 22b. The black correction data is determined concurrently with the determination of the shading correction data.

The correction time A-D maximum intensity area 63f stores a correction time A-D maximum intensity which is a maximum value of the digital data corresponding to one line obtained after the shading correction.

More specifically, light reflected from the document presser foot 19 is read for one line after the reading unit 22 has moved to the position beneath the reading position 21a. Then, the digital data outputted by the reading unit 22 is obtained. Next, from the thus obtained digital data, digital data corresponding to top 16 pixels in the ranking of decreasing intensity is extracted, and the average of the intensities of the 16 pixels is obtained as the correction time A-D maximum intensity, and is stored in the correction time A-D maximum intensity area 63f. The correction time A-D maximum intensity is obtained and updated each time the shading correction data is newly determined.

The page interval A-D maximum intensity area 63g stores the maximum intensity of the digital data obtained by the reading unit 22 by reading the light reflected from the document presser foot 19 at the read position 21a during the page interval when no document is situated at the read position 21a (i.e., the interval between the time when the rear end of a sheet of document paper for which the reading operation is finished passed the reading position 21a and the time when a next sheet of document paper reaches the read position 21a). The thus obtained maximum intensity is stored in the page interval A-D maximum intensity area 63g as a page interval A-D maximum intensity. More specifically, from the digital data obtained by the reading unit 22 at the read position 21a, digital data corresponding to top 16 pixels in the ranking of decreasing intensity are extracted, the average of the intensities of the 16 pixels is obtained as the page interval A-D maximum intensity, and the average of the intensities of the 16 pixels is stored in the page interval A-D maximum intensity area 63g. The value stored in the page interval A-D maximum intensity area 63g is calculated and updated, for example, each time the reading operation executed for five sheets of document paper.

The A-D maximum intensity change rate area 63h stores an A-D maximum intensity change rate representing the change amount of the page interval A-D maximum intensity with respect to the correction time A-D maximum intensity. More specifically, the A-D maximum intensity change rate is obtained by the following equation (1).

$$\text{(A-D maximum intensity change rate)} = \{(\text{page interval A-D maximum intensity})/(\text{correction time A-D maximum intensity})\} \times 100 \quad (1)$$

Figure 7:
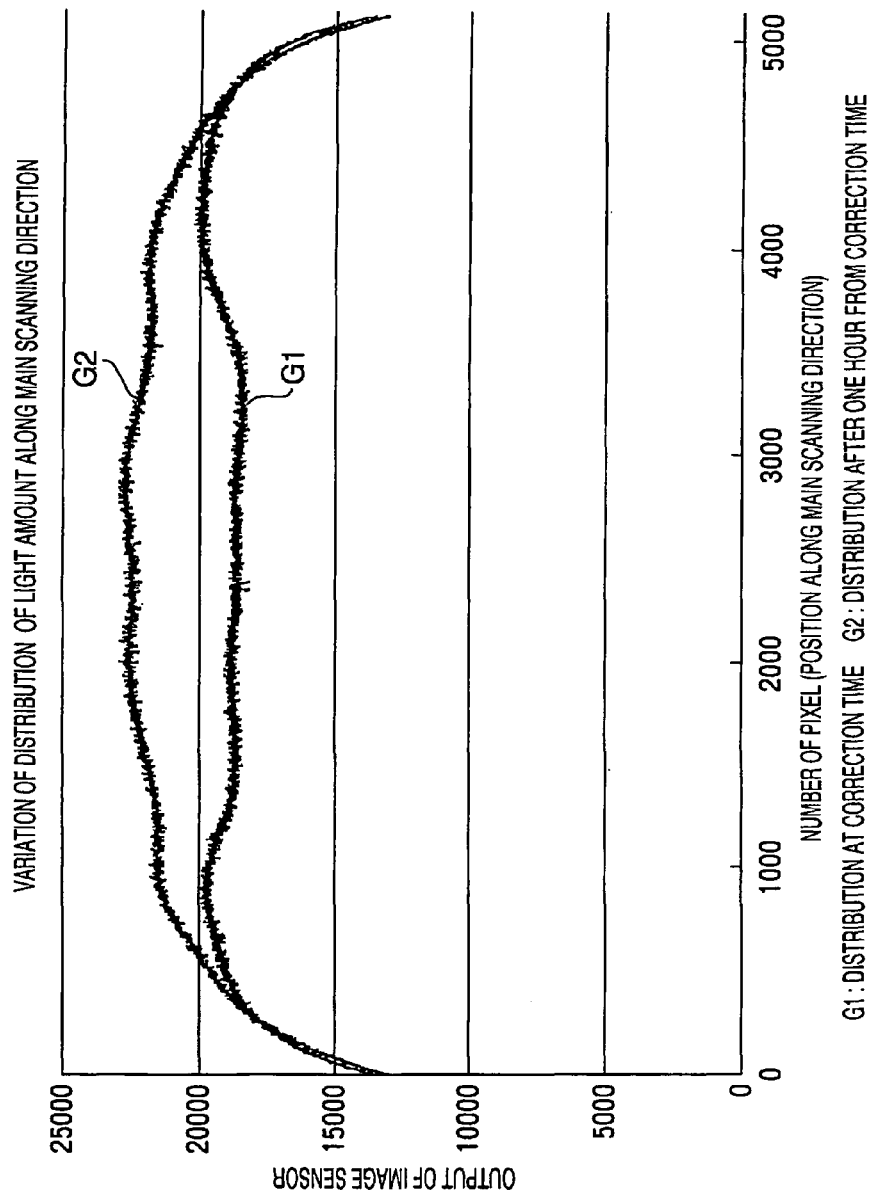
FIG. 7 is a graph illustrating the intensity of the image signal outputted by the image sensor with respect to the position along the main scanning direction at a read position.

Next, the change of light amount with time of the light source 22a is explained in detail with reference to FIG. 7. FIG. 7 is a graph illustrating the intensity of the image signal outputted by the image sensor 22 with respect to the position along the main scanning direction at the read position 21a. A curve G1 represents the image signal obtained at the time of the immediately preceding determination of the shading correction data, and a curve G2 represents the image signal obtained when a predetermined time has elapsed from the immediately preceding determination of the shading correction data. As can be seen from FIG. 7, the image signal (G2) obtained when a predetermined time has elapsed from the immediately preceding determination of the shading correction data exhibits totally the higher intensity level than the image signal (G1) obtained at the time of the immediately preceding determination of the shading correction data. That is because the light amount of the light source 22a has increased with time.

Further, from FIG. 7, it is understood that the intensity level of the image signal has changed more largely in the central portion along the main scanning direction relative to the change amount at each edge portion along the main scanning direction. In other words, if the maximum intensity obtained from the currently read image signal has changed largely with respect to the maximum intensity of the image signal read at the time of the immediately preceding determination of the shading correction data, the total light amount of the light source 22a also has changed largely. On the other hand, if the change amount of the maximum intensity is small, the total light amount of the light source 22a has not changed largely.

For this reason, the image reading device 1 is configured to evaluate the change of the light amount from the immediately preceding determination of the shading correction data based on the A-D maximum intensity change rate representing the change amount of the currently obtained page interval A-D maximum intensity with respect to the correction time A-D maximum intensity obtained at the time of the immediately preceding determination of the shading correction data.

More specifically, the image reading device 1 compares the A-D maximum intensity change rate with a first range 62d. If the A-D maximum intensity change rate lies outside the first range 62d, the image reading device 1 judges that the change amount of the light from the immediately preceding determination of the shading correction data is large. In this case, the image reading device 1 moves the reading unit 22 to the position beneath the reference position 21b to read light reflected from the white tape 21c and to newly determine and update the shading correction data. For example, the first range set to −5% to +5% range.

If the A-D maximum intensity change rate is within the first range 62d, the reading unit 22 is kept at the read position 21a. That is, in this case, the reading unit 22 is not returned to the reference position 21b, and therefore the gain adjustment and the shading correction are not executed. Therefore, when the change amount of light is small, there is no necessity for the image reading device 1 to reciprocate the reading unit 22 between the read position 21a and the reference position 21b. Consequently, the time required for execution of the reading operation can be decreased.

If the A-D maximum intensity change rate lies outside a second range 62e, it is possible to judge that the light amount is changed to a certain extent from the immediately preceding determination of the shading correction data even if the A-D maximum intensity change rate lies within the first range 62d. Therefore, the image reading device 1 calculates a temporary gain based on the correction time gain stored in the correction time gain area 63a and the A-D maximum intensity change rate. The second range 62e is narrower than the first range 62d. For example, the second range 62e is −2% to +2% range.

Referring back to FIG. 6, the temporary gain area 63i stores the correction time gain and the temporary gain calculated from the A-D maximum intensity change rate. As described above, to the gain correction unit 22c1, the gain stored in the correction time gain area 63a is set. However, for the reading operation for 5 pages of document paper after determination of the temporary gain, the temporary gain is set to the gain correction unit 22c1 so that the image signal from the image sensor 22b is subjected to the gain correction in accordance with the temporary gain.

Consequently, even if the light amount of the light source 22a changes, gain correction for the image signal can be performed through use of the proper temporary gain which is determined correspondingly to the change of the light amount.

The scan page counter 63j is a counter for counting the number of pages of document paper that the image reading device 1 has read.

The image memory 63k stores the digital data for which the black correction, the shading correction, and other image processing have been performed. The digital data stored in the image memory 63k may be transmitted to a predetermined external device in response to a user instruction.

The EEPROM 64 stores various types of data including settings and flags to be maintained in the power off state. In addition to the black correction and the shading correction, the ASIC 66 controls the intake roller 33, the separation roller 34, the feed rollers 35A, 35B, 35C and 35D, the ejection roller 36 and the switchback roller 43.

To the ASIC 66, the reading unit 22 which reads the document being conveyed to the read position 21a by the ADF 3 is connected. Based on the program stored in the ROM 62, the reading unit 22 executes the reading operation for documents. The ASIC 66 also outputs control signals for controlling a driving mechanism for reciprocating the reading unit 22.

To the ASIC 66, a network interface 55 is connected. The network interface 55 interfaces the image reading device 1 with a network to control data communication with an external device. During a read data transfer process (which may be added to a read process shown in FIG. 8 between S14 and S16), the digital data obtained by the reading unit 22 and stored in the image memory 63k may be transferred to an external device via the network interface 55.

As shown in FIG. 6, an image formation unit 56 is connected to the ASIC 66. The image formation unit 56 is, for example, an inkjet printer including a feeding mechanism for feeding a recording sheet and an inkjet head having a plurality of nuzzles and an actuator. After a user designates the copying function through the operation panel 5 and the reading operation is executed, the digital data stored in the image memory 63k is transferred to the image formation unit 56. Then, the image formation unit 56 prints an image corresponding to the received digital data on a recording sheet.

Feeding for both sides of a document in the image reading device 1 will now be explained with reference to FIGS. 2 and 3. The image reading device 1 has a function of reading both sides of a document. For execution of the reading of both sides of a document, the image reading device 1 reads a first surface of a document first, and then reads a second surface of the document.

A document placed on the paper feed tray 30 is conveyed to the read position 21*a* through the document feed path 32 while the first surface of the document being read by the reading unit 22. In this case, the document is carried at the read position 21 with the first surface of the document facing the platen glass 21. Hereafter, this feeding process is called a first feeding pass.

Next, the orientation of the document which has passed the read position 21*a* and for which the first surface has been read is reversed through the switchback path 39 so that the document is returned to the upstream portion of the document feed path 32 from the downstream portion of the document feed path 32. Consequently, the document is conveyed to the read position 21*a* so that the second surface of the document can be read by the reading unit 22. That is, the document is conveyed while the second surface of the document facing the platen glass 21. Hereafter, this feeding process is called a second feeding pass.

Next, the document which has passed the read position 21*a* and for which the second surface has been read (i.e., the document for which the both sides have been read) is lead to the switchback path 39. Through the switchback path 39, the orientation of the document is reversed so that the document is returned to the upstream part of the document feed path 32 from the downstream part of the document feed path 32. Then, the document conveyed along the document feed path 32 through the read position is ejected to the paper output tray 31. Hereafter, this feeding process is called a third feeding pass.

In summary, for a sheet of document paper, feeding for the first feeding pass is executed to read the first surface of the document. Then, the sheet of document paper for which the first surface has been read is reversed through the switchback path 39 to start the second feeding pass for reading of the second surface. Further, the document is reversed through the switchback path 39 again for the third feeding pass through the document feed path 32. When the document passes the read position 21*a* during the third feeding pass, the reading operation is not executed by the reading unit 22. Through the third feeding pass, the documents are stacked on the paper output tray 31 in the order of reading while being placed so that the second surface is oriented downward. Consequently, the arranging order of the document paper on the paper feed tray 30 can be kept also on the paper output tray 31. Therefore, there is no need to rearrange the order of pages of the document ejected on the paper output tray 31.

Since the third feed pass is provided, the time period between the time when the reading for the second surface is finished and the time when the next sheet of document paper reaches the read position 21*a* through the document feed path 32 is larger than the time period between the time when the first surface of the sheet of document paper is finished and the time when the same sheet of document paper reaches the read position 21*a* after being reversed through the switchback path 39. The reason is as follows.

That is, after the reading of the second surface of the sheet of document paper is finished, the third feeding pass for reversing the same sheet of document paper through the switchback path 39 and for feeding the same sheet of document paper through the paper feed path 32 to eject to the paper output tray 33 is performed, and thereafter the first feeding pass for feeding the next sheet of document paper to the read position 21*a* through the paper feed path 32 is performed. By contrast, after the first surface of the sheet of paper document is finished, only the second feeding pass for reversing the same sheet of document paper through the switchback path 39 and for feeding the same sheet of document paper to the reading position through the paper feed path 32 is performed.

Therefore, the image reading device 1 according to the embodiment updates the correction data after reading the second surface of the sheet of document paper, but does not update the correction data after reading the first surface of the document paper. With this configuration, it becomes possible to effectively use the timer period between the time when reading of the second surface of the sheet of document paper is finished and the time when the leading end of the next sheet of document paper reaches the read position 21*a*. Consequently, the decrease of the reading speed can be prevented. Since the correction data is updated each time the reading of the second surface of a sheet of document paper is finished, it is possible to properly update the correction data in accordance with change of the light amount.

Hereafter, the reading operation executed on the image reading device 1 is explained with reference to FIGS. 8 to 11.

Figure 8:
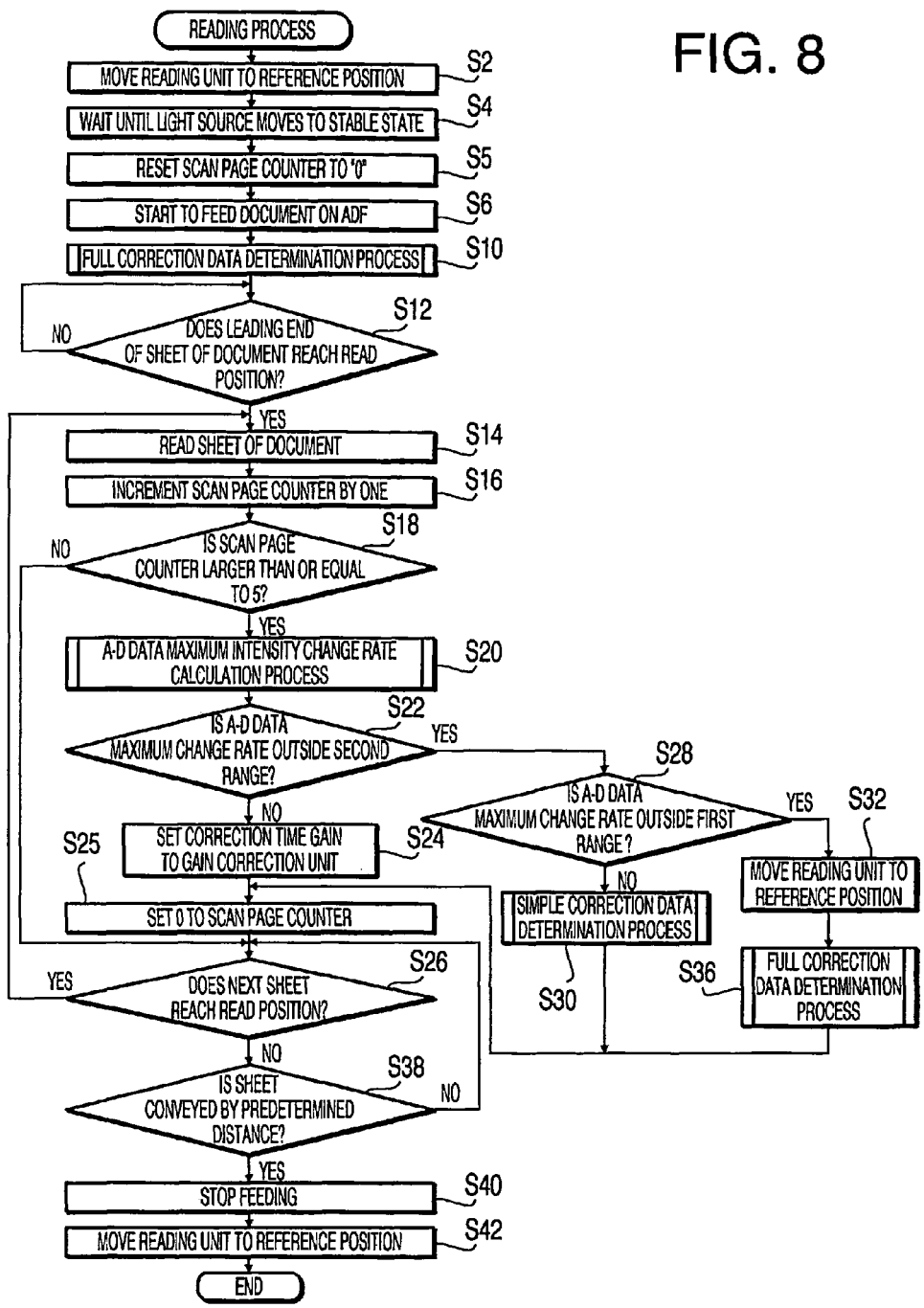
FIG. 8 is a flowchart illustrating a reading process for reading a document placed on an ADF executed by the image reading device.

FIG. 8 is a flowchart illustrating a reading process for reading a document placed on the ADF 3 under control of the CPU 61 of the image reading device 1. The reading process is started when a "start button" is pressed through the operation unit 11 after a document is placed on the ADF 3. It is noted that the reading process shown in FIG. 8 is a single side reading process for reading a single side of each sheet of document paper.

First, the reading unit 22 is moved to the position beneath the reference position 21*b* (step S2). Then, the CPU 61 waits until the light source 22*a* of the reading unit 22 moves to a stable state (step S4). More specifically, the image reading device 1 judges that the light source 22*a* has moved to the stable state in response to the fact that change of the light amount per a unit time becomes smaller than or equal to a predetermined amount. Alternatively, the image reading device 1 may judge that the light source 22*a* has moved to the stable state when a sufficient time period has elapsed from activation of the light source 22*a* (or from power-on of the image reading device 1). In this case, step S4 may be skipped.

Then, the scan page counter 63*j* is reset to "0" (step S5), and the image reading device 1 starts to feed the document placed on the paper feed tray 30 of the ADF 3 (step S6). Next, a full correction data determination process is executed (step S10). The full correction data determination process is a process for determining gain correction data, black correction data and shading correction data. The full correction data determination process is explained in detail later with reference to FIG. 10.

Next, the image reading device 1 judges whether the leading end of a sheet of document paper has reached the read position 21*a* (step S12). The image reading device 1 waits until the leading end reaches the read position 21*a* (S12: NO). When the leading end of the sheet of document paper reaches the read position 21*a* (S12: YES), the image reading device 1 reads the sheet of document paper (step S14).

After thus finishing the reading of one page, the scan page counter 63*j* is incremented by 1 (step S16). Then, the image reading device 1 judges whether the scan page counter 63*j* has reached "5" (step S18). Since at first the scan page counter 63*j* is smaller than "5" (S18: NO), control proceeds to step S26 where the image reading device 1 judges whether the leading end of a next sheet of document paper has reached the read position 21*a*. If the leading end of the next sheet has not reached the read position 21*a* (S26: NO), the image reading device 1 judges whether feeding of the sheet has been performed for a distance longer than or equal to a predetermined distance (step S38). If the feeding of the sheet has not been performed for the predetermined distance yet (S38: NO), control returns to step S26.

When the image reading device 1 judges that the leading end of the next page has reached the read position 21a while steps S26 and S38 are repeated, control returns to step S14 to start the reading of the next page.

When five pages of the document have been read while the loop process (S14, S16, S18, S26) is repeated, the image reading device 1 judges that the scan page counter 63j becomes larger than or equal to 5 (S18: YES). In this case, an A-D data maximum intensity change rate calculation process (S20) which is explained later (FIG. 9) is executed. The A-D data maximum intensity change rate calculation process is a process for calculating, during a time interval between the time when the rear end of a page passes the read position 21a and the time when the leading end of a next page reaches the read position 21a, an A-D data maximum change rate representing the change amount of light of the light source 22a caused between the current time and the time of the immediately preceding determination of the shading correction data.

Next, the image reading device 1 judges whether the calculated A-D data maximum change rate is outside the second range 62b (step S22). For example, the second range 62b is set to the −2% to +2% range. In this case, if the A-D data maximum change rate is smaller than −2% or larger than +2%, the image reading device 1 judges that the A-D data maximum change rate is outside the second range 62b (S22:YES). Then, the image reading device 1 judges whether the A-D data maximum change rate is outside the first range 62a (step S28).

For example, the first range 62a is set to −5% to +5% range. In this case, if the A-D data maximum change rate is smaller than −5% or larger than +5%, the image reading device 1 judges that the A-D data maximum change rate is outside the first range 62a (S28: YES). That is, in this case, the change amount of light of the light source 22a between the current time and the time of the immediately preceding determination of the shading correction data is large. Therefore, the image reading device 1 moves the reading unit 22 to the position beneath the reference position 21b to update the shading correction data (step S32).

Then, the full correction data determination process (S36) is executed. The full correction data determination process executed in step S36 is the same as that executed in step S10. Through the full correction data determination process, the gain correction data, the black correction data, and the shading correction data are determined, and are stored in the correction time gain area 63a, the shading correction data area 63c and the black correction data area 63e, respectively. Next, the scan page counter 63j is set to "0" (step S25). Then, reading of the next sheet of document paper is started.

Referring back to S22, if the A-D data maximum change rate is outside the second range 62b (S22:YES) and if the A-D data maximum change rate is within the first range 62a (S28: NO), the change amount of light does not need the update of the shading correction data. Therefore, in this case, the image reading device 1 executes a simple correction data determination process where the image reading device 1 determines the temporary gain, and sets the temporary gain to the gain correction unit 22c1. After the temporary gain is determined in the simple correction data determination process, the image reading device 1 sets the scan page counter 63j to "0" (step S25). Then, the reading of the next sheet of document paper is started.

With this configuration, for the reading of five pages of document paper after determination of the temporary gain, the image signal of the image sensor 22b can be subjected to the gain correction in accordance with the thus determined temporary gain. Therefore, even if the light amount has changed from the last execution of the full correction data determination process, the gain correction can be properly performed through use of the temporary gain corresponding to the change of the light amount.

If the A-D data maximum change rate is within the second range 62b (S22: NO), correction time gain stored in correction time gain area 63a is set to the gain correction unit 22c1 (step S24). Then, the scan page counter 63j is set to "0". Then, a next page is read. That is, if change of the light amount between the current time and the immediately preceding execution of the full correction data determination process is small, the gain, the black correction data, and the shading correction data determined in the immediately preceding execution of the full correction data determination process are used for the reading of next five pages.

If the image reading device judges that feeding for the predetermined distance has executed before the leading end of the next sheet of document paper reaches the read position 21a (S38: YES), no document remains. Therefore, in this case, the image reading device 1 stops the feed rollers 35A, 35B, 35C and 35D (step S40), and moves the reading unit 22 to the position beneath the reference position 21b (step S42). Then, the reading process terminates.

Hereafter, the A-D data maximum intensity change rate calculation process (S20) is explained with reference to FIG. 9. In the A-D data maximum intensity change rate calculation process, a page interval A-D maximum intensity is determined, and based on the page interval A-D maximum intensity and the correction time A-D maximum intensity determined in the immediately preceding execution of the full correction data determination process, the A-D maximum intensity change rate is determined.

Before explaining the A-D data maximum intensity change rate calculation process, the evaluation reference gain 62c is explained. As described above, to determine the page interval A-D maximum intensity, the reading unit 22 reads the document presser foot 19 for one line, and the image signal corresponding to the one line is amplified by the gain correction. Further, the amplified image signal is converted into digital data by A-D conversion through the A-D conversion unit 22c2.

In the case where the image signal is amplified by the gain determined in the immediately preceding execution of the full correction data determination process (S10 or S36) and the determined gain is set to the A-D conversion unit 22c2, the image signal may exceed the maximum conversion level which the A-D conversion unit 22c2 is able to convert (i.e., the saturation level of the A-D conversion unit 22c2) if the light amount increases rapidly between the immediately preceding execution of the full correction data determination and the current time. In this case, effective values can not be obtained for evaluation of the change amount of light.

In order to prevent the image signal obtained by reading the document presser foot 19 from reaching the saturation level of the A-D conversion unit 22c2, the image reading device 1 sets a predetermined evaluation reference gain 62c to the gain correction unit 22c1 and thereafter reads the document presser foot 19.

The evaluation reference gain 62c is set to a value sufficiently lower than the gain determined in the full correction data determination process (S10, S36) or the gain determined in the simple correction data determination process (S30). For example, the evaluation reference gain 62c is set to "1". By using such a low gain for the gain correction, it is possible to prevent the image signal from reaching to the saturation level of the A-D conversion unit 22c2. Consequently, it becomes possible to determine a useful page interval A-D maximum intensity used for properly evaluating the change amount of light even if the light amount increases rapidly.

Figure 9:
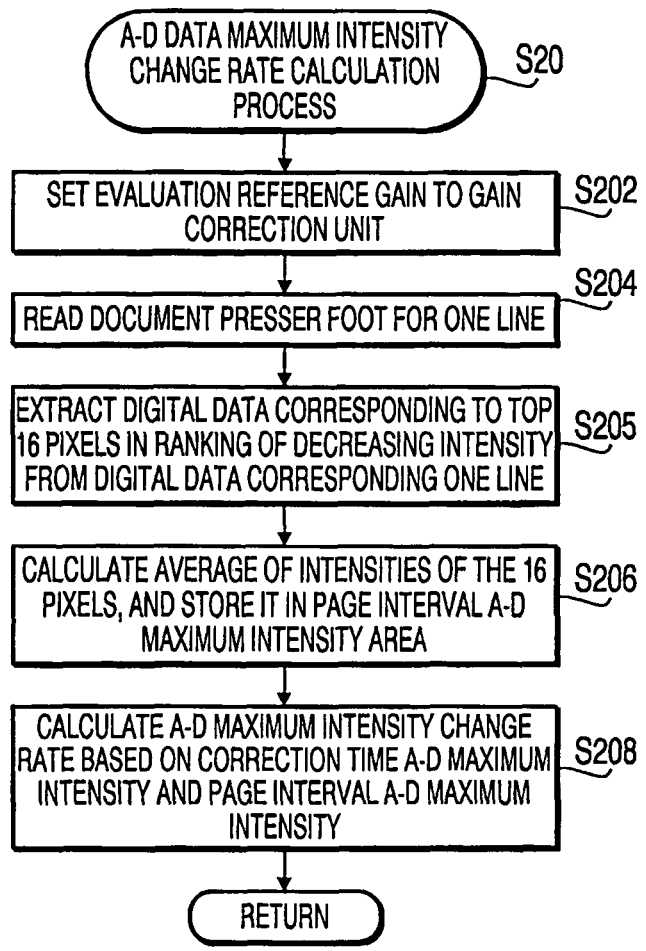
FIG. 9 is a flowchart illustrating an A-D data maximum intensity change rate calculation process executed by the image reading device.

As shown in FIG. 9, the image reading device 1 sets the evaluation reference gain 62c to the gain correction unit 22c1 (step S202). Then, the image reading device 1 reads the document presser foot 19 for one line (step S204). The image signal corresponding the one line is subjected to the gain correction in accordance with the evaluation reference gain 62c defined in step S202.

The image signal for one line is subjected to the gain correction and the A-D conversion in the AEF 22c to generate the digital data corresponding to the one line. Then, digital data corresponding to top 16 pixels in the ranking of decreasing intensity is extracted (step S205). The digital data extracted at this state is data not subjected for the black correction and the shading correction. Then, the average of intensities of the 16 pixels (i.e., the page interval A-D maximum intensity) is calculated, and is stored in the page interval A-D maximum intensity area 63g (step S206).

Next, the A-D maximum intensity change rate is calculated based on the correction time A-D maximum intensity stored in the correction time A-D maximum intensity area 63f and the page interval A-D maximum intensity (step S208).

In the reading process, the A-D maximum intensity change rate calculated as described above is used to evaluate the change amount of light from the immediately preceding execution of the full correction data determination (S10, S36).

According to the above described A-D data maximum intensity change rate calculation process, the A-D maximum intensity change rate for evaluating the change amount of light can be calculated while the reading unit 22 is kept at the position beneath the read position 21a, without moving the reading unit 22 to the position beneath the reference position 21b. Therefore, there is no need for the reading unit 22 to reciprocate between the reference position 21b and the read position 21a. Consequently, it is possible to quickly start the reading of the next page. Since the page interval A-D maximum intensity is determined through the digital data obtained by reading the document presser foot 19, it is possible to properly evaluate the change amount of light in accordance with the output of the image sensor 22b which actually serves as a component for reading a document.

Since the A-D data maximum intensity change rate calculation process is executed by the time when the next pages reaches the read position 21a, the time period from the time when the immediately preceding page has passed the read position 21a to the time when the next page reaches the read position 21a can be effectively used. Consequently, the time required for the reading operation can be decreased.

Figure 10:
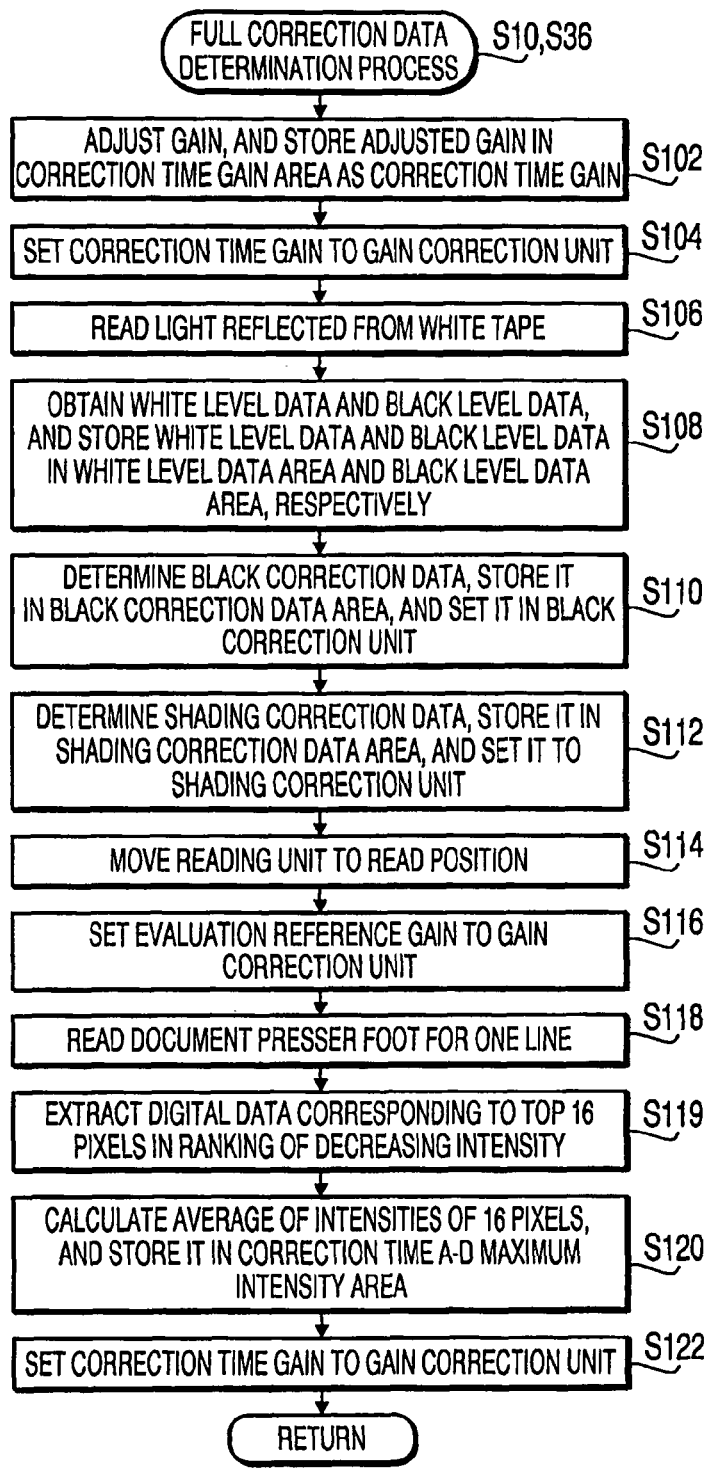
FIG. 10 is a flowchart illustrating a full correction data determination process executed by the image reading device.

Hereafter, the full correction data determination process executed under control of the CPU 61 of the image reading device 1 is explained with reference to FIG. 10. As described above, the reading unit 22 has moved to the position beneath the reference position 21b before the full correction data determination process is started.

First, the image sensor 22b of the reading unit 22 situated beneath the reference position 21b is controlled to read the white tape 21c, and the gain is adjusted such that the maximum intensity of the image signal from the image sensor 22b matches the predetermined reference level inputted to the A-D conversion unit 22c2. The gain thus determined is stored in the correction time gain area 63a as the correction time gain (step S102).

Next, the correction time gain is set to the gain correction unit 22c1 (step S104). Then, the image reading device 1 reads a region corresponding to 16 lines while moving the reading unit 22 for a distance corresponding to 16 lines under the reference position 21b to obtain digital data (step S106). The digital data corresponding to 16 lines includes white level data obtained by a part of the image sensor 22b corresponding to a position to which light reflected from the white tape 21c enters and black level data obtained by a part of the image sensor 22b located within a light shielding region where reflected light does not enter the image sensor 22b. The white level data is stored in the white level data area 63b, while the black level data is stored in the black level data area 63d (step S108).

Next, the black correction data is determined based on the black level data, and the black correction data is stored in the black correction unit 66a of the ASIC 66 (step S110). Then, the shading correction data is determined based on the white level data, and the shading correction data is stored in the shading correction unit 66b of the ASIC 66 (step S112).

Then, the reading unit 22 is moved from the reference position 21b to the read position 21a (step S114). Consequently, a target for illumination of the light source 22a is changed from the reference position 21b to the read position 21a.

Next, the evaluation reference gain 62c is set to the gain correction unit 22c1 (step S116) to obtain the correction time A-D maximum intensity in steps from S116. As described above, the A-D maximum intensity change rate for evaluating the change amount of light is determined based on the correction time A-D maximum intensity and the page interval A-D maximum intensity. Therefore, the correction time A-D maximum intensity is determined in accordance with the evaluation reference gain 62c which is equal to the gain used to calculate the page interval A-D maximum intensity so that the change amount of light can be evaluated properly.

Next, the reading unit 22 situated beneath the read position 21a reads the document presser foot 19 for one line to obtain digital data corresponding to one line (step S118). The image signal corresponding to one line is subjected to the gain correction in accordance with the evaluation reference gain 62c set at S116.

Next, the image signal corresponding to one line is subjected to the gain correction in the AFE 22c and is subjected to the A-D conversion to obtain digital data for one line. Then, digital data corresponding to top 16 pixels in the ranking of decreasing intensity is extracted (step S119). Next, the average of the intensities of the 16 pixels is calculated and is stored in the correction time A-D maximum intensity area 63f (step S120). That is, the correction time A-D maximum intensity is stored.

The correction time gain is set to the gain correction unit 22c1 (step S122). Then, the full correction data determination process terminates. According to the full correction data determination process, the gain and the shading correction data are determined in accordance with the current amount of light from the light source 22a. For reading of next 5 pages, the correction is performed in accordance with the newly determined gain and the shading correction data. Therefore, it is possible to properly execute the correction in accordance with the current light amount from the light source 22a.

Figure 11:
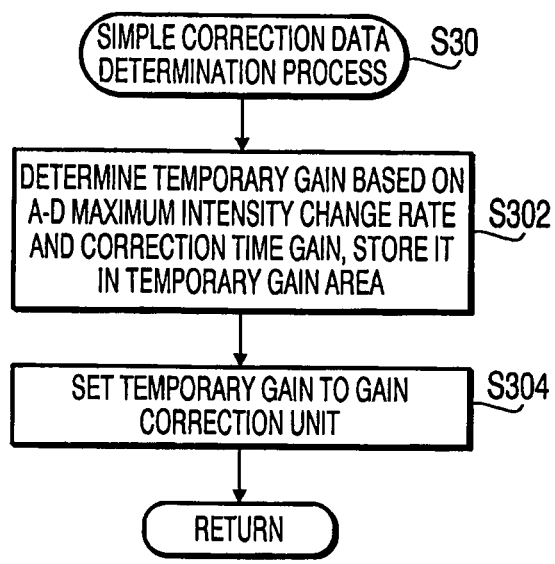
FIG. 11 is a flowchart illustrating a simple correction data determination process executed by the image reading device.

Hereafter, the simple correction data determination process executed under control of the CPU 61 of the image reading device 1 is explained with reference to FIG. 11.

First, the temporary gain is determined based on the A-D maximum intensity change rate and the correction time gain, and the temporary gain is stored in the temporary gain area 63$i$ (step S302). The temporary gain is calculated, for example, by the following equation (2).

$$\text{(temporary gain)}=\text{(correction time gain)} \times 100/(100+ \text{(A-D maximum intensity change rate))} \quad (2)$$

That is, as an alternative to determining the gain based on light reflected from the white tape 21$c$, the proper gain corresponding to the change amount of light is determined by applying the A-D maximum intensity change rate representing the change amount of light (representing the change amount of light from the immediately preceding determination of the full correction data) to the gain determined in the immediately preceding execution of the full correction data determination process.

Next, the temporary gain is set to the gain correction unit 22$c$1 (step S304). Then, the simple correction data determination process terminates. According to the simple correction data determination process, a gain matching the change amount of light can be obtained without returning the reading unit 21$b$ to the reference position 21$b$. For reading of 5 pages after determination of the temporary gain, the intensity of the image signal can be properly corrected through the temporary gain.

Since there is no need to return the reading unit 22 to the reference position 21$b$, it is possible to quickly start the reading of the next page.

The image reading device 1 according to the first embodiment executes the full correction data determination process in response to the fact that the digital data obtained by reading the document presser foot 19 satisfies a predetermined condition. If the change amount of light from the immediately preceding execution of the full correction data determination process is relatively small, the full correction data determination process is not executed. Therefore, there is no need to return the reading unit 22 to the reference position 21$b$. Consequently, it becomes possible to quickly start reading of the next page and thereby to decrease the time for the reading operation.

On the other hand, if the change amount of light from the immediately preceding execution of the full correction data determination process is relatively large, the full correction data determination process is executed. Therefore, it is possible to update the correction data at appropriate timing and therefore to suitably execute the gain correction and the shading correction.

As a variation of the reading process shown in FIG. 8, the full correction data determination process (S36) may be executed without processing step S28. That is, in this case, the simple correction data determination process (S30) is omitted.

The judgment step (S28) for judging whether the A-D maximum intensity change rate is outside the first range may be executed without executing the judgment step (S22) for judging whether the A-D maximum intensity change rate is outside the second range, and the full correction data determination process may be executed if the A-D maximum intensity change rate is outside the first range.

Since the correction data is determined and updated if the image data outputted by the reading unit satisfies the predetermined condition, the update of the correction data can be performed at appropriate timing. It is also possible to reduce the number of executions of switching of the reading unit between the read position and the reference position.

Second Embodiment

Hereafter, an image reading device according to a second embodiment is described. Since the image reading device according to the second embodiment has substantially the same hardware structure as that of the image reading device 1 according to the first embodiment, explanation thereof will not be repeated. In the following, the drawings illustrating the hardware configuration of the image reading device 1 (e.g., FIGS. 1-3, 4 and 6) are also referred to for the explanations of the second embodiment.

In the first embodiment, the A-D maximum intensity change rate is calculated based on the correction time A-D maximum intensity and the page interval A-D maximum intensity, and the judgment on whether to execute the full correction data determination process is made based on the A-D maximum intensity change rate. By contrast, in the second embodiment, an A-D data change rate is calculated while reflecting not only the maximum intensity but also the minimum intensity, and the judgment on whether to execute the full correction data determination process is made based on the A-D data change rate.

In the first embodiment, digital data corresponding to top 16 pixels in the ranking of decreasing intensity is extracted from the digital data obtained by the reading unit 22, and the average calculated from the intensities of the 16 pixels is stored as the correction time A-D maximum intensity in the correction time A-D maximum intensity area 63$f$.

By contrast, according to the second embodiment, from the digital data obtained by the reading unit 22 moved to the read position 21$a$ after the determination of the shading correction data and the black correction data, digital data corresponding one pixel having the maximum intensity is extracted as the correction time A-D maximum intensity and is stored in the RAM 63.

In the image reading device 1 according to the second embodiment, the position of the pixel exhibiting the maximum intensity along the main scanning direction is stored as a maximum intensity position in the RAM 63.

In the first embodiment, digital data corresponding to top 16 pixels in the ranking of decreasing intensity is extracted from the digital data obtained by the reading unit 22 by reading light reflected from the document presser foot 19 for one line, and the average of the intensities of the 16 pixels is defined as the page interval A-D maximum intensity.

By contrast, according to the second embodiment, digital data of the pixel corresponding to the maximum intensity position stored in the RAM 63 is defined as the page interval A-D maximum intensity, and is stored in the RAM 63. That is, the correction time A-D maximum intensity and the page interval A-D maximum intensity are data obtained from the same pixel having the same position along the main scanning direction.

In the image reading device 1 according to the second embodiment, from the digital data obtained by the reading unit 22 moved to the read position 21$a$ after the determination of the shading correction data and the black correction data, digital data corresponding one pixel having the minimum intensity is extracted as a correction time A-D minimum intensity and is stored in the RAM 63. The position of the pixel exhibiting the minimum intensity along the main scanning direction is stored as a minimum intensity position in the RAM 63.

During the time period between the time when the rear end of one page for which the reading operation is finished has passed the read position 21$a$ and the time when the leading end of the next page reaches the read position 21$a$ (i.e., during a page interval in which no document is situated at the read position 21$a$), the minimum intensity of the digital data obtained by the reading unit 22 located beneath the read position 21$a$ is stored in the RAM 63 as the page interval A-D minimum intensity. More specifically, digital data of the pixel corresponding to the minimum intensity position is extracted as the page interval A-D minimum intensity. In other words, the correction time A-D minimum intensity and the page interval A-D minimum intensity are data obtained from the same pixel having the same position along the main scanning direction.

In the image reading device 1 according to the second embodiment, an A-D minimum intensity change rate which is the change amount of the page interval A-D minimum intensity with respect to the correction time A-D minimum intensity is calculated, and is stored in the RAM 63. More specifically, the A-D minimum intensity change rate is obtained by the following equation (3).

$$\text{(A-D minimum intensity change rate)}=\{\text{(page interval A-D minimum intensity)}/\text{(correction time A-D minimum intensity)}-1\}\times 100 \quad (3)$$

In the image reading device 1 according to the second embodiment, a maximum intensity A-D data change rate which is the change amount of the page interval A-D maximum intensity with respect to the correction time A-D maximum intensity is calculated, and is stored in the RAM 63. More specifically, the maximum intensity A-D data change rate is obtained by the following equation (4).

$$\text{(maximum intensity A-D data change rate)}=\{\text{(page interval A-D maximum intensity)}/\text{(correction time A-D maximum intensity)}-1\}\times 100 \quad (4)$$

In the image reading device 1 according to the second embodiment, an A-D data change rate representing the change amount of light of the light source 22*a* from the immediately preceding execution of the full correction data determination process is calculated and is stored in the RAM 63. The image reading device 1 according to the second embodiment judges whether to execute the full correction data determination process based on the A-D data change rate.

More specifically, the A-D data change rate is obtained by the following equation (5).

$$\text{(A-D data change rate)}=\text{(maximum intensity A-D data change rate)}/\text{(A-D minimum intensity change rate)} \quad (5)$$

Referring back to FIG. 7, the A-D data change rate used for evaluation of the change amount o flight is explained.

As shown in FIG. 7, at the edge portions of the image signal along the main scanning direction, the amount of intensity variation with time is relatively small. On the other hand, in the central portion of the image signal, the amount of intensity variation with time is relatively large. This means that the maximum intensity A-D data change rate exhibits a relatively large value because the maximum intensity A-D data change rate is affected strongly by the relatively large amount of intensity variation with time while the A-D minimum intensity change rate exhibits a smaller value than the maximum intensity A-D data change rate because the A-D minimum intensity change rate is not affected by the intensity variation with time. Such a difference between the maximum intensity A-D data change rate and the A-D minimum intensity change rate becomes larger with the increase of the change amount of light of the light source 22*a*. Therefore, the A-D data change rate increases with the increase of the change amount of light of the light source 22*a*.

Therefore, by comparing an A-D data change threshold with the A-D data change rate and evaluating the change amount of flight, the image reading device 1 according to the second embodiment judges whether to execute the full correction data determination process.

Figure 13:
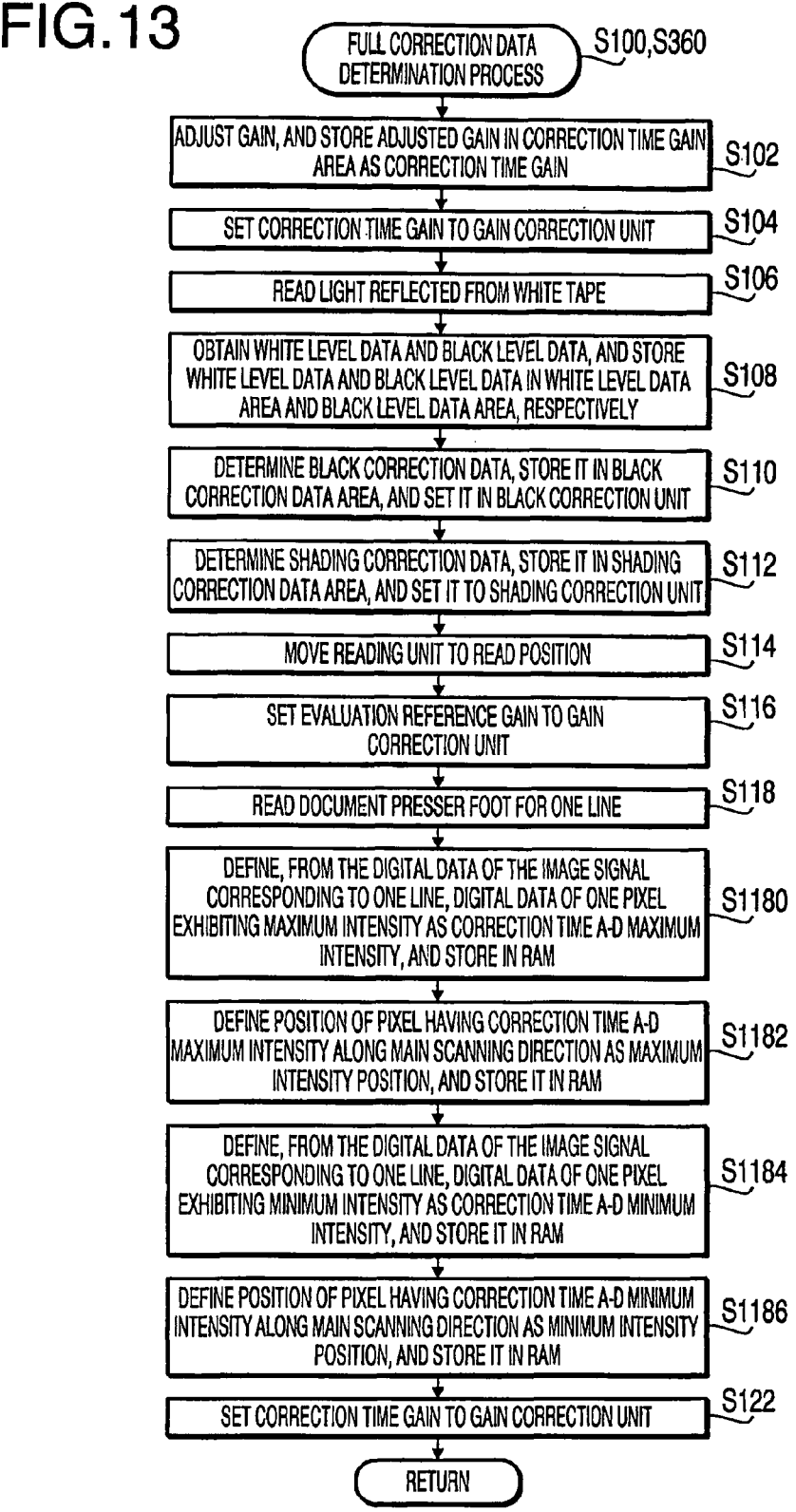
FIG. 13 is a flowchart illustrating a full correction data determination process according to the second embodiment.
Figure 14:
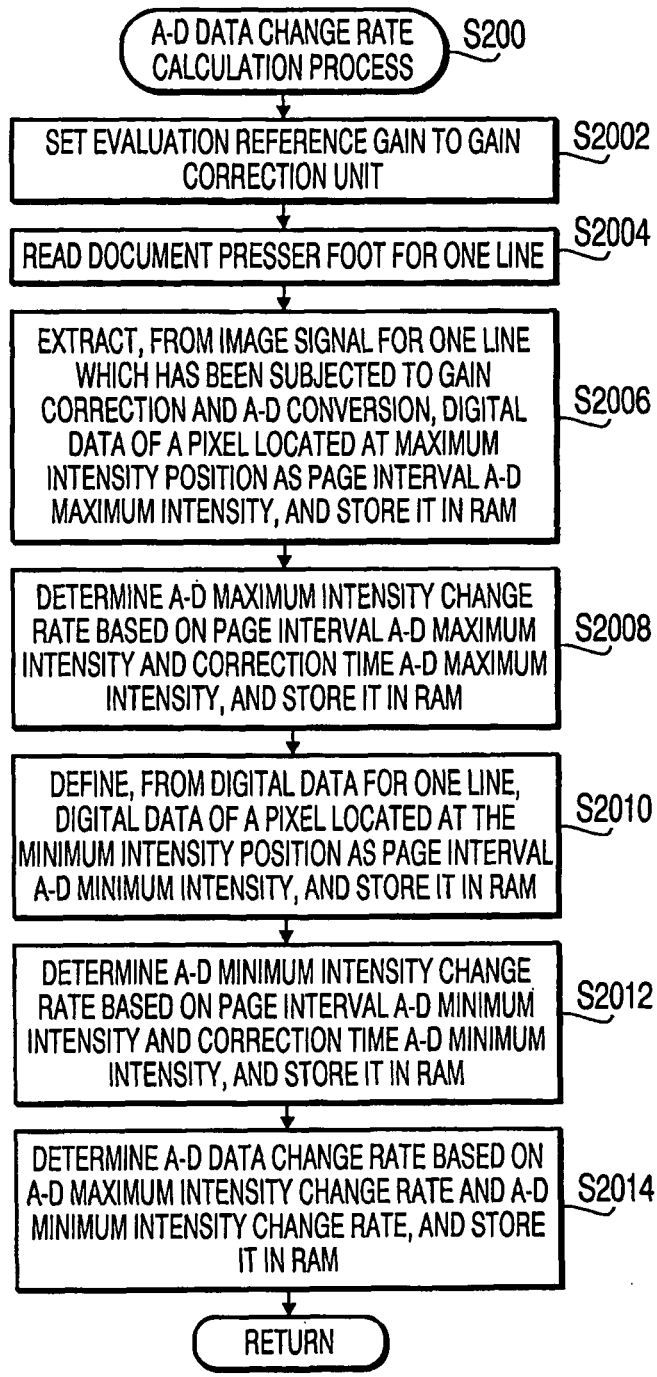
FIG. 14 is a flowchart illustrating an A-D data change rate calculation process executed by the image processing device.

Hereafter, the operation of the image reading device 1 according to the second embodiment is explained with reference to FIGS. 12 to 14.

Figure 12:
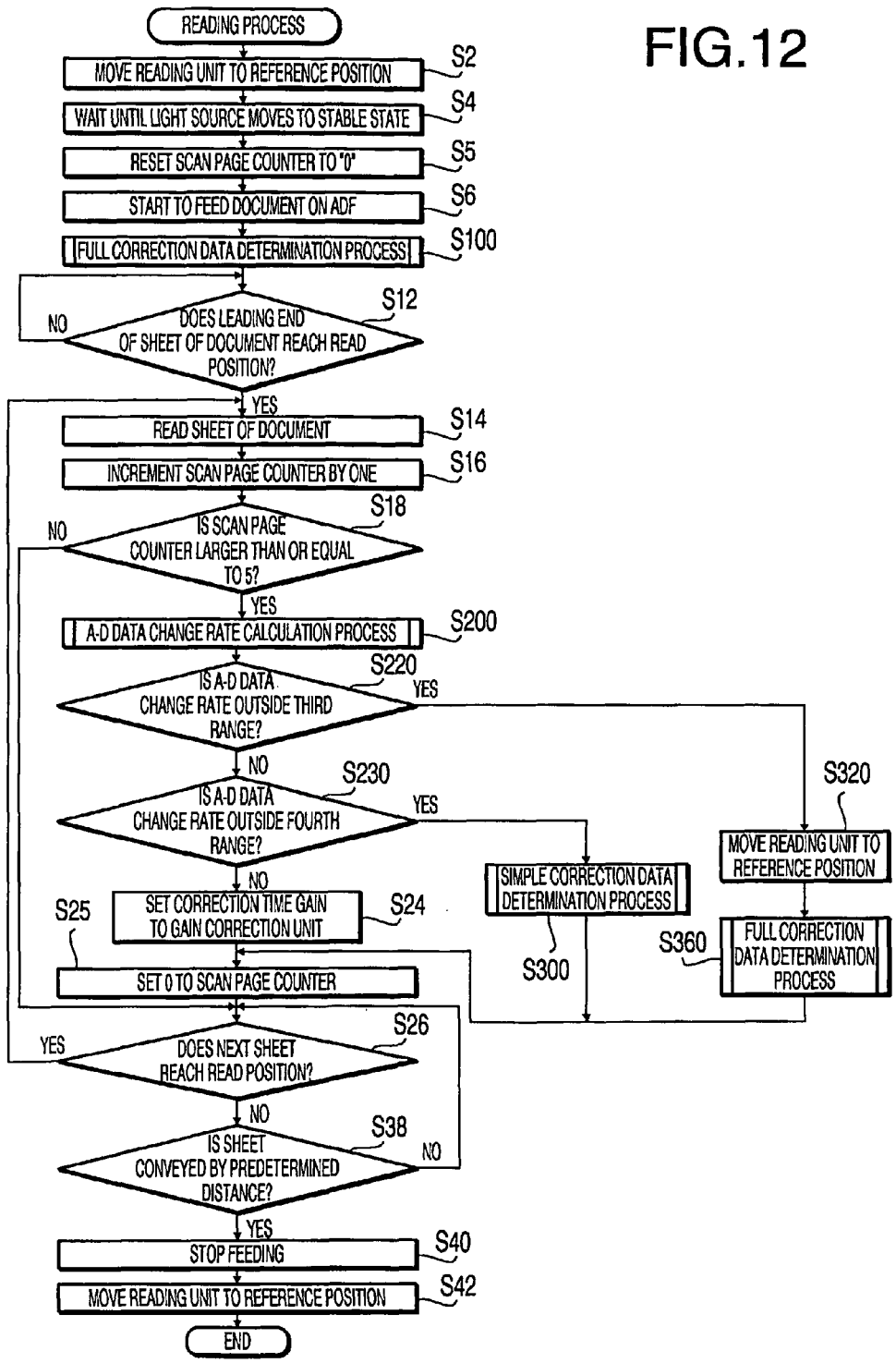
FIG. 12 is a flowchart illustrating a reading process executed by the image reading device according to a second embodiment.

FIG. 12 is a flowchart illustrating a reading process executed by the image reading device 1 according to the second embodiment. In FIG. 12, to steps which are substantially the same as those of the reading process shown in FIG. 8, the same step numbers are assigned, and explanations thereof will not be repeated.

It should be noted that, although a full correction data determination process according to the second embodiment includes determination of the gain, the black correction data and the shading correction data, the feature of the full correction data determination process according to the second embodiment differs slightly from the full correction data determination process according to the first embodiment. The full correction data determination process according to the second embodiment is explained later with reference to FIG. 13.

As shown in FIG. 12, if the scan page counter 63*j* becomes larger than or equal to 5 (S18: YES), the change amount of light from the immediately preceding execution of the full correction data determination process is evaluated as in the case of the reading process (FIG. 8) of the first embodiment. An A-D data change rate calculation process (S200) for determining the maximum intensity A-D data change rate, the A-D minimum intensity change rate and the A-D data change rate is explained later with reference to FIG. 14.

Next, the image reading device 1 judges whether the calculated A-D data change rate is outside a third range (step S220). If the A-D data change rate is outside the third range (S220: YES), the change amount of light of the light source 22*a* from the immediately preceding execution of the full correction data determination process is large. Therefore, in this case, the reading unit 22 is moved to the position beneath the reference position 21*b* to execute the full correction data determination process (step S320). The third range may be stored in the ROM 62.

Then, the full correction data determination process (S360) is executed. Through the full correction data determination process, the gain correction value, the black correction data, and the shading correction data are determined, and the correction time gain area 63*a*, the shading correction data area 63*c* and the black correction data area 63*e* are updated. Next, the scan page counter is set to "0" to start the reading of the next sheet of document paper.

If the A-D data change rate is within the third range (S220: NO), the image reading device 1 judges whether the maximum intensity A-D data change rate calculated in the A-D data change rate calculation process (S200) is outside a fourth range (step S230). If the maximum intensity A-D data change rate is outside the fourth range (S230: YES), the maximum intensity of the image signal read by the image sensor 22*b* exhibits a relatively large change amount. In this case, the temporary gain is determined by a simple correction data determination process (S300), and the determined temporary gain is set to the gain correction unit 22*c*1.

In the simple correction data determination process (S30) according to the first embodiment, the temporary gain is calculated based on the maximum intensity A-D data change rate and the correction time gain. By contrast, in the simple correction data determination process (S300) according to the second embodiment, the temporary gain is determined, for example, by the following equation (6).

$$\text{(temporary gain)}=(\text{(correction time gain)}\times 100)/(100+\text{(maximum intensity A-D data change rate)}) \quad (6)$$

By thus determining the temporary gain, the image signal from the image sensor 22b can be subjected to the gain correction through use of the temporary gain for reading 5 pages of document paper. Therefore, even if the change of the light amount occurs from the immediately receding execution of the full correction data determination process, it is possible to properly execute the gain correction through use of the temporally gain corresponding to the change amount of light.

Referring back to S220, if the calculated A-D data change rate is within the third range (S220: NO), the correction time gain stored in the correction time gain area 63a is set to the gain correction unit 22c1 (step S24). Next, the scan page counter 63j is set to "0" (step S25) to read the next page. That is, if the change amount of light from the immediately preceding execution of the full correction data determination process (S100, S360) is relatively small, the gain, the black correction data and the shading correction data determined by the immediately preceding execution of the full correction data determination process (S10,S36) are used for the next reading of 5 pages of document paper. For example, values of the first range and the second range of the first embodiment may be used as the third range and the fourth range, respectively.

Hereafter, the full correction data determination process (S100, S360) executed by the image reading device 1 according to the second embodiment is explained with reference to FIG. 13. In FIG. 13, to steps which are substantially the same as those of the full correction data determination process (S10,S36) according to the first embodiment, the same step numbers are assigned and explanations thereof will not be repeated. In the full correction data determination process (S100, S360) according to the second embodiment, steps S1180, S1182, S1184, S1186 are executed in place of steps S119 and S120 of the full correction data determination process (S10, S36) of the first embodiment.

In the full correction data determination process (S100, S360) according to the second embodiment, the gain, the black correction data, the shading correction data are determined as in the case of the full correction data determination process (S10,S36) of the first embodiment. Then, the reading unit 22 is moved to the read position 21a (S114), and the evaluation reference gain is set to the gain correction unit 22c1 (step S116). Then, the document presser foot 19 is read by the reading unit 22 for one line (step S118).

Next, from the digital data of the image signal corresponding to one line is subjected to the gain correction and the A-D conversion by the AFE 22c, digital data of one pixel exhibiting the maximum intensity is defined as the correction time A-D maximum intensity, and is stored in the RAM 63 (step S1180). Then, the position of the pixel having the correction time A-D maximum intensity along the main scanning direction is defined as a maximum intensity position (step S1182).

Next, from the digital data corresponding to one line obtained in step S118, digital data of one pixel exhibiting a minimum intensity is defined as a correction time A-D minimum intensity, and is stored in the RAM 63 (step S1184). Then, the position of the pixel having the correction time A-D minimum intensity along the main scanning direction is defined as a minimum intensity position (step S1186).

According to the full correction data determination process of the second embodiment (S100, S360), the maximum intensity, the minimum intensity and positions thereof along the main scanning direction are stored in the RAM 63.

Hereafter, the A-D data change rate calculation process (S200) executed by the image processing device 1 is explained with reference to FIG. 14. In the A-D data change rate calculation process (S200), the page interval A-D maximum intensity and the page interval A-D minimum intensity are determined, and the A-D data change rate is determined based on the page interval A-D maximum intensity and the page interval A-D minimum intensity.

First, the evaluation reference gain 62c is set to the gain correction unit 22c1 to read light reflected from the document presser foot 19 for one line (step S2002, S2004). Next, from the image signal for one line which has been subjected to the gain correction and the A-D conversion, digital data of a pixel located at the maximum intensity position is extracted and is stored in the RAM 63 (step S2006).

Next, the maximum intensity A-D data change rate is determined from the page interval A-D maximum intensity and the correction time A-D maximum intensity stored in the correction time A-D maximum intensity area 63f, and is stored in the RAM 63 (step S2008).

Next, from digital data for one line obtained in step S2004, digital data of a pixel located at the minimum intensity position is defined as the page interval A-D minimum intensity, and is stored in the RAM 63 (step S2010).

Next, the A-D minimum intensity change rate is determined from the page interval A-D minimum intensity and the correction time A-D minimum intensity stored in the RAM 63, and is stored in the RAM 63 (step S2012).

Then, the A-D data change rate is determined based on the maximum intensity A-D data change rate and the A-D minimum intensity change rate, and is stored in the RAM 63 (step S2014). Then, the A-D data change rate calculation process terminates.

According to the A-D data change rate calculation process, each of the page interval A-D maximum intensity and the page interval A-D minimum intensity is determined based on the intensity of a pixel at a position along the main scanning direction. Therefore, it is possible to quickly obtain the digital data of the intensity of the target pixel. By contrast, if a value of the maximum intensity pixel and a value of the minimum intensity pixel are obtained by searching the digital data corresponding to one line and the searched values are used to determine the page interval A-D maximum intensity and the page interval A-D minimum intensity, the processing time increases due to processing of searching for values of the maximum intensity and the minimum intensity.

It is should be noted that, in addition to the above described advantages, the image processing device 1 according to the second embodiment is able to achieve the advantages attained by the first embodiment.

Third Embodiment

Hereafter, an image reading device according to a third embodiment is described. Since the image reading device according to the third embodiment has substantially the same hardware structure as that of the image reading device 1 according to the first embodiment, explanation thereof will not be repeated. In the following, the drawings illustrating the hardware configuration of the image reading device 1 (e.g., FIGS. 1-3, 4 and 6) are also referred to for explanations of the third embodiment.

When a document having a number of pages is read, the image reading device 1 may move to a waiting state where reading of a next page is stopped after the reading of the immediately preceding page is finished because of data processing for data read from the immediately preceding page. For example, if the image reading device 1 has the function of transferring the image data of the immediately preceding page to an external device, or if the image reading device 1 is configured to execute an image data processing for the image data of the immediately preceding page, a relatively long waiting time for waiting for completion of the data transferring or the image data processing is required. In this case, the image reading device is required to wait for a relatively long time until the image reading device 1 gets ready for reading of a next page.

In this case, if the shading correction data is determined immediately after completion of the reading of a page and the shading correction data thus determined is used for the correction of the image signal of a next page, a possibility that the light amount changes by a relatively large amount from the time when the reading of the immediately preceding page is finished. In this case, the correction of the image signal of the next page may become inappropriate.

Such a draw back also arises if the image reading device 1 needs to wait until free space of a memory for storing the image data is secured after once the memory space becomes short. The third embodiment is provided in consideration of such drawbacks.

Hereafter, operations of the image reading device 1 according to the third embodiment is explained with reference to FIGS. 15 to 17.

Figure 15:
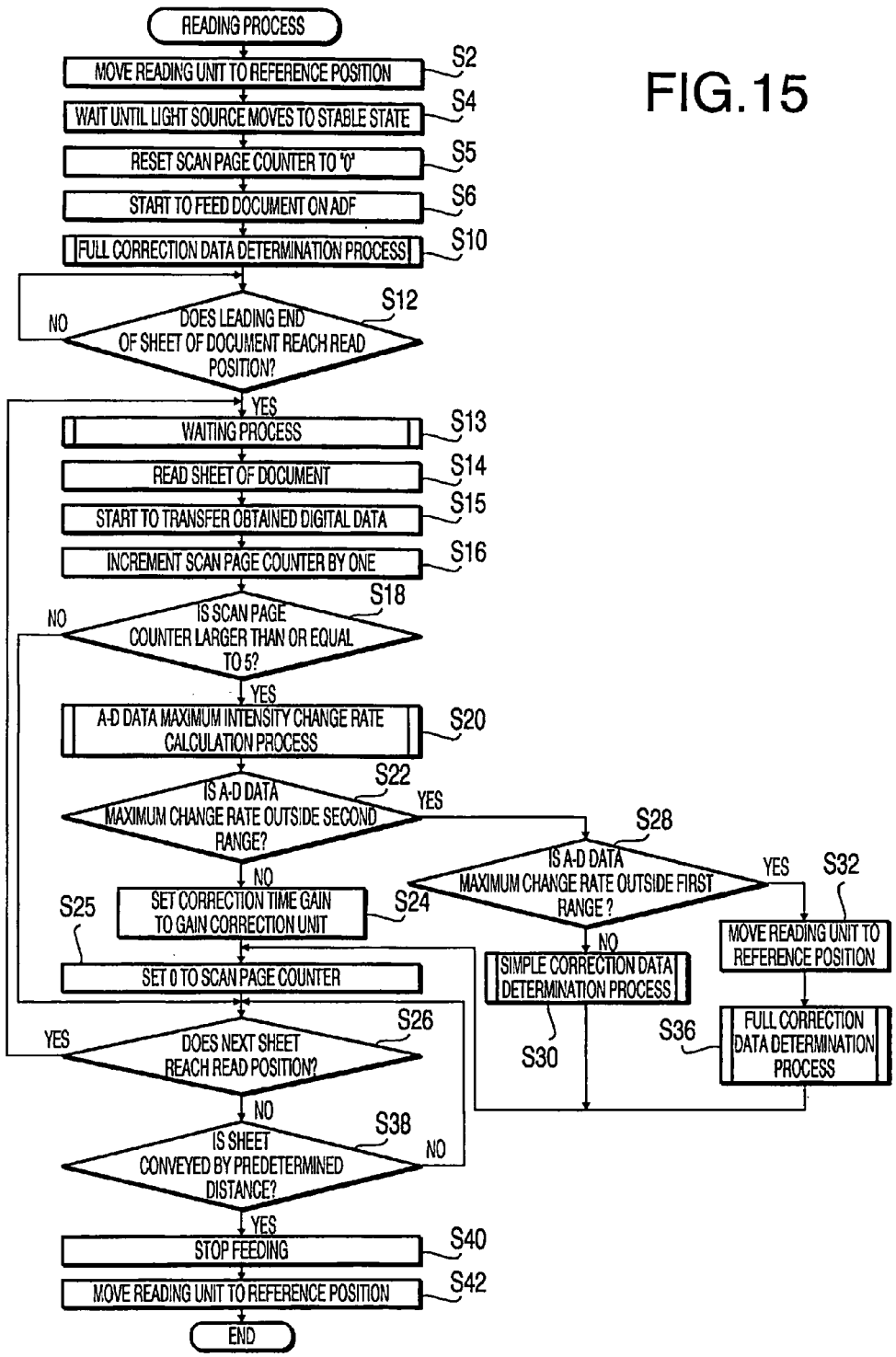
FIG. 15 is a flowchart illustrating a reading process executed by the image reading device according to a third embodiment.

FIG. 15 is a flowchart illustrating a reading process executed by the image reading device 1 according to the third embodiment. In FIG. 15, to steps which are substantially the same as those of the reading process (FIG. 8) according to the first embodiment, the same step numbers are assigned, and explanations thereof will not be repeated. The feature of the reading process according to the third embodiment is that a waiting process (step S13) is provided between steps S12 and S14, and a data transfer process (step S15) is explicitly illustrated between steps S14 and S16.

In step S12, the image reading device 1 judges whether the leading end of a page of document paper reaches the read position 21a (step S12). If the page reaches the read position 21a (S12: YES), the waiting process is executed (step S13).

In the waiting process, the image reading device 1 judges whether the reading of the page is possible and waits until the reading of the next page becomes possible. The waiting process is explained later with reference to FIG. 17. If it is judged that the reading of the page is possible through the waiting process (step S13), the image reading device 1 reads the page while conveying the page (step S14). Because of the waiting process (step S13), the reading of the page is stopped until the state where the reading of the page is impossible due to the processing of the immediately preceding page is released.

After thus finishing the reading of the page, the digital data obtained by the reading operation is subjected to the correction process and image processing (e.g., an encoding process) in the ASIC 66 and is stored in the image memory 63k (step S14). Then, a data transferring process for transferring the digital data stored in the image memory 63k is started (step S15). In step S15, the digital data is transferred to an external device via the network interface 55.

Hereafter, the waiting process is explained with reference to FIG. 16. First, the image reading device 1 judges whether untransferred digital data which has not been transferred to the external device (i.e., an untransferred part of the digital data obtained by reading the immediately preceding page or untransferred digital data of the immediately preceding execution of the reading process) is lower than or equal to an untransferred data amount threshold 62a (step S132).

If the untransferred data amount of the digital data is larger than the untransferred data amount threshold 62a (i.e., if the network interface 55 is in the state of transferring the digital data and the amount of queue data is larger than the untransferred data amount threshold 62a) (S132: NO), the image reading device 1 judges that the reading of the next page can not be started. Therefore, in this case, the image reading device 1 waits until the untransferred data amount becomes lower than or equal to the untransferred data amount threshold 62a.

If the untransferred data amount of the digital data becomes lower than or equal to the untransferred data amount threshold 62a (S132: YES), control proceeds to step S134. In step S134, the image reading device 1 checks the size of free space of the image memory 63k to judge whether the size of free space of the image memory 63k is larger than or equal to a free space threshold (step S134). The reason is that the image reading device 1 is not able to store the digital data obtained by the reading operation if the reading of the next page is started in the sate where the size of the free space of the image memory 63k is low. Therefore, the image reading device 1 waits if the size of free space of the image memory 63k is lower than the free space threshold. The free space threshold may be stored in the ROM 62.

If it is judged that the size of free space of the image memory 64k is larger than or equal to the free space threshold (S134: YES), control proceeds to step S136. In step S136, the image reading device 1 judges whether the image processing for the previously read digital data is finished. For example, the image processing device 1 judges whether the encoding process for the previously read digital data is finished in the image processing unit 66c. If the image processing in the image processing unit 66c is not finished, the image processing for digital data of the next page can not be executed. Therefore, the image processing device 1 waits until the image processing in the image processing unit 66c finishes (S136: NO).

If it is judged that the image processing in the image processing unit 66c finishes during the waiting state (S136: YES), the waiting process terminates (S13). After the waiting process terminates, the reading for the next page is started and the reading of reflected light is started for the gain adjustment and the determination of the shading correction data in the full correction data determination process.

In the image reading device 1, the full correction data determination process (S36) is executed if the digital data obtained by reading the reflected light from the presser foot 19 satisfies the predetermined condition. If the change amount of light from the immediately preceding execution of the full correction data determination process is not relatively large, the full correction data determination process is not executed. In this case, there is no need to move the reading unit 22 to the position beneath the reference position 21b. Therefore, it is possible to quickly start execution of reading of the next page and thereby to decrease the time for the reading operation.

On the other hand, if the change amount of light is relatively large, the full correction data determination process is executed. Therefore, it is possible to update the correction data at appropriate timing. That is, it is possible to properly perform the gain correction and the shading correction.

As an alternative to transferring the digital data obtained by the reading unit 22 to an external device designated by a user in step S15 (FIG. 15), the digital data may be transferred to the image formation unit 56.

Figure 16:
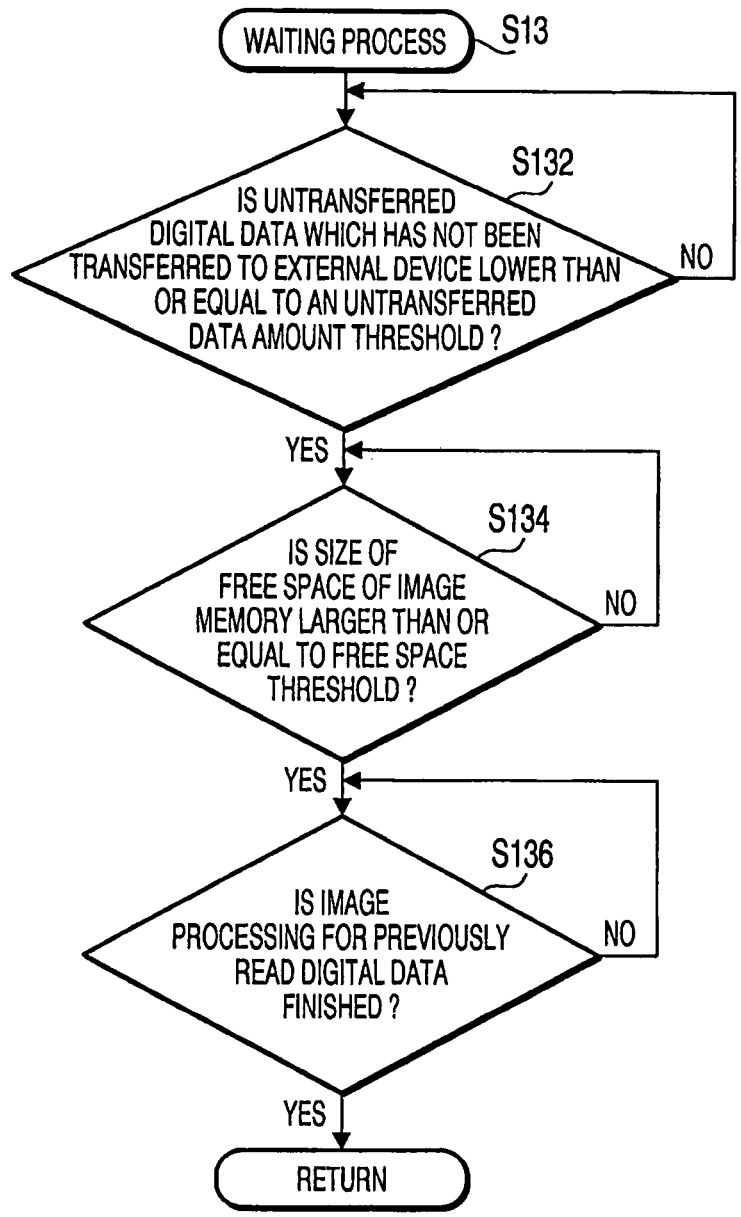
FIG. 16 is a flowchart illustrating a waiting process executed by the image reading device.
Figure 17:
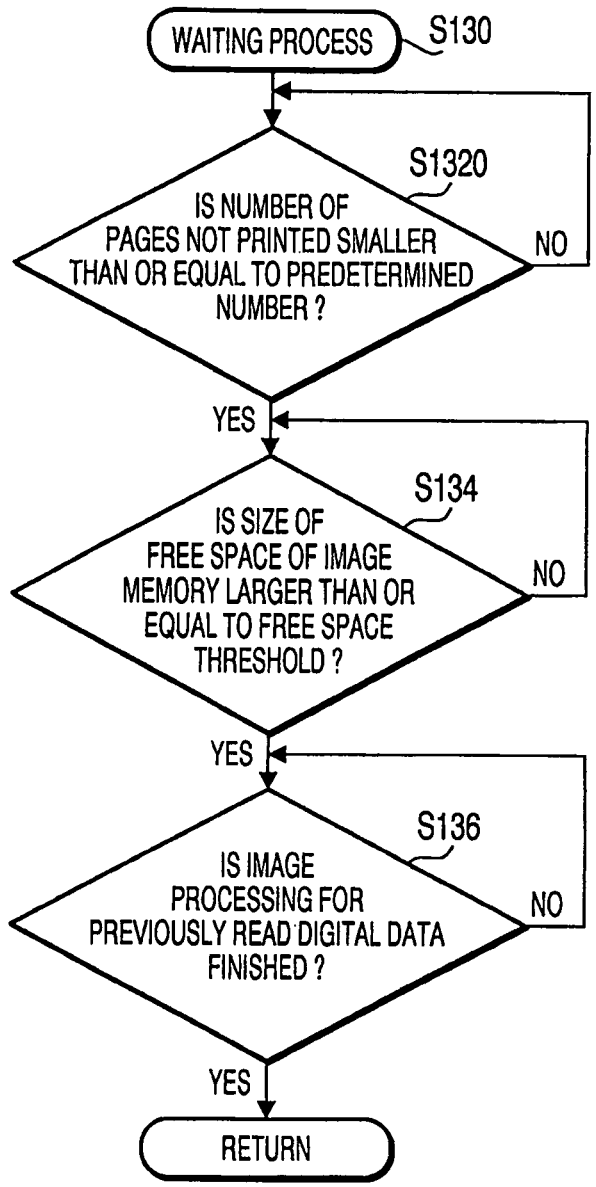
FIG. 17 is a flowchart illustrating another example of a waiting process executed by the image reading device.

As an alternative to the waiting process of S13 (FIG. 16), a waiting process (S130) shown in FIG. 17 may be executed.

Hereafter, the waiting process executed by the image reading device 1 in place of the waiting process (S13) is explained with reference to FIG. 17. In FIG. 17, to steps which are substantially the same as those of the waiting process shown in FIG. 16, the same step numbers are assigned, and explanations thereof will not be repeated.

First, the image reading device 1 judges whether the number of pages not printed is smaller than or equal to a predetermined number (step S1320). For example, if high quality printing is performed or if the quantity of an image to be printed per one page is large, the time required for printing one page is larger than the time required for reading one page. Therefore, if the number of pages not printed is larger than or equal to the predetermined number (e.g., "3") (S1320: NO), the image reading device 1 judges that the reading for the next page can not be executed. In this case, the image reading device 1 moves to a waiting state.

If it is judged that the number of pages not printed becomes smaller than or equal to the predetermined number (S1320: YES), control proceeds to step S134 where the image reading device 1 judges whether the size of free space of the image memory 64*k* is larger than or equal to the free space threshold. Then, the image reading device 1 judges whether the encoding process for the previously read digital data is finished in the image processing unit 66*c* (S136).

In the waiting process (S13) of FIG. 16, the image reading device 1 judges whether the encoding process in the image processing unit 66*c* is finished. By contrast, the waiting process of S130 (FIG. 17) may be configured to judge whether image processing (e.g., a binarizing process) other than the encoding process is finished because the waiting process (S130) is executed for a printing process for the obtained digital data.

According to the waiting process (S130) shown in FIG. 17, the advantages attained by step S13 (FIG. 16) can also be achieved. In addition, the reading of the reflected light from the white tape 21*c* is stopped until the number of pages not printed becomes smaller than or equal to the predetermined number and therefore the reading operation becomes possible. The gain adjustment and the shading correction data can be determined at the time immediately before execution of the reading of the next page even if the printing operation needs a relatively long time. Consequently, the correction of image signal can be executed appropriately through use of the thus determined shading correction data and the gain.

In the full correction data determination process (S10, S36) of this embodiment, the waiting process is executed before execution of step S102. In this case, the reading of the reflected light from the white tape 21*c* is stopped until the image reading device 1 judges that the reading operation is possible. In other words, the reflected light is read to determine the gain and the shading correction data after the reading operation becomes possible.

Since the next page is read quickly after the gain adjustment and the determination of the shading correction data, it is possible to execute correction of the image signal through use of the appropriate gain and the shading correction data. Consequently, it is possible to suppress the adverse effect due to the change of the light amount on the reading operation even if the change of light amount occurs after the gain adjustment and the determination of the shading correction data.

In the above mentioned waiting process (S13, S130), the image processing device 1 exits the waiting process in response to all of the three conditions being satisfied. However, the waiting process may be configured such that the image reading device 1 exits the waiting process in response the fact that at least one (or two) of the three conditions is satisfied.

In order to judge whether the reading is possible, an additional criterion may be added to the waiting process (S13, S130). For example, if the image reading device 1 is provided with a removal memory attachment slot and is configured to transfer the digital data stored in the image memory 63*k* to a memory card attached to the removal memory attachment slot, the waiting process may be configured to additionally wait until a predetermined amount of data is transferred to the memory card. In the waiting process (S13, S130), the processing order of steps may be changed.

In the reading process (FIG. 15), the waiting process is executed regardless of whether the page being read is the first page or the page subsequent to the first page. However, the waiting process may be skipped in the reading of the first page.

Since the reading of the reflected light by the correction data determination unit is stopped until the status of the image reading device becomes ready for reading of the document, it is possible to determine the correction data at appropriate timing. Since the document is read quickly after determination of the correction data, it is also possible to appropriately execute a correcting operation in accordance with the determined correction data.

As an alternative to providing the waiting process (S13) between steps S12 and S14 in the read process shown in FIG. 15, the waiting process (S13) may be provided in the full correction data determination process (S10, S36). In this case, the waiting process (S13) is executed before step S102.

Fourth Embodiment

Hereafter, an image reading device according to a fourth embodiment is described. Since the image reading device according to the fourth embodiment has substantially the same hardware structure as that of the image reading device 1 according to the first embodiment, explanation thereof will not be repeated. In the following, the drawings illustrating the hardware configuration of the image reading device 1 according to the first embodiment (e.g., FIGS. 1-3, 4 and 6) are also referred to for the explanations of the fourth embodiment.

In a conventional reading process executed by a conventional image reading device, a relatively long time period is required until a document reaches a read position after the gain adjustment and the determination of the shading correction data is finished. Therefore, if the light amount changes during the relatively long time period, the light amount may becomes too large at the time of actually starting the reading of the document. In this case, the gain and the shading correction data determined in the immediately preceding determination process may become improper.

In the conventional reading process, a reading unit is returned to a home position (i.e., a reference position) each time one of sides of the document paper is read. Such a conventional reading process requires the reading unit to frequently reciprocate between the read position and the reference position, and thereby decreases the reading speed of documents. Such a drawback becomes clear for the reading of a document having a number of pages.

Figure 18:
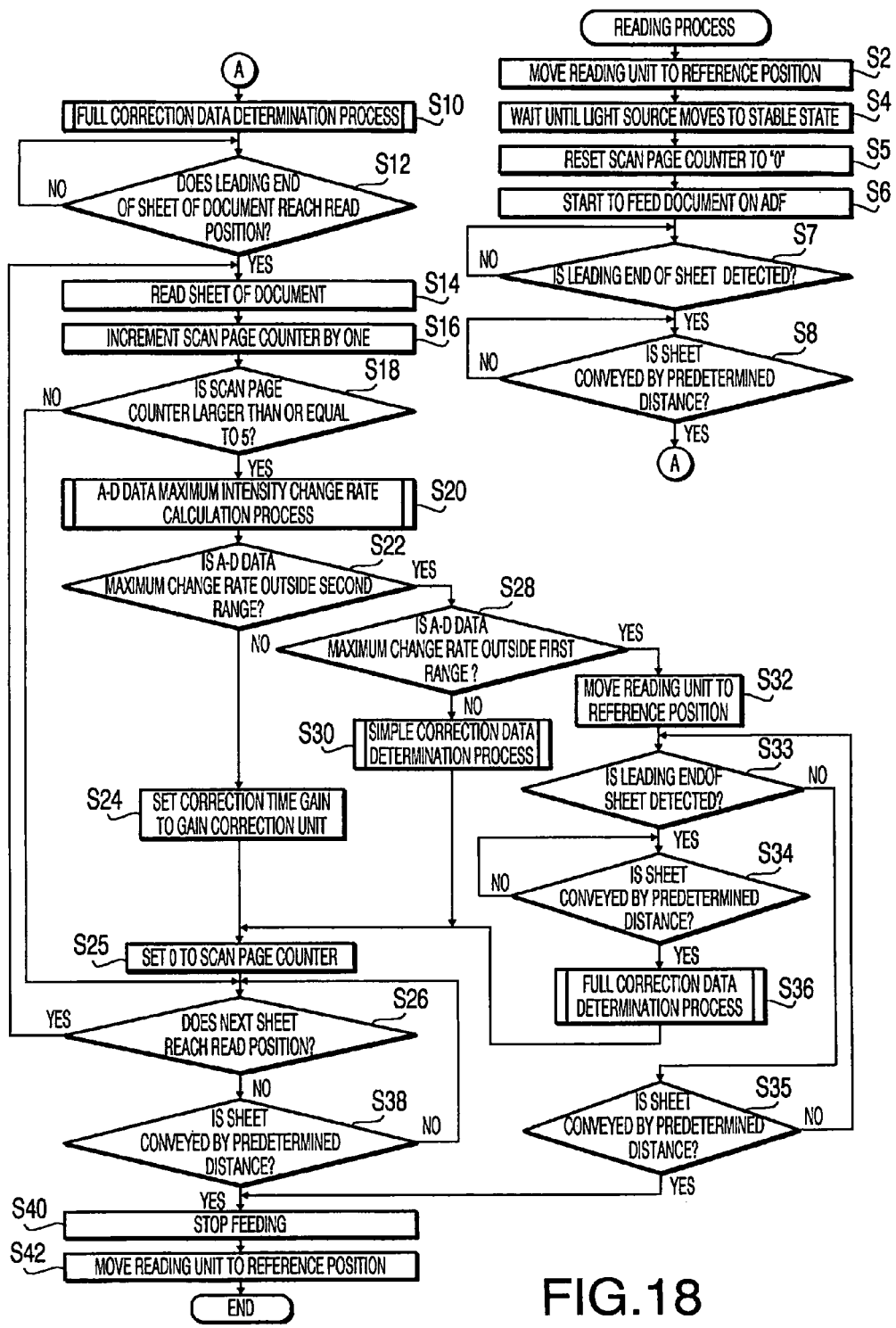
FIG. 18 is a flowchart illustrating a reading process according to a fourth embodiment.

FIG. 18 is a flowchart illustrating a reading process according to the fourth embodiment. The reading process is executed under control of the CPU 61 of the image reading device 1. In FIG. 18, to steps which are substantially the same as those of the reading process according to the first embodiment (FIG. 8), the same step numbers are assigned, and explanations thereof will not be repeated.

The feature of the reading process shown in FIG. 18 is that a judgment step (S7) for judging whether a leading end of a sheet of the document is detected and a judgment step (S8) for judging whether a sheet of document is conveyed by a predetermined distance are inserted between steps S6 and S10, a judgment step (S33) for judging whether a leading end of a sheet of the document is detected and a judgment step (S34, S35) for judging whether the sheet of the document is conveyed by a predetermined distance is inserted between steps S32 and S36.

In the following, only the feature of the reading process according to the fourth embodiment is described.

As in the case of the reading process shown in FIG. 8, steps S2 to S5 are processed. In step S6, the feeding of a sheet of document paper placed on the paper feed tray 30 starts. Then, the image reading device 1 judges whether the leading end of the sheet of the document is detected through the second front sensor 53 (step S7). The image reading device 1 was until the leading end of the sheet of the document is detected (S7: NO).

When the reading end of the document is detected by the second front sensor 53 during the feeding of the sheet of the document (S7: YES), the image reading device 1 judges whether the sheet of the document has been conveyed by the predetermined distance (step S8). Whether the sheet of the document has been conveyed by the predetermined distance can be determined by monitoring the number of rotations of the feed rollers 35A, 35B, 35C and 35D through the number of step pulses of an encoder or a motor.

The image reading device 1 waits until the document is conveyed by the predetermined distance (S8: NO). If it is judged that the document has been conveyed by the predetermined distance (S8: YES), the full correction data determination process is executed (step S10). That is, the full correction data determination process is executed after the leading end of the sheet of the document reaches a predetermined point along the document feed path 32.

Next, steps S12 to S22 are processed as explained with reference to FIG. 8 in the first embodiment. In summary, after the leading end of the sheet of document paper reaches the read position 21a, the image reading device 1 reads the sheet of document paper (S12, S14). Then, the image reading device 1 increments the scan page counter 63j by 1 (S16), and judges whether the scan page counter 63j has reached "5" (S18). If the scan page counter 63j has reached "5" (S18: YES), the A-D data maximum intensity change rate calculation process is executed (S20). If the calculated A-D data maximum change rate is not outside the second range 62b (S22: NO), control proceeds to step S24. If the calculated A-D data maximum change rate is outside the second range 62b (S22: YES), control proceeds to step S28.

If the A-D maximum intensity change rate is outside the first range (S28: YES), control proceeds to step S32 where the reading unit 22 is moved to the position beneath the reference position 21b to determine and update the shading correction data. Then, the image reading device 1 judges whether the leading end of the sheet of the document is detected through the second front sensor 53 (step S33). If the leading end of the sheet of the document is not detected (S33: NO), the image reading device 1 judges whether the sheet of the document has been conveyed by the predetermined distance (step S35). If the sheet of the document has not been conveyed by the predetermined distance (S35: NO), control returns to step S33.

When the leading end of the document is detected by the second front sensor 53 (S33: YES), the image reading device 1 judges whether the sheet of the document has been conveyed by the predetermined distance (step S34). Whether the sheet of the document has been conveyed by the predetermined distance can be determined by monitoring the number of rotations of the feed rollers 35A, 35B, 35C and 35D through the number of step pulses of an encoder or a motor.

The image reading device 1 waits until the sheet of the document has been conveyed by the predetermined distance (S34: NO). When the sheet of the document has been conveyed by the predetermined distance (S34: YES), the full correction data determination process (S36) is executed. That is, the full correction data determination process (S36) is executed after the leading end of the sheet of the document reaches the predetermined point along the document feed path 32.

In step S25, the scan page counter is set to "0" to start the reading of the next sheet of the document.

If the sheet of the document has conveyed by the predetermined distance in the state whether the leading end of the document is not detected by the second front sensor 53 (S33: NO and S35: YES), no sheet of document paper to be read is placed on the paper feed tray 30. Therefore, in this case, control proceeds to step S40 where the feed rollers 35a, 35B, 35C and 35C are stopped. Next, the reading unit 22 is moved to the position beneath the reference position 21b (step S42). Then, the reading process terminates.

According to the image reading device 1 of the fourth embodiment, if the A-D maximum intensity change rate is outside the first range, the image reading device 1 judges that the change amount of light from the immediately preceding execution of the full correction data determination process is large, and therefore executes the full correction data determination process.

If the change amount of light from the immediately preceding execution of the full correction data determination process is relatively small, the full correction data determination process is not executed. In this case, it is not necessary to move the reading unit 22 to the position beneath the read position 21b. Consequently, it becomes possible to quickly start the reading of the next page and to reduce the time required for the reading process. It is also possible to update the correction data at appropriate timing, and to execute the gain correction and the shading correction properly.

Figure 19:
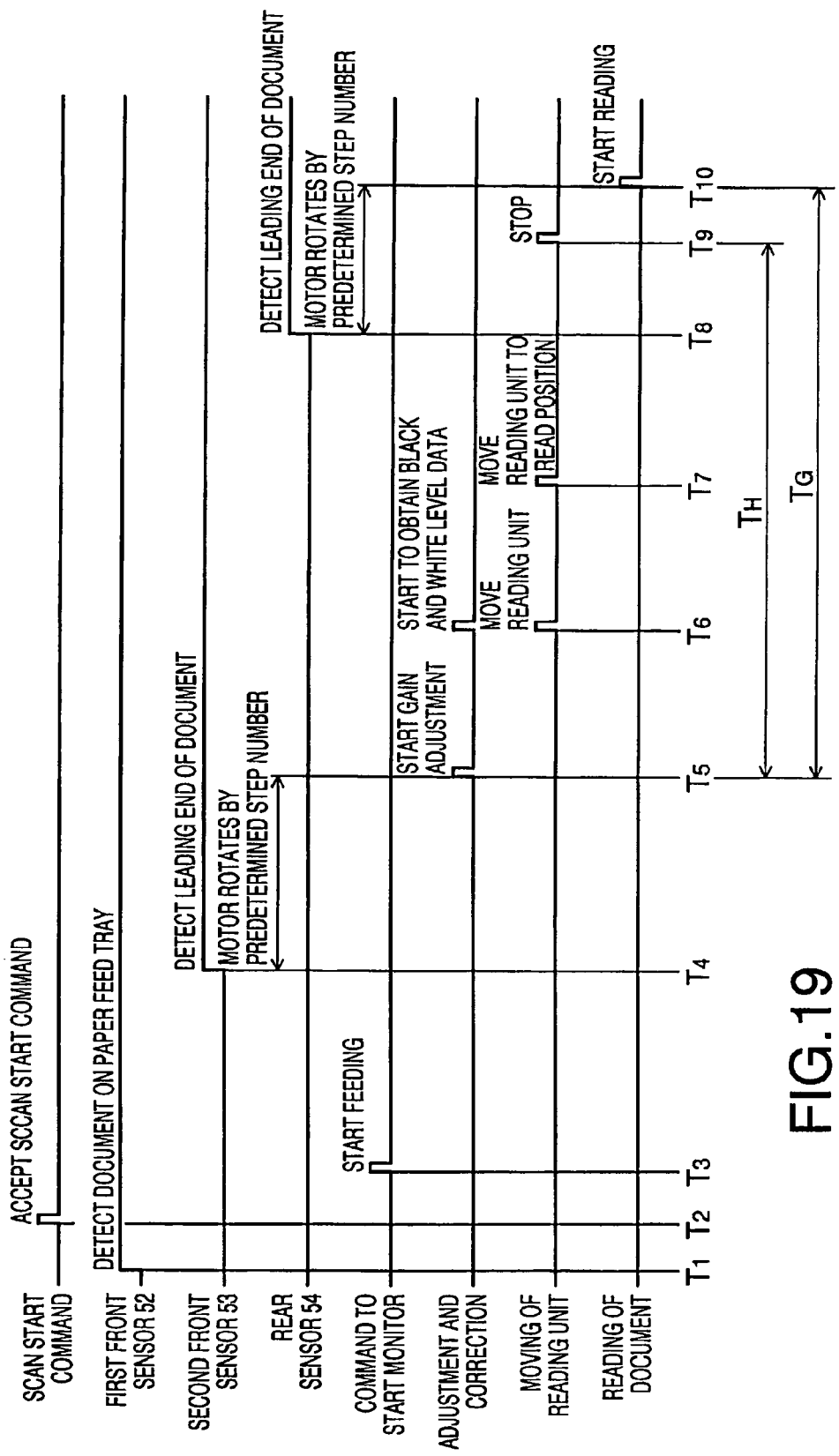
FIG. 19 is a timing chart illustrating a process flow between the start of the reading process shown in FIG. 18 and the scan process in step S14 of FIG. 18.

FIG. 19 is a timing chart illustrating a process flow between the start of the reading process shown in FIG. 18 and the reading in step S14. As shown in FIG. 19, first, the front sensor 52 detects the presence of the document on the paper feed tray 30 (T1). When a scan start command is inputted by the user through the operation panel 5 (T2), the image reading device 1 controls motors to rotate the intake roller 33 and the separation roller 34 so that feeding of the document is started (T3). Then, the leading end of a sheet of the document is detected by the second front sensor 53 during the feeding of the document (T4).

When the motor for rotating the feed rollers 35A, 35B, 35c, and 35D rotates by predetermined steps (T5), the full correction data determination process is executed. More specifically, the gain adjustment by the gain correction unit 22c1 is started (T5) and the gain is determined. Then, the black level data and the white level data are obtained while moving the reading unit 22 under the reference position 21b (T6).

After completion of the obtaining of the black level data and the white level data, the image reading device 1 starts to move the reading unit 22 to the read position 21a (T7). When the reading unit 22 reaches the read position 21a, the reading unit 22 is stopped (T9). The CPU 61 determines the black correction data based on the obtained black level data and determines the shading correction data based on the white level data.

Since the document is conveyed concurrently with the execution of the full correction data determination process, the leading end of the document is detected by the rear sensor 54 when the document approaches the read position 21a (T8). In the state where the number of rotations of the motor for rotating the feed rollers 35A, 35B, 35C and 35D has reached the predetermined number of steps (T10), the leading end of the sheet of the document reaches the read position 21a. At this time, the reading of the document is started.

With the above described configuration, it is possible to bring the timing T5 (when the reading of light reflected from the white tape 21c for the full correction data determination process is started) near to the timing T10 (when the reading of the document is started). Therefore, even if the light amount changes between the start of the feeding of the sheet of the document and the start of the reading of the sheet of the document, it is possible to suppress the bad effect of the change of light amount to an extremely small level. Consequently, it is possible to determine the appropriate gain and the shading correction data.

A time period TH (which is an elapsed time between the time when the gain adjustment is started and the time when the reading unit 22 reaches the read position 21a after obtaining the black level data and white level data and thereafter moving the reading unit 22 from the reference position 21b to the read position 21a) is shorter than a time period which is an elapsed time between the time when the leading end of the sheet of the document reaches the predetermined point and the time when the leading end of the sheet of the document reaches the read position.

Regarding the full correction data determination process executed in the interval between the reading of the page and the reading of the next page, the full correction data determination process is executed after the leading end of the next page reaches the predetermined point along the document feed path 32. Therefore, even if the time interval between the time when the reading of the immediately preceding page is finished and the time when the next page reaches the read position 21a is relatively long (e.g., if a next page is inserted into the paper feed tray 30 during a state of reading of the immediately preceding page or at the time of completion of the reading of the immediately preceding page), execution of the full correction data determination process is stopped until the next page reaches a position near the read position. Therefore, it is possible to determine the gain, the black correction data and the shading correction data immediately before the start of the reading of the next page. Consequently, it becomes possible to avoid the bad effect caused by the change of the light amount which can cause before the start of the reading of the next page, and thereby to determine the appropriate correction value.

Figure 20:
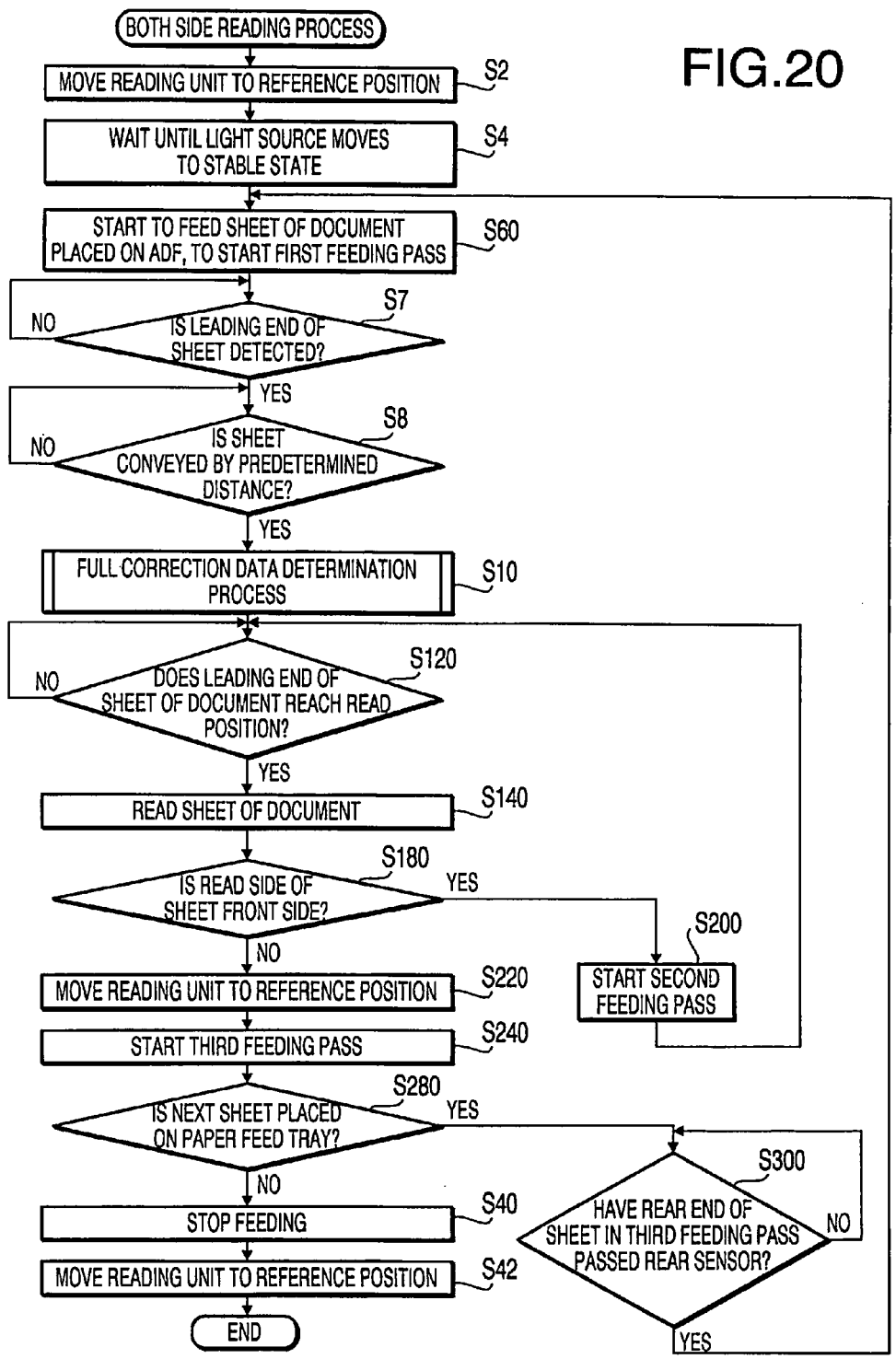
FIG. 20 is flowchart illustrating a both side reading process executed by the image reading device according to the fourth embodiment.

FIG. 20 is a flowchart illustrating a both side reading process executed by the image reading device 1 according to the fourth embodiment. The both side reading process is started when a document is placed on the paper feed tray 30 and a both side reading is designated by the user through the operation keys 11. To steps which are substantially the same as those of the reading processes shown in FIGS. 8 and 18, the same step numbers are assigned, and explanations thereof will not be repeated. In the following, the explanation focuses on the feature of the both side reading process.

As in the case of the reading process shown in FIG. 18, steps S2 and S4 are processed. Then, a first page of the document placed on the paper feed tray 30 is fed to start the first feeding pass (step S60). As described above, through the first feeding pass, a sheet of the document placed on the paper feed tray 30 is conveyed to the read position 21a through the document feed path 32 with the front side of the sheet of the document being faced to be read by the reading unit 22.

Similar to the reading process shown in FIG. 18, the image reading device 1 judges whether the leading end of the sheet of the document is detected by the second front sensor 53 (step S7). When the leading end of the sheet of the document is detected (S7: YES), the image reading device 1 judges whether the sheet of the document has been conveyed by a predetermined distance (step S8).

The image reading device 1 waits until the sheet of the document has been conveyed by the predetermined distance (S8: NO). If the sheet of the document has been conveyed by the predetermined distance (S8: YES), the full correction data determination process is executed (step S10). That is, similar to the reading process shown in FIG. 18, the full correction data determination process is executed after the leading end of the sheet of the document has reached the predetermined point along the document feed path 32.

Next, the image reading device 1 judges whether the leading end of the sheet of the document has reached the read position 21a (step S120). The image reading device 1 waits until the leading end of the document reaches the read position 21a (S120: NO). When the leading end of the sheet of the document reaches the read position 21a (S210: YES), the side of the sheet of the document facing the reading unit 22 is read (step S140).

After the reading of one side of the sheet of the document has thus finished, the image reading device 1 judges whether the side of the sheet of the document read by the reading unit 22 is the front side or the rear side (step S180). If the side of the sheet of the document read by the reading unit 22 is the front side (S180: YES), the second feeding pass is started for the sheet of the document (step S200). Then, control returns to step S120. At this stage, the image reading device 1 is in the state of being able to execute the reading operation for the rear side of the sheet of the document.

If it is judged that the side of the sheet of the document read by the reading unit 22 is the rear side (S180: NO), the image reading device 1 moves the reading unit 22 to the reference position 21b (step S220) so as to perform the reading of light reflected from the white tape 21c and the determination of the gain and the shading correction data in the subsequently executed full correction data determination process (S10).

Next, the third feeding pass is started (step S240). The document is ejected to the paper output tray 31 through the read position 21a in the third feeding pass.

Next, the image reading device 1 judges whether the next sheet of the document paper is placed on the paper feed tray 30 (step S280). If the next sheet of document paper is placed on the paper feed tray 30 (S280: YES), the image reading device 1 judges whether the rear end of the sheet of the document paper in the process of the third feeding pass has passed the rear sensor 54 (step S300). The image reading device 1 waits until the rear end of the sheet of the document paper in the process of the third feeding pass has passed the rear sensor 54 (S300: NO).

If it is judged that the rear end of the sheet of the document paper in the process of the third feeding pass has passed the rear sensor 54 (S300: YES), control returns to step S60 to start the first feeding pass by feeding a next page of the document placed on the paper feed tray 30 (step S60). Then, the image reading device 1 judges whether the leading end of the document is detected by the second front sensor 53 (step S7). When the leading end of the document is detected by the second front sensor 53 (S7: YES), the image reading device 1 judges whether the document has conveyed by the predetermined distance (step S8).

The image reading device 1 waits until the document has conveyed by the predetermined distance (S8: NO). If the document has conveyed by the predetermined distance (S8: YES), the full correction data determination process is executed (S10).

For the full correction data determination process, it is necessary to read light reflected from the white tape 21c through the reading unit 22. In this regard, according to the both side reading process, the reading unit 22 has moved to the position beneath the reference position 21b after the reading of the rear side of the document. Therefore, it is possible to quickly execute the full correction data determination process (S10), and thereby to prevent the reading speed from decreasing.

As described above, the full correction data determination process is not executed after the reading of the front side of the document, while the full correction data determination process is executed after the reading of the rear side of the document.

When the image reading device 1 judges that no document is found on the paper feed tray 30 (S280: NO), the image reading device 1 stops feeding of the document by the feed roller 35 (step S40), moves the reading unit 22 to the position beneath the reference position 21b (step S42) and then terminates the both side reading process.

As in the case of the reading process shown in FIG. 18, the both side reading process is able to bring the timing T5 when the reading of light reflected from the white tape 21c is started near to the timing T10 when the reading of the document is started. Therefore, even if the change of light amount occurs during the time period between the start of the feeding of the document and the start of the reading of the document, it is possible to prevent the change of the light amount from affecting the reading operation. Consequently, it is possible to determine the appropriate gain and the shading correction data.

Since the shading correction data is updated while effectively using the time period between completion of the reading of the rear side of the document and the time when the leading end of the front side of the next sheet of document reaches the read position, it is possible to appropriately update the shading correction data in accordance with the change of the light amount while suppressing the decrease of the reading speed of the document. After the front side of the document is read, the shading correction data is not updated. Consequently the decrease of the reading speed of the document is suppressed.

If the full correction data determination process is executed after the reading of the front side is finished in the both side reading process shown in FIG. 20, the full correction data determination process may be executed after reversing the sheet of document paper through the switchback path 39 and thereafter conveying the sheet of the document by the predetermined distance.

If the image reading device 1 is formed as an image reading device provided in a multiple function peripheral having a plurality of functions including a facsimile function (a facsimile mode), a copying function (a copy mode) and a scanner function (a scanner mode), the multifunction peripheral may be configured to allow the user to designate one of the facsimile mode, the copy mode and the scanner mode. In this case, in step S4 of the reading process shown in FIG. 18 or the both side reading process shown in FIG. 20, a preparation time elapsed before the light source moves to the stable state varies depending on the type of the operation mode. For example, a relatively short preparation time is used for the copy mode and the facsimile mode, while a relatively long preparation time is used for the scanner mode. In this case, the light source 22a is in the sufficiently stable state when the reading process is executed in the scanner mode. Therefore, proper correction data can be obtained even if the full correction data determination process is executed at relatively earlier timing.

Therefore, a step for defining a value of the predetermined distance depending on the type of the operation mode may be inserted before step S8 of the reading process (FIG. 18) or the both side reading process (FIG. 20) so that the predetermined distance is suitably changed in accordance with the type of the operation mode. In this case, the timing of determination of the correction data may be changed in accordance with the operation mode.

Since the correction data is determined after the leading end of the document reaches a predetermined point along the document feed path, it is possible to suppress the adverse effect due to change of the light amount during the conveying of the document even if such change of the light amount occurs during the conveying of the document.

Fifth Embodiment

Hereafter, an image reading device according to a fifth embodiment is described. Since the image reading device according to the fifth embodiment has substantially the same hardware structure as that of the image reading device 1 according to the first embodiment, explanation thereof will not be repeated. In the following, the drawings illustrating the hardware configuration of the image reading device 1 (e.g., FIGS. 1-3, 4 and 6) are also referred to for the explanations of the fifth embodiment.

In the fourth embodiment, the image reading device 1 reads substantially the entire page of the front side of the document and the entire page of the rear side of the document. By contrast, the image reading device 1 according to the fifth embodiment is configured such that a reading range which a target range for reading can be designated. In the following, the explanation focuses on the feature of the image reading device 1 according to the fifth embodiment.

Figure 21:
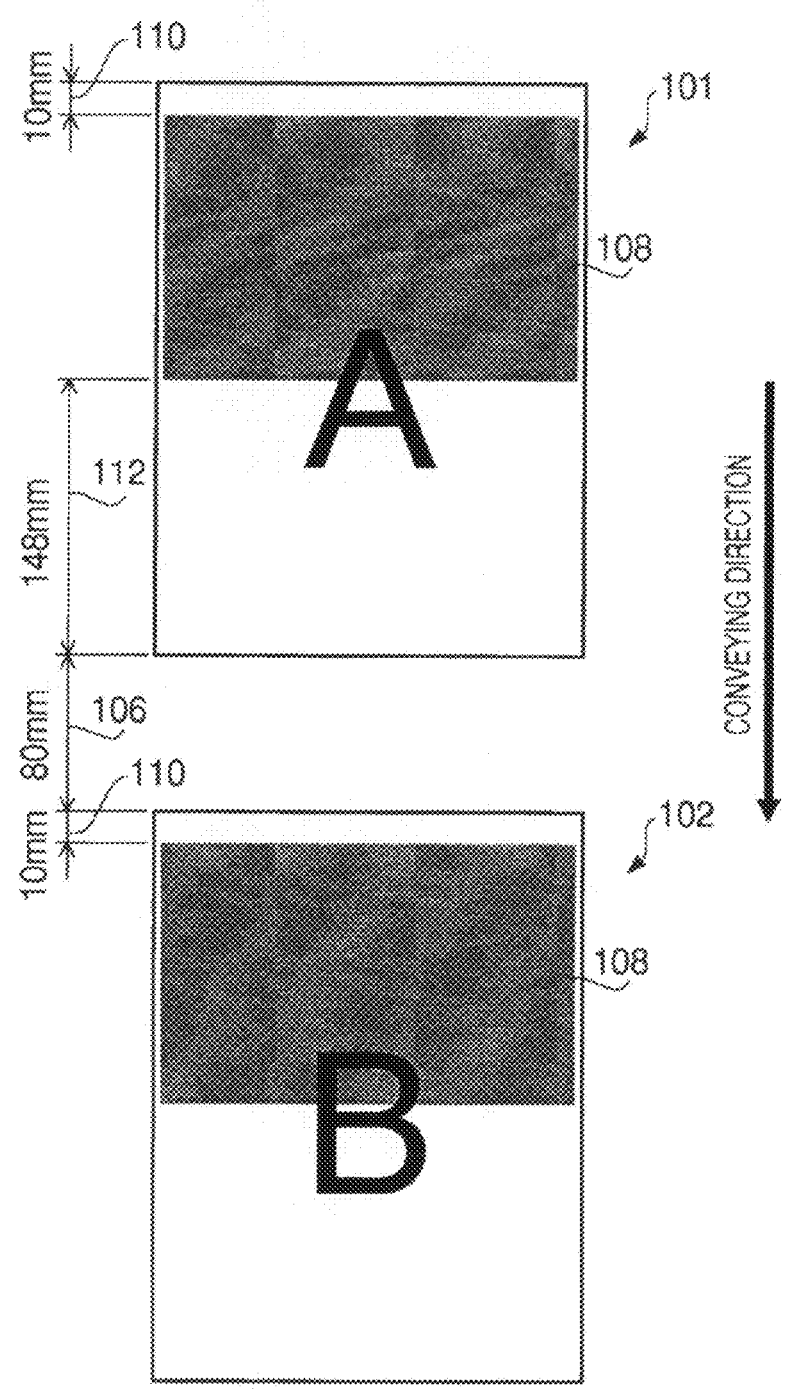
FIG. 21 is an explanatory illustration for explaining a page interval conveying distance.

In the ROM 62, data concerning a page interval and a page interval judgment threshold is stored. FIG. 21 is an explanatory illustration for explaining the page interval conveying distance. In FIG. 21, successive two pages 101 and 102 are illustrated. In the following, it is assumed that the pages 101 and 102 are read in this order.

In order to prevent occurrence of paper jam in conveying a plurality of pages of document paper continuously, a next page is conveyed while securing a predetermined interval between the next page and the previous page. In the example shown in FIG. 21, an interval 106 of 80 mm is secured between the page 101 which is conveyed earlier and the page 102 which is conveyed later. The length of the interval 106 is stored in the ROM 62 as the page interval. In a range designation reading process which is described later, pages of the document paper are conveyed while securing the pager interval between successive pages.

In the RAM 63 of the image reading device 1 according to the fifth embodiment, areas for storing a top side read restriction height 110 and a bottom side read restriction height 112 are provided (see FIG. 21). In FIG. 21, a read range 108 is illustrated in a gray color. Although the image reading device 1 is configured such that a different value can be set to the read range 108 for each of pages, in FIG. 21 the same value is set as the read range 108 for the pages 101 and 102.

As shown in FIG. 21, the top side read restriction height 110 stored in the RAM 63 represents a length between a lead end of the page (101 or 102) and a lead end of the read range 108. The bottom side restriction height 112 stored in the RAM 63 represents a length between a rear end of the read range 108 and a rear end of the page (101 or 102).

Since the page interval 106 between the page 101 conveyed first and the page 102 conveyed second is a fixed value, a conveying distance of the page between the finish of the reading of the immediately preceding page (101) and the start of the reading of the page (102) can be determined by adding the bottom side read restriction height 112, the interval 106 and the top side read restriction height 110 together by defining the read range 108 which the user is allowed to input to the image reading device 1.

Assuming that the bottom side read restriction height 112 is 148 mm, the page interval 106 between the pages 101 and 102 is 80 mm, and the top side read restriction height 110 is 10 mm, the conveying distance between the finish of the reading of the page 101 (i.e., the reading of the read rang of the page 101) and the start of the reading of page 102 (i.e., the reading of the read range 108 of the page 102) is determined as 238 mm (=148 mm+80 mm+10 mm).

If the conveying speed is 198 mm/sec, the time between the finish of the reading of the page 101 and the start of the reading of the page 102 can be obtained by dividing the conveying distance (e.g., 238 mm) by the conveying speed (198 mm/sec). The time thus obtained is stored in the RAM 63 as a page time interval.

Then, the image reading device 1 compares the pager time interval with the page interval judgment threshold stored in the ROM 62. If the page time interval is larger than or equal to the page interval judgment threshold, the full correction data determination process (S10) is executed. For example, the page interval judgment threshold is the sum of the time required for execution of the full correction data determination process and the time required for moving the reading unit 22 to the position beneath the reference position 21*a*. In other words, the full correction data determination process is executed if the image reading device 1 is able to move the reading unit 22 to the position beneath the reference position 21*a* and to execute the full correction data determination process during the time period elapsed before the read range of the next page reaches the read position 21*a* after the finish of the reading of the immediately preceding page.

Figure 22:
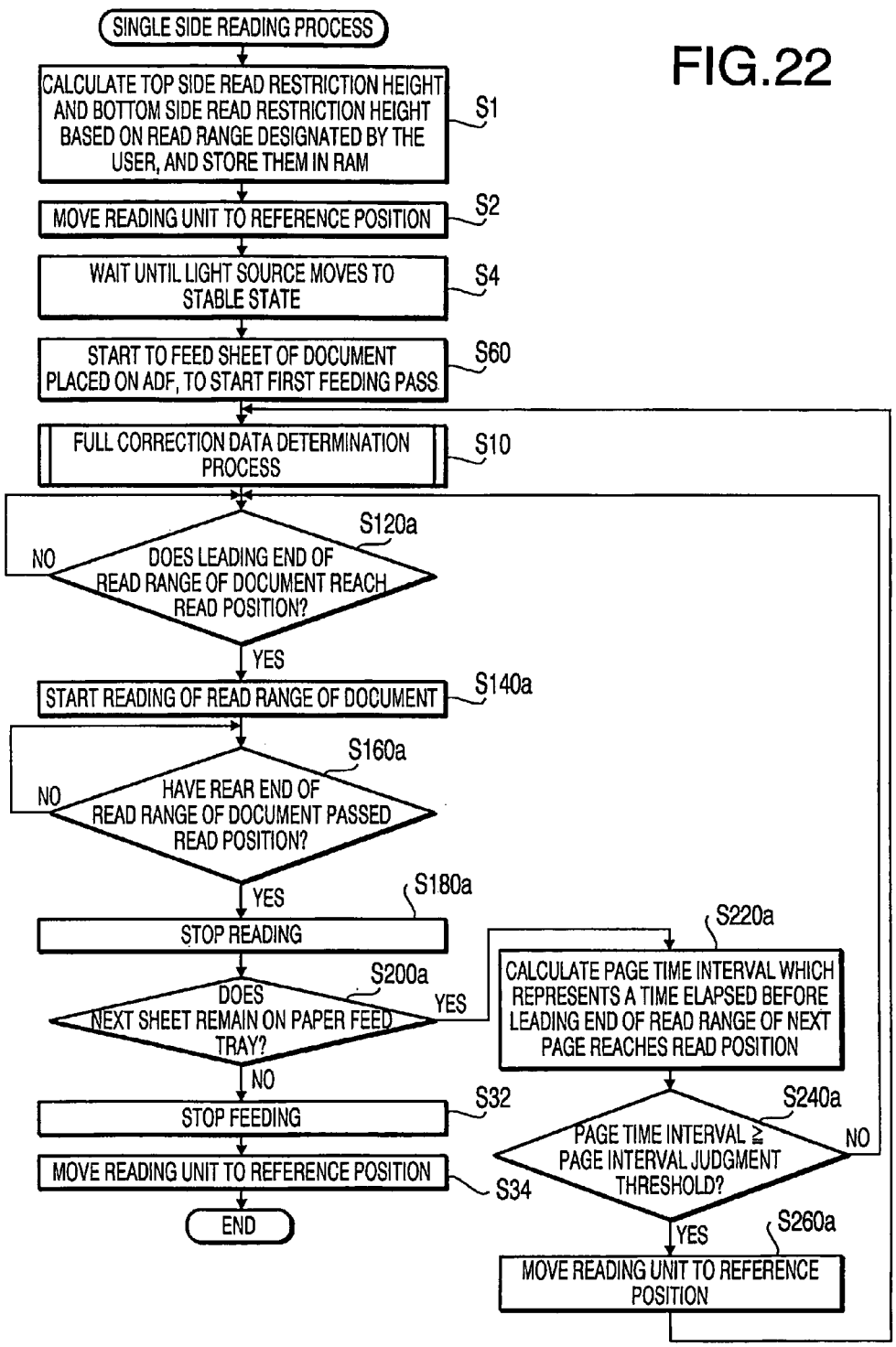
FIG. 22 is a flowchart illustrating a single side read process executed by the image reading device according to a fifth embodiment.

FIG. 22 is a flowchart illustrating a single side read process executed by the image reading device 1 according to the fifth embodiment. In FIG. 22, to elements which are substantially the same as those of the both side reading process (FIG. 20) according to the fourth embodiment, the same step numbers are assigned, and explanations thereof will not be repeated.

The single side read process is started when the "start" command is inputted by the user after a document is placed on the paper feed tray 30 of the ADF 3 and the read range 108 is designated by the user through the operation keys 11. The read range 108 may be the same value for all of the pages of the document. Alternatively, the read range 108 may be vary among the pages of the document.

In step S1, the image reading device 1 calculates the top side read restriction height 110 and the bottom side read restriction height 112 based on the read range 108 designated by the user, and stores them in the RAM 63. It should be noted that, if the read range 108 is designated separately for each of the pages, the top side read restriction height 110 and the bottom side read restriction height 112 are calculated for each of the pages and they are stored in the RAM 63 in association with respective page numbers.

Next, the above described steps S2 and S4 are processed. Then, the image reading device 1 starts to feed the document placed in the paper feed tray 30. In the both side read process according to the fourth embodiment, a sheet of document paper is conveyed through the paper feed path 32 three times (i.e., for the first to third feeding passes) for reading both sides of the sheet of document paper. By contrast, in the single side read process according to the fifth embodiment, a single side of the sheet of the document paper is read. More specifically, the pages of the document are conveyed one by one while securing the predetermined page interval 106 between the rear end of the immediately preceding page and the leading end of the next page. Therefore, each sheet of the document is ejected to the paper output tray 31 through the read position 21*a* after passing the document feed path 32 one time.

Next, the full correction data determination process (S10) is executed. Since the full correction data determination process (S10) executed in FIG. 22 is the same as that of the fourth embodiment, explanations thereof will not be repeated.

After the leading end of a sheet of document paper reaches the read position 21*a* (S120*a*: YES), reading of the page is started from the leading end of the read range 108 of the page (step S140*a*). When the rear end of the read range 108 of the page passes the read position 21*a* (S160*a*: YES), the reading for the read range 108 finishes (step S180*a*).

Next, the image reading device 1 judges whether a next sheet of the document paper remains on the paper feed tray 30 (step S200*a*). If a next sheet remains (S200*a*: YES), a page time interval which represents a time elapsed before the leading end of the read range 108 of the next page reaches the read position 21*a* is calculated (step S220*a*).

Next, the image reading device 1 judges whether the page time interval thus calculated is larger than or equal to the page interval judgment threshold (step S240*a*). If the page time interval is smaller than the page interval judgment threshold (S240*a*: NO), control returns to step S120 to wait until the leading end of the read range 108 of the next page reaches the read position 21*a*.

If the page time interval is larger than or equal to the page interval judgment threshold (S240*a*: YES), the reading unit 22 is moved to the position beneath the reference position 21*b* (step S260*a*). Then, control returns to step S10. Next, the full correction data determination process (S10) is executed.

According to the above described single side read process, the reading unit 22 is moved to the position beneath the reference position 21*b* immediately after the reading of the read range 108 of the immediately preceding page is finished. Therefore, the image reading device 1 is able to quickly execute the full correction data determination process. Consequently, decrease of the reading speed can be prevented.

When the image reading device 1 judges that no document remains on the paper feed tray 30 (S200*a*: NO) while the image reading device 1 executes the above mentioned steps repeatedly, steps S32 and S34 which have been explained in the fourth embodiment are processed. Then, the single side read process terminates.

According to the image reading device 1 according to the fifth embodiment, the shading correction data can be effectively updated by utilizing the time elapsed before the leading end of the read range 108 of the next page reaches the read position 21*a*. Therefore, it is possible to update the shading correction data in accordance with change of the light amount while preventing the decrease of the reading speed.

With this configuration, it is possible to update the correction data by effectively using the time period between the time elapsed before the leading end of the read range of the next page of the document reaches the read position. Therefore, it is possible to appropriately update the correction data in accordance with the change of the light amount while preventing the decrease of the reading speed.

Sixth Embodiment

Hereafter, an image reading device according to a sixth embodiment is described. Since the image reading device according to the sixth embodiment has substantially the same hardware structure as that of the image reading device 1 according to the first embodiment, explanation thereof will not be repeated. In the following, the drawings illustrating the hardware configuration of the image reading device 1 (e.g., FIGS. 1-3, 4 and 6) are also referred to for the explanations of the sixth embodiment.

The image reading device 1 according to the fifth embodiment is configured to read the read range of a single side of the document paper. By contrast, the image reading device 1 according to the sixth embodiment is configured such that the user is allowed to set the read range for each of the both sides of the document paper and the read ranges of the both sides of the document paper is read by the reading unit 22.

In the ROM 62, a front side post-read conveying distance and a front side post-read threshold are stored. In the RAM 63, memory areas for storing a front side rear-end region restriction height, a rear side lead-end region restriction height and a front side post-read conveying time are provided.

Figure 23:
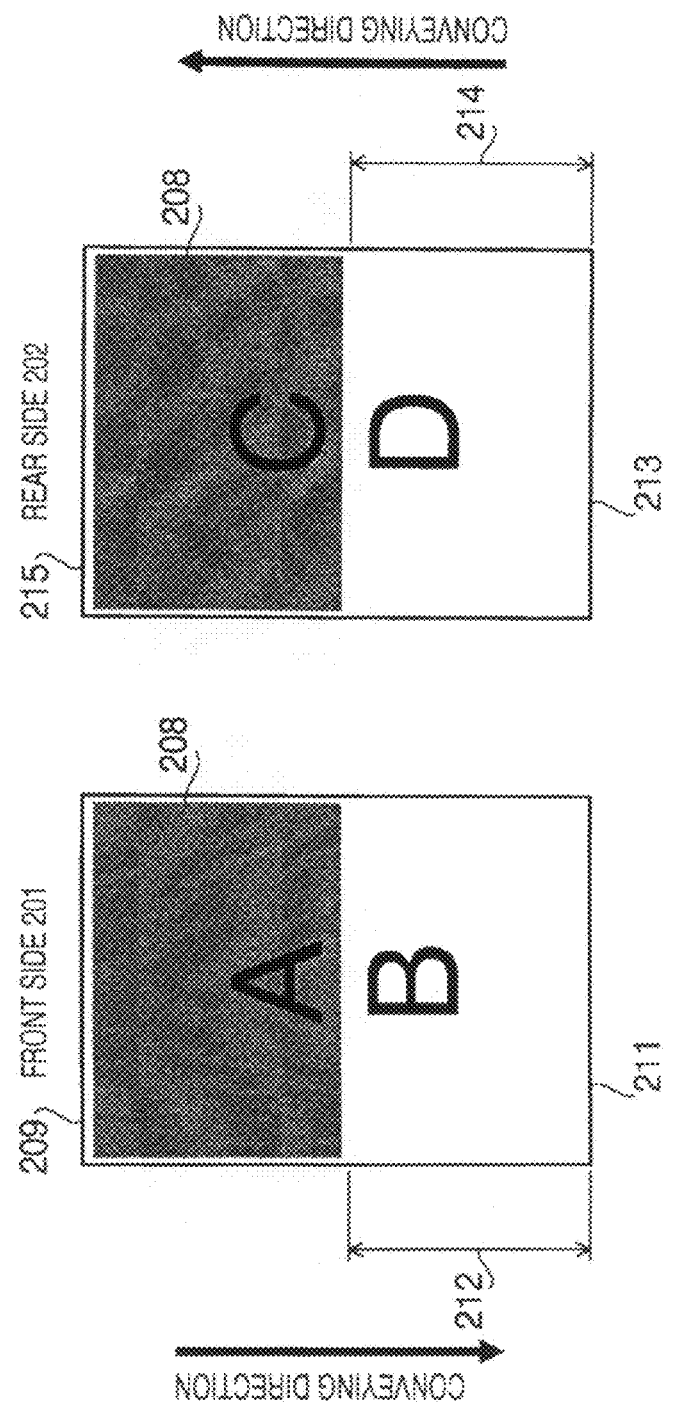
FIG. 23 is an explanatory illustration for explaining a front side rear-end region restriction height and a rear side lead-end region restriction height.

FIG. 23 is an explanatory illustration for explaining the front side rear-end region restriction height and the rear side lead-end region restriction height. More specifically, in FIG. 23, a front side 201 and a rear side 202 of a sheet of document paper are illustrated. As in the case of the image reading device 1 according to the fourth embodiment, the front side 201 and the rear side 202 are read in this order in a reading operation.

In FIG. 23, the read range 208 designated by the user is illustrated in a gray color. Although different values can be set as the read ranges 208 for the front side 201 and the rear side 202, in FIG. 23 the same value is set for the read ranges 208 for the front side 201 and the rear side 202 for the sake of simplicity.

As shown in FIG. 23, the front side rear-end region restriction height 212 stored in the RAM 63 represents a distance between the rear end of the read range 208 of the front side 201 and the rear end 211 of the front side 201.

It is noted that, in the example shown in FIG. 23, the document is placed on the paper feed tray 30 such that the top of the front side 201 corresponds to the leading end 209 and the bottom of the front side 201 corresponds to the rear end 211. As described above, the sheet of document paper is reversed through the switchback path 39 and is conveyed to the read position 21a before start of the reading of the rear side 202 and after completion of the reading of the front side 201. Therefore, the rear side 202 is reversed through the switchback process and is conveyed to the read position 21a.

Therefore, the rear side lead-end region restriction height 214 stored in the RAM 63 represents a length between the leading end 213 of the rear side 202 and the leading end of the read range 208 of the rear side 202.

The front side post-read conveying distance stored in the ROM 62 is a fixed value and represents a conveying distance of the sheet of document paper between the time when the rear end 211 of the front side 201 has passed the read position 21a and the time when the leading end 213 of the rear side 202 reaches the read position 21a.

Therefore, the conveying distance of the sheet of document paper between the finish of the reading of the read range 208 of the front side 201 and the start of the reading of the read range 208 of the rear side 202 can be obtained by adding the front side rear-end region restriction height 212, the front side post-read conveying distance and the rear side lead-end region restriction height 214 together if the read range 208 which the user is allowed to set is defined.

By dividing the conveying distance by the conveying speed, the time period between the finish of the reading of the read range 208 of the front side 201 and the start of the reading of the read range 208 of the rear side 202 can be calculated. The time period thus obtained is stored in the RAM 63 as a front side post-read conveying time.

The image reading device 1 compares the front side post-read conveying time with the front side post-read threshold. If the front side post-read conveying time is larger than or equal to the front side post-read threshold, the full correction data judgment process (S10) is executed.

Figure 24:
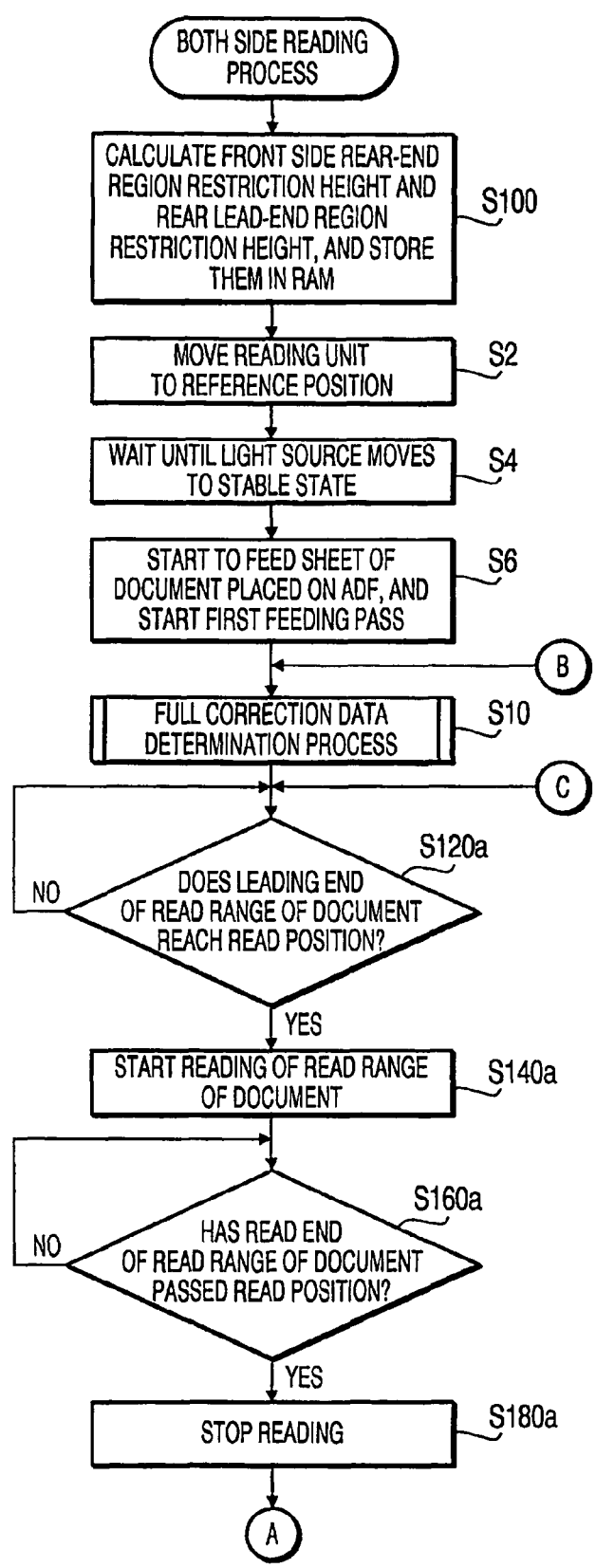
FIGS. 24 and 25 illustrate a flowchart of a both side read process executed by the image reading device according to a sixth embodiment.
Figure 25:
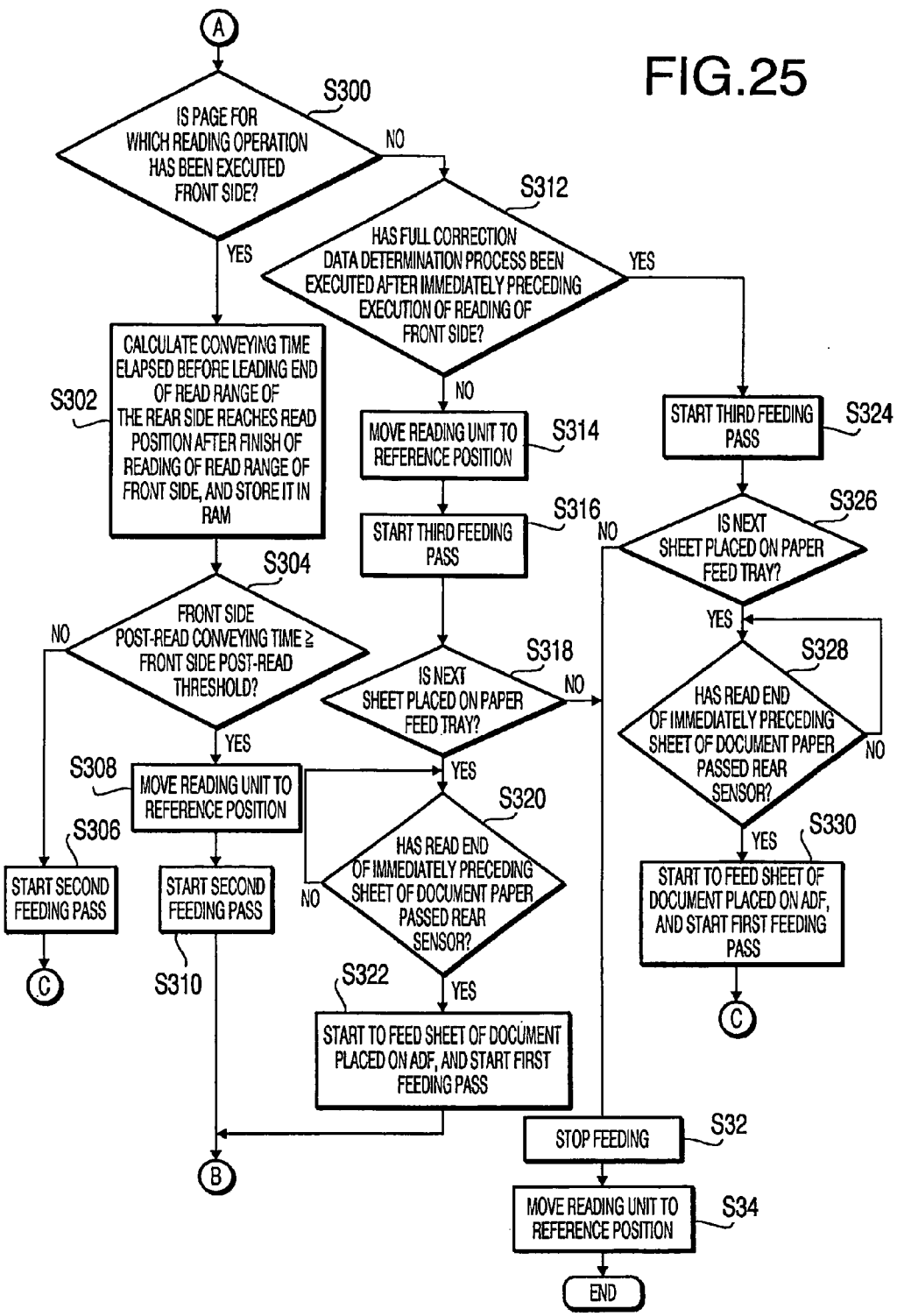

Hereafter, operations of the image reading device 1 according to the sixth embodiment are described. FIGS. 24 and 25 illustrate a flowchart of a both side read process executed by the image reading device 1 according to the sixth embodiment. In FIGS. 24 and 25, to steps which are substantially the same as those shown in FIGS. 20 and 22, the same step numbers are assigned, and explanations thereof will not be repeated.

The both side read process shown in FIGS. 24 and 25 is started when the "start" command is inputted after a document is placed on the paper feed tray 30 of the ADF 3 and the read range 208 is designated by the user through the operation keys 11. The same value may be set for all of the read ranges 208 of the front side 201 and the rear side 202 of each page. Alternatively, different values may be set to the read ranges 208 of the front side 201 and the rear side 202.

First, the front side rear-end region restriction height 212 and the rear side lead-end region restriction height 214 are calculated based on the read range 208 designated by the user, and are stored in the RAM 63 (step S100). In this case, if different read ranges 208 are separately designated, the front side rear-end region restriction height 212 and the rear side lead-end region restriction height 214 are calculated for each of the front side 201 and the rear side 202, and they are stored in the RAM 63 in association with a corresponding page number and information indicating whether the page is the front sided or the rear side.

Next, steps S2, S4 and S6 which have been explained in the fourth embodiment are executed. Then, the full correction data determination process (S10) is executed. Since the full correction data determination process (S10) is the same as that of the fourth embodiment, the explanation thereof will not be repeated.

When the leading end of the read range 208 of the sheet of document paper reaches the read position 21a (S120a: YES), the image reading device 1 starts the reading operation from the leading end of the read range 208 (step S140a). When the rear end of the read range 208 of the sheet passes the read position 21a (S160a: YES), the reading operation of the read range 208 finishes (step S180a).

Referring now to FIG. 25, after step S180a is processed, the image reading device 1 judges whether the page for which the reading operation has been executed is the front side or the rear side (step S300). If the read page is the front side (S300: YES), control proceeds to step S302 where the image reading device 1 calculates the conveying time elapsed before the leading end of the read range 208 of the rear side 202 reaches the read position 21a after finish of the reading of the read range 208 of the front side 201, and stores it in the RAM 63.

Next, the image reading device 1 judges whether the front side post-read conveying time is larger than or equal to the front side post-read threshold (step S304). If the front side post-read conveying time is smaller than the front side post-read threshold (S304: NO), the image reading device 1 executes the second feeding pass (step S306). Then, control returns to step S120. In this case, the reading of the read range 208 of the rear side 202 is started (step S140) when the leading end of the read range 208 of the rear side 202 reaches the read position 21a (step S120).

If the front side post-read conveying time is larger than or equal to the front side post-read threshold (S304: YES), the image reading device 1 moves the reading unit 22 to the position beneath the reference position 21b (step S308). Then, the image reading device 1 starts the second feeding pass (step S310). Then, control returns to step S10 to execute the full correction data determination process.

When step S300 is processed after the reading operation for the read range 208 of the rear side 202 is finished, the image reading device 1 judges that the read page is the rear side (S300: NO). In this case, control proceeds to step S312 where the image reading device 1 judges whether the full correction data determination process has been executed after immediately preceding execution of the reading of the front side 201 (i.e., after execution of the reading of the front side 201 corresponding to the rear side 202 for which the reading is executed most recently) (step S312).

If the full correction data determination process (S10) has not been executed after the immediately preceding execution of the reading of the front side 201 (S312: NO), the image reading device 1 moves the reading unit 22 to the position beneath the reference position 21b (Step S314). Then, the image reading device 1 starts the third feeding pass (step S316). Consequently, the sheet of document paper is conveyed through the document feed path 32 and is ejected to the paper output tray 31 through the read position 21a.

If the image reading device 1 judges that a next sheet of document paper remains on the paper feed tray 30 (S318: YES) and that the rear end of the immediately preceding sheet of document paper passes the rear sensor 54 (S320: YES), the image reading device 1 starts to feed the next sheet of document paper placed on the paper feed tray 30 to start the first feeding pass (step S322). Then, the full correction data determination process (S10) is executed.

On the other hand, if the image reading device 1 judges that the full correction data determination process (S10) has been executed after the immediately preceding execution of the reading of the front side 201 (S312: YES), the third feeding pass is started (step S324). Then, if the image reading device 1 judges that a next sheet of document paper remains on the paper feed tray 30 (S326: YES) and that the rear end of the immediately preceding sheet passes the rear sensor 54 (S328: YES), control proceeds to step S330. In step S330, the image reading device 1 feeds the next sheet of document paper placed on the paper feed tray 30 to start the first feeding pass. Then, control returns to step S120. In this case, the full correction data determination process is not executed.

When the image reading device 1 judges that no sheet of document paper remains on the paper feed tray 30 in step S318 or S326 (S318: NO or S326: NO), steps S32 and S34 which have been explained in the fourth embodiment are processed. Then, the both side read process shown in FIGS. 24 and 25 terminates.

The image reading device 1 according to the sixth embodiment executes the full correction data determination process if the full correction data determination process can be executed during a time period elapses before the reading of the read range 208 of the front side 201 finishes after the finish of the reading of the read range 208 of the front side 201. That is, the image reading device 1 effectively uses the time elapses before the start of the reading of the rear side 202 to execute the full correction data determination process. Therefore, it is possible to update the shading correction data without delaying the start of the reading of the rear side 202.

If the front side post-read conveying time is smaller than the front side post-read threshold, the image reading device 1 does not execute the full correction data determination process. That is, if the front side post-read conveying time is smaller than the time which is the sum of the moving time of the reading unit and the time required for execution of the full correction data determination process, the image reading device 1 does not execute the full correction data determination process. Such a configuration makes it possible to prevent the start of the reading of the rear side 202 from delaying due to the execution of the full correction data determination process.

If the full correction data determination process is not executed immediately after the reading of the front side, the image reading device 1 executes the full correction data determination process after the reading of the rear side. Therefore, it is possible to appropriately update the shading correction data in accordance with change of the light amount.

In the fifth embodiment, the image reading device 1 judges whether to execute the full correction data determination process based on the comparison between the page time interval and the page interval judgment threshold. However, the judgment as to whether to execute the full correction data determination process may be executed based on the conveying distance in addition to the conveying time.

In the sixth embodiment, the conveying distance between the finish of the reading of the front side and the start of the reading of the rear side may be calculated so that the judgment as to whether to execute the full correction data determination process can be made based on the conveying distance in place of the conveying time.

With this configuration, it is possible to update the correction data by effectively using the time period between the time when the second side is read and the time when the leading end of the first side of the next sheet of the document reaches the read position. Consequently it becomes possible to effectively update the correction data in accordance with the change amount of light while preventing the decrease of the reading speed.

Although the present invention has been described in considerable detail with reference to certain preferred embodiments thereof, other embodiments are possible.

In the first embodiment, the image reading device 1 determines the correction time A-D maximum intensity and the page interval A-D maximum intensity based on data obtained by reading the document presser foot 19 by an amount corresponding to one line. However, the image reading device 1 may determine these maximum intensities based on data obtained by reading the document presser foot 19 by a amount corresponding to a plurality of lines. Alternatively, the correction time A-D maximum intensity and the page interval A-D maximum intensity may be determined based on only a central portion of the data corresponding to one line along the main scanning direction.

Regarding the image reading device 1 according to the second to sixth embodiments, the correction time A-D maximum intensity and the page interval A-D maximum intensity may be determined based on data corresponding to a plurality of lines.

In the above mentioned embodiments, the surface of the document presser foot 19 facing the platen glass 21 is formed to have a white color. However, the surface of the document presser foot 19 facing the platen glass 21 may be formed to have a different color (e.g., a gray color) if such a different color does not badly affect detection of the light amount.

In the above mentioned embodiments, the image reading device 1 makes a judgment on change of the light amount with respect to the light amount at the immediately preceding execution of the shading correction data determination process each time the image reading device 1 reads 5 pages of document paper. However, it is noted that such a configuration is an example. In another example, detection of change of light amount may be performed for each page. The judgment on change of light amount may be performed by comparing the currently obtained light amount with the light amount obtained in the immediately preceding execution of the shading correction data determination process.

The read process shown in FIG. 8 or 12 is configured to read a single side of each sheet of document paper. However, it is noted that the feature of the read process shown in FIG. 8 or 12 can be applied to a read process for reading both sides of each sheet of document paper. That is, in this case, the A-D maximum intensity change rate or the A-D data change rate is calculated each time a single side of each sheet of document paper is read so that the judgment on change of light amount can be performed based on the A-D maximum intensity change rate or the A-D data change rate.

A positional relationship between the read position 21a and the reference position 21b is not limited to that shown in FIG. 2. For example, the distance between the read position 21a and the reference position 21b may larger than that shown in FIG. 2. The image reading device 1 may be configured such that the reference position is placed at a position nearer to the paper output tray 31 than a position of the reading position.

An reflecting member for reflecting light emitted by the light source is not limited to the document presser foot 19. Another member having a function of reflecting the light from the light source may be used as a reflecting member in place of the document presser foot 19.

What is claimed is:

1. An image reading device, comprising:
    a light source configured to emit light;
    a reading unit configured to read light reflected from an object, convert the light read to image data, and output the image data;
    a correction unit configured to correct the image data outputted by the reading unit based on correction data;
    a correction data storing unit configured to store the correction data to be used by the correction unit;
    an illumination target switch unit configured to switch an illumination target between a read position through which a document passes and a reference position different from the read position;
    a reflector arranged within a main scanning range to be scanned and configured to reflect, toward the reading unit, the light emitted to the read position by the light source, wherein the read position is situated between the reflector and the reading unit;
    a processor; and
    memory having machine readable instructions stored thereon that, when executed by the processor, cause the image reading device to operate as:
        a judgment unit configured to make a judgment as to whether the image data outputted by the reading unit when the illumination target of the light source is at the read position satisfies a predetermined condition;
        a correction data determination unit configured to determine the correction data based on the image data outputted by the reading unit in response to the illumination target of the light source being switched to the reference position by the illumination target switch unit; and
        a correction data update unit configured to store the correction data determined by the correction data determination unit in the correction data storing unit,
    wherein the illumination target switch unit is configured to switch the illumination target to the reference position in response to the judgment unit judging that the image data satisfies the predetermined condition.

2. The image reading device according to claim 1, wherein the illumination target switch unit is configured to switch the illumination target to the read position by moving the light source to the read position and to switch the illumination target to the reference position by moving the light source to the reference position.

3. The image reading device according to claim 1, further comprising a transparent member which allows the light from the light source to pass therethrough and is located such that the document can be situated thereon,
    wherein the reflector comprises a member having a function of pressing the document against the transparent member at the read position.

4. The image reading device according to claim 1, further comprising:
    a conveying unit configured to convey the document to be read by the reading unit and to eject the document,
    wherein the instructions, when executed by the processor, further cause the image reading device to operate as a page interval read control unit configured to obtain the image data outputted by the reading unit during a time period between a time when a page of the document is ejected by the conveying unit and a time when a next page of the document to be read reaches the read position,
    wherein the judgment unit judges whether the image data obtained by the page interval read control unit satisfies the predetermined condition.

5. The image reading device according to claim 4, wherein the instructions, when executed by the processor, further cause the image reading device to operate as:
    a correction time data obtaining unit configured to obtain the image data outputted by the reading unit in a condition where the illumination target is at the read position, in response to the correction data being determined by the correction data determination unit; and
    a comparing unit configured to compare the image data obtained by the correction time data obtaining unit with the image data obtained by the page interval read control unit,
    wherein:
    the illumination target switch unit is configured to switch the illumination target to the read position in response to the correction data being determined by the correction data determination unit; and
    the judgment unit judges that the image data satisfies the predetermined condition if it is judged from a comparing result of the comparing unit that a difference between the image data obtained by the correction time data obtaining unit and the image data obtained by the page interval read control unit is outside a first predetermined range.

6. The image reading device according to claim 5, further comprising:
    a correction time maximum intensity storing unit configured to store a maximum intensity of the image data obtained by the correction time data obtaining unit; and
    a page interval maximum intensity storing unit configured to store a maximum intensity of the image data obtained by the page interval read control unit,
    wherein:
    the correction time data obtaining unit is configured to obtain the image data within a predetermined range at the read position in a condition where the illumination target is at the read position, in response to the correction data being determined by the correction data determination unit;

the page interval read control unit is configured to obtain the image data within a predetermined range at the read position during the time period between the time when a page of the document is ejected by the conveying unit and the time when a next page of the document to be read reaches the read position; and the comparing unit compares the maximum intensity stored in the correction time maximum intensity storing unit and the maximum intensity stored in the page interval maximum intensity storing unit.

7. The image reading device according to claim 5, further comprising:

an image signal correction value storing unit configured to store an image signal correction value used to correct an image signal, wherein the instructions, when executed by the processor, further cause the image reading device to operate as a correction value determination unit configured to determine a temporary image signal correction value based on the image signal correction value stored in the image signal correction value storing unit and a difference between the image data obtained by the correction time data obtaining unit and the image data obtained by the page interval read control unit if the judgment unit judges that the difference between the image data obtained by the correction time data obtaining unit and the image data obtained by the page interval read control unit is within the first predetermined range but is outside a second predetermined range which is narrower than the first predetermined range; and a correction value setting unit configured to define the temporary image signal correction value as the image signal correction value when a predetermined number of pages of the document is read, in response to the temporary image signal correction value being determined by the correction value determination unit, wherein the reading unit comprises:
an image pick-up unit configured to convert the received light to the image signal and output the image signal;
an image signal correction unit configured to correct the image signal in accordance with the image signal correction value; and
a conversion unit configured to execute A-D conversion for the image signal corrected by the image signal correction unit.

8. The image reading device according to claim 7, wherein the correction value setting unit is configured to set a predetermined judgment correction value as the image signal correction value when the page interval read control unit obtains the image data or when the correction time data obtaining unit obtains the image data.

9. The image reading device according to claim 4, wherein the instructions, when executed by the processor, further cause the image reading device to operate as:

a correction time data obtaining unit configured to obtain the image data outputted by the reading unit in a condition where the illumination target is at the read position, in response to the correction data being determined by the correction data determination unit;

wherein the image reading device further comprises
a correction time maximum intensity storing unit configured to store a maximum intensity of the image data obtained by the correction time data obtaining unit from the received light reflecting from a plurality of positions, in response to the correction time data obtaining unit obtaining the image data; and a correction time minimum intensity storing unit configured to store a minimum intensity of the image data obtained by the correction time data obtaining unit in response to the correction time data obtaining unit obtaining the image data, wherein the instructions, when executed by the processor, further cause the image reading device to operate as a change criterion determination unit configured to determine a change criterion based on the maximum intensity stored in the correction time maximum intensity storing unit, the minimum intensity stored in the correction time minimum intensity storing unit, and the image data obtained by the page interval read control unit, and wherein the judgment unit judges that the image data satisfies the predetermined condition if the change criterion representing a change in intensity is not within a predetermined third range.

10. The image reading device according to claim 9, further comprising:

a maximum intensity position storing unit configured to store a position corresponding to a maximum intensity selected from the image data obtained by the correction time data obtaining unit from the received light reflecting from the plurality of positions; and a minimum intensity position storing unit configured to store a position corresponding to a minimum intensity selected from the image data obtained by the correction time data obtaining unit from the received light reflecting from the plurality of positions, wherein the instructions, when executed by the processor, further cause the image reading device to operate as
a maximum intensity change amount obtaining unit configured to obtain a maximum intensity change amount based on an intensity extracted from the image data obtained by the page interval read control unit at the position stored in the maximum intensity position storing unit and the maximum intensity stored in the correction time maximum intensity storing unit; and a minimum intensity change amount obtaining unit configured to obtain a minimum intensity change amount based on an intensity extracted from the image data obtained by the page interval read control unit at the position stored in the minimum intensity position storing unit and the minimum intensity stored in the correction time minimum intensity storing unit, wherein the change criterion determination unit determines the change criterion based on the maximum intensity change amount obtained by the maximum intensity change amount obtaining unit and the minimum intensity change amount obtained by the minimum intensity change amount obtaining unit.

11. The image reading device according to claim 10, further comprising:

an image signal correction value storing unit configured to store an image signal correction value used to correct an image signal, wherein the instructions, when executed by the processor, further cause the image reading device to operate as
a change amount judgment unit configured to judge whether the maximum intensity change amount obtained by the maximum intensity change amount obtaining unit is within a predetermined fourth range;

a correction value determination unit configured to determine a temporary image signal correction value based on the maximum intensity change amount and the image signal correction value stored in the image signal correction value storing unit if the change amount judgment unit judges that the maximum intensity change amount is not within the predetermined fourth range and if the judgment unit judges that the change criterion representing a change in intensity is within the predetermined third range; and a correction value setting unit configured to define the temporary image signal correction value as the image signal correction value when a predetermined number of pages of the document is read, in response to the temporary image signal correction value being determined by the correction value determination unit, wherein the reading unit comprises:

an image pick-up unit configured to convert the received light to the image signal and output the image signal;

an image signal correction unit configured to correct the image signal in accordance with the image signal correction value; and a conversion unit configured to execute A-D conversion for the image signal corrected by the image signal correction unit.

12. The image reading device according to claim 11, wherein the correction value setting unit is configured to set a predetermined judgment correction value as the image signal correction value when the page interval read control unit obtains the image data or when the correction time data obtaining unit obtains the image data.

13. The image reading device according to claim 1, wherein the instructions, when executed by the processor, further cause the image reading device to operate as a status judgment unit configured to make a judgment on a status of the image reading device, wherein:

the illumination target switch unit is configured to switch the illumination target to the reference position if the judgment unit judges that the image data satisfies the predetermined condition and that the status judgment unit judges that the image reading device is ready for reading the document.

14. The image reading device according to claim 1, further comprising:

a document feed path connecting a paper setting part to a paper ejection part through the read position; and a conveying unit configured to convey sheets of the document one by one to the read position through the document feed path;

wherein the correction data determination unit is configured to determine the correction data based on the image data which is outputted by the reading unit by receiving the reflected light after a leading end of a sheet of the document being conveyed by the conveying unit reaches a predetermined point along the document feed path.

15. The image reading device according to claim 1, further comprising:

a conveying unit configured to convey a sheet of the document to the read position such that a first side and a second side of the sheet of the document are read sequentially by the reading unit at the read position in this order, wherein the instructions, when executed by the processor, further cause the image reading device to operate as a paper face judgment unit configured to judge whether a surface of the sheet of the document read by the reading unit is the first side or the second side each time the reading unit reads one side of the sheet of the document, and wherein:

the illumination target switch unit is configured to switch the illumination target to the reference position if the judgment unit judges that the image data satisfies the predetermined condition and if the paper face judgment unit judges that the surface of the sheet of the document read by the reading unit is the second side; and a time elapsed before a leading end of the first side of a next sheet of the document reaches the read position after finish of reading of the second side of the sheet of the document conveyed by the conveying unit is longer than a time elapsed before a leading end of the second side of the sheet of the document reaches the read position after finish of reading of the first side of the sheet of the document.

16. The image reading device according to claim 1, wherein the instructions, when executed by the processor, further cause the image reading device to operate as:

a read range determination unit configured to define a read range which is a target for reading by the reading unit; and a page interval calculation unit configured to calculate a judgment value representing a conveying distance or a conveying time corresponding to a time elapsed before a leading end of the read range of a next page of the document in a conveying direction reaches the read position after a rear end of the read range of a page of the document in the conveying direction has passed the read position, wherein the illumination target switch unit is configured to switch the illumination target to the reference position if the judgment unit judges that the image data satisfies the predetermined condition and if the judgment value calculated by the page interval calculation unit is larger than or equal to a predetermined threshold.

* * * * *